(12) United States Patent
Skead et al.

(10) Patent No.: US 12,534,466 B2
(45) Date of Patent: Jan. 27, 2026

(54) CRYSTALLINE FORMS OF PYRIMIDINO DIAZEPINE DERIVATIVE

(71) Applicant: CYCLACEL LIMITED, London (GB)

(72) Inventors: Benjamin Skead, Cambridge (GB); Julian Northen, South Shields (GB); Chris Atherton, Durham (GB); John Mykytiuk, Houghton le Spring (GB)

(73) Assignee: Cyclacel Pharmaceuticals Inc., Berkeley Heights, NJ (US)

( * ) Notice: Subject to any disclaimer, the term of this patent is extended or adjusted under 35 U.S.C. 154(b) by 902 days.

(21) Appl. No.: 17/634,717

(22) PCT Filed: Aug. 14, 2020

(86) PCT No.: PCT/GB2020/051952
§ 371 (c)(1),
(2) Date: Feb. 11, 2022

(87) PCT Pub. No.: WO2021/032959
PCT Pub. Date: Feb. 25, 2021

(65) Prior Publication Data
US 2022/0281880 A1 Sep. 8, 2022

(30) Foreign Application Priority Data

Aug. 16, 2019 (GB) .................................. 1911797.7
Jun. 8, 2020 (GB) .................................. 2008588.2

(51) Int. Cl.
*C07D 487/04* (2006.01)

(52) U.S. Cl.
CPC ........ *C07D 487/04* (2013.01); *C07B 2200/13* (2013.01)

(58) Field of Classification Search
CPC .................................................. C07D 487/04
See application file for complete search history.

(56) References Cited

U.S. PATENT DOCUMENTS 8,563,542 B2 * 10/2013 Hollick ................... A61P 35/00
514/220

FOREIGN PATENT DOCUMENTS

| WO | WO 2004/067000 A1 | 8/2004 | | |
|---|---|---|---|---|
| WO | WO-2009040556 A1 | * | 4/2009 | ............... A61P 43/00 |
| WO | WO-2013144632 A1 | * | 10/2013 | ............... A61P 35/00 |

OTHER PUBLICATIONS

Casares, Journal of Pharmacy and Pharmacology, 67, 2015, pp. 812-822 (Year: 2015).*
Weiß, Experimental Hematology and Oncology, Dec. 10, 2012, 1:38 (Year: 2012).*
Blackadar, World Journal of Clinical Oncology, Feb. 10, 2016; 7(1): 54-86 (Year: 2016).*
The American Cancer Society, cancer.org, Can Acute Lymphocytic Leukemia Be Prevented?, https://web.archive.org/web/20241209175137/ https://www.cancer.org/cancer/types/acute-lymphocytic-leukemia/causes-risks-prevention/prevention.html, Last updated Oct. 17, 2018 (Year: 2018).*
The American Cancer Society, cancer.org, Can Hodgkin Lymphoma be Prevented?, https://web.archive.org/web/20231211145704/ https://www.cancer.org/cancer/types/hodgkin-lymphoma/causes-risks-prevention/prevention.html, Last updated May 1, 2018 (Year: 2018).*
Hassanpour, Journal of Cancer Research and Practice, 4, 2017, 127-129 (Year: 2017).*
International Search Report and Written Opinion for PCT International Patent Application No. PCT/GB2020/051952, mailed Sep. 25, 2020.
Alastair J. Florence, "Polymorph Screening in Pharmaceutical Development", European Pharmaceutical Review, Aug. 19, 2020, pp. 1-4.
Richard J. Bastin et al., "Salt Selection and Optimisation Procedures for Pharmaceutical New Chemical Entities", Organic Process Research & Development, American Chemical Society, US. vol. 4, No. 5, Jul. 19, 2020, pp. 427-435.
Degenhardt et al., "Targeting Polo-like Kinase in Cancer Therapy", *Clinical Cancer Research* 16(2):384-389 (Jan. 2010).
Kanaji et al., "Expression of Polo-Like Kinase 1 (PLK1) Protein Predicts the Survival of Patients with Gastric Carcinoma", *Oncology* 70(2):126-133 (2006).
Murikipudi, et al., "Efficient throughput method for hygroscopicity classification of active and inactive pharmaceutical ingredients by water vapor sorption analysis", *Pharmaceutical Development and Technology* 18(2):348-358 (2013).
Schöffski et al., "A phase I, dose-escalation study of the novel Polo-like kinase inhibitor volasertib (BI 6727) in patients with advanced solid tumours", *European Journal of Cancer* 48(2):179-186 (2012).
Spänkuch et al., "Rational combinations of siRNAs targeting Plk1 with breast cancer drugs", *Oncogene* 26(39):5793-5807 (Aug. 2007).
Takaki et al., "Polo-like kinase 1 reaches beyond mitosis-cytokinesis, DNA damage response, and development", *Current Opinion in Cell Biology* 20(6):650-660 (2008).
Bernstein, "Polymorphism in Molecular Crystals", Moscow, Nauka, Chapter 7.3.2, *Bioavailability*, pp. 324-330 (2007).
Caira, "Crystalline Polymorphism of Organic Compounds", *Topics in Current Chemistry* 198:163-208, p. 188 $2^{nd}$ paragraph (1998).
Duggirala et al., "Pharmaceutical cocrystals: along the path to improved medicines", *Chem Comm* 52:640-655 (2016).
Kümmerer, "Pharmaceuticals in the Environment", *Annual Review of Environment and Resources* 35:57-75 (2010).
Kuznetsova, "Methodical Instructions", Irkutsk State University (GOUVPOIGU), General Physics Department, p. 3, 2nd paragraph (2005).

(Continued)

*Primary Examiner* — Andrew D Kosar
*Assistant Examiner* — Phillip Matthew Rzeczycki
(74) *Attorney, Agent, or Firm* — Lathrop GPM LLP; Brian C. Trinque

(57) ABSTRACT

The present invention relates to new crystalline forms of a pyrimido-diazepine derivative which exhibits excellent anti-tumour activity. The invention also relates to a pharmaceutical composition containing said crystalline forms as an active ingredient, and use thereof in the prevention or treatment of disease. The invention further relates to a process for preparing the crystalline forms.

11 Claims, 24 Drawing Sheets

(56) References Cited

OTHER PUBLICATIONS

Pinto et al., "Thermoanalytical studies of carbamazepine: hydration/dehydration, thermal decomposition, and solid phase transitions", *Brazilian Journal of Pharmaceutical Sciences* 50(4):877-884 (2014).

Rodriguez-Spong et al., "General principles of pharmaceutical solid polymorphism: a supramolecular perspective", *Advanced Drug Delivery Reviews* 56:241-274 (2004).

Thakuria et al., "Pharmaceutical cocrystals and poorly soluble drugs", *International Journal of Pharmaceutics* 453(1):101-125 (2013).

Tian et al., "Factors affecting crystallization of hydrates", *Journal of Pharmacy and Pharmacology* 62:1534-1546 (2010).

Yadav et al., "Co-Crystals: A Novel Approach to Modify Physicochemical Properties of Active Pharmaceutical Ingredients", *Indian Journal of Pharmaceutical Science*, pp. 359-370 (Jul.-Aug. 2009).

\* cited by examiner

CRYSTALLINE FORMS OF PYRIMIDINO DIAZEPINE DERIVATIVE

The present invention relates to crystalline forms of a pyrimido-diazepine derivative. The invention also relates to pharmaceutical compositions containing said crystalline forms as the active ingredient, and use thereof in the prevention or treatment of disease. The invention further relates to a process for preparing the crystalline forms.

BACKGROUND TO THE INVENTION

Polo-like kinases are a family of serine threonine kinases that are critical regulators of cell cycle progression and DNA damage responses (Petronczki et al, Curr Opin Cell Biol. 2008 December; 20(6):650-60). PLK1 is frequently overexpressed in cancer and its level correlates with aggressiveness and has prognostic value for predicting outcome (Kanaji et al. Oncology. 2006; 70(2):126-33). Cancer cell proliferation is blocked in vitro and in vivo by small molecule PLK1 inhibitors and PLK1 antisense/siRNA (Spankuch et al, Oncogene, 2007 Aug. 23; 26(39):5793-807). PLK1 inhibitors cause mitotic arrest and subsequent induction of apoptosis. Due to the central role of PLK1 in mitosis and cell division, rapidly proliferating normal cells are also affected by PLK1 inhibitors. As a result clinical PLK1 inhibitors have shown narrow therapeutic windows, and have been shown to cause significant haematological toxicity (Schoffski et al, Eur J Cancer, 2012 January; 48(2):179-86). Identification of patient/tumour selection markers and treatment regimens which will extend the therapeutic window is critical for the successful development of these agents. It has been shown that mutant TP53 can be one such predictive marker for sensitivity towards PLK1 inhibitors (Degenhardt et al, Clin Cancer Res. 2010 Jan. 15; 16(2):384-9).

Small molecule benzthiazole-3-oxide PLK1 inhibitors and their use in the treatment of proliferative disorders are described in International patent application WO 2004/067000 in the name of Cyclacel Limited. In addition, a series of pyrimido-diazepinone molecules has also been shown to potently and selectively inhibit PLK1 (see International patent application WO 2009/040556; Cyclacel Limited), demonstrating strong anti-proliferative activity in vitro and in vivo.

Compound (I), also known as 44(9'-cyclopentyl-5'-methyl-6'-oxo-5',6',8',9'-tetrahydrospiro-[cyclopropane-1, 7'-pyrimido[4,5-b][1,4]diazepin]-2'-yl)amino)-3-methoxy-N-((trans)-4-(4-methylpiperazin-1-yl)cyclohexyl) benzamide or 4-(9'-cyclopentyl-5'''-methyl-6'-oxo-5',6',8',9'-tetrahydrospiro[cyclopropane-1,7'-pyrimido[4,5-b][1,4] diazepine]-2'-ylamino)-N((trans)-4-(4-methylpiperazin-1-yl)cyclohexyl)-3-methoxybenzamide, was first disclosed in WO 2009/040556 and has the structure shown below:

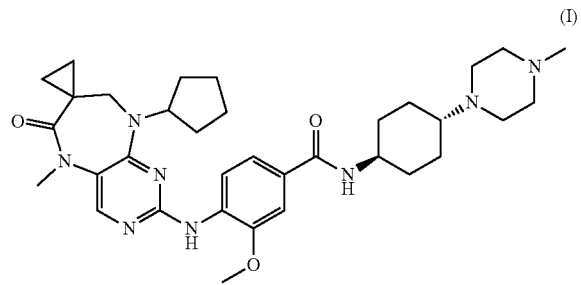 [SMILES: COc1cc(C(=O)N[C@H]2CC[C@H](N3CCN(C)CC3)CC2)ccc1Nc1ncc2c(n1)N(C1CCCC1)CC1(CC1)C(=O)N2C]

(I)

Studies have demonstrated that compound (I) is a potent inhibitor of polo-like kinase 1 (PLK1), thereby rendering it therapeutically useful in the treatment of a range of proliferative disorders (including but not limited to, cancer, leukaemia, lymphoma, glomerulonephritis, rheumatoid arthritis and psoriasis), immune-mediated and inflammatory disorders, autoimmune and autoimmune-mediated disorders, kidney disorders and viral disorders.

Different solid state forms (including solvated forms) of an active pharmaceutical ingredient may possess different properties. Such variations in the properties of different solid state forms and solvates may provide a basis for improving formulation, for example, by facilitating better processing or handling characteristics, improving the dissolution profile, or improving stability (polymorph as well as chemical stability) and shelf-life. These variations in the properties of different solid state forms may also provide improvements to the final dosage form, for instance, if they serve to improve bioavailability. Different solid state forms and solvates of an active pharmaceutical ingredient may also give rise to a variety of polymorphs or crystalline forms, which may in turn provide additional opportunities to use variations in the properties and characteristics of a solid active pharmaceutical ingredient for providing an improved product.

Discovering new solid state forms and solvates of a pharmaceutical product can provide materials having desirable processing properties, such as ease of handling, ease of processing, storage stability, and ease of purification or as desirable intermediate crystal forms that facilitate conversion to other polymorphic forms. New polymorphic forms and solvates of a pharmaceutically useful compound can also provide an opportunity to improve the performance characteristics of a pharmaceutical product (dissolution profile, bioavailability, etc). It enlarges the repertoire of materials that a formulation scientist has available for formulation optimization, for example by providing a product with different properties, e.g., a different crystal habit, higher crystallinity or polymorphic stability which may offer better processing or handling characteristics, improved dissolution profile, or improved shelf-life. For at least these reasons, there is a need for different solid state forms of compound (I).

The present invention seeks to provide crystalline forms of compound (I). In particular, the invention seeks to provide crystalline forms that retain the desired pharmacological activity of the compound. More specifically, but not exclusively, the present invention seeks to provide crystalline forms of compound (I) that exhibit one or more improved properties over the amorphous form.

STATEMENT OF INVENTION

The present invention relates to solid state forms of compound (I), particularly, salt forms of compound (I).

A first aspect of the invention relates to a crystalline form of compound (I):

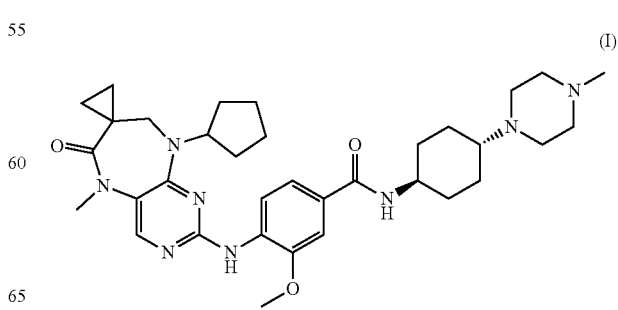

(I)

Preferably, said compound is in the form of a solvate, a pharmaceutically acceptable salt, or a solvated form of a pharmaceutically acceptable salt, or a co-crystal.

The crystalline forms of the invention typically demonstrate one or more improved properties over the amorphous form. Suitable properties include, for example, better storage stability, improved ease of handling (flowability, compressibility, stability), easier purification, improved hygroscopicity profile, and easier synthetic scale up.

A second aspect of the invention relates to a pharmaceutical composition comprising one or more crystalline forms as described above as an active ingredient and a pharmaceutically acceptable diluent, excipient or carrier.

A third aspect of the invention relates to one or more crystalline forms as described above for use in medicine.

A fourth aspect of the invention relates to one or more crystalline forms as described above for use in the prevention or treatment of proliferative disorders, immune-mediated and inflammatory disorders, autoimmune and autoimmune-mediated disorders, kidney disorders and viral disorders.

A fifth aspect of the invention relates to use of one or more crystalline forms as described above in the preparation of a medicament for the prevention or treatment of proliferative disorders, immune-mediated and inflammatory disorders, autoimmune and autoimmune-mediated disorders, kidney disorders and viral disorders.

A sixth aspect of the invention relates to a method for the prevention or treatment of proliferative disorders, immune-mediated and inflammatory disorders, autoimmune and autoimmune-mediated disorders, kidney disorders and viral disorders, said method comprising administering a pharmacologically effective amount of one or more crystalline forms as described above to a subject in need thereof.

A seventh aspect of the invention relates to processes for preparing crystalline forms as described above.

An eighth aspect relates to a process for preparing a pharmaceutical composition, said process comprising admixing one or more crystalline forms according to the invention with a pharmaceutically acceptable diluent, excipient or carrier.

The present invention also provides solid state forms of compound (I) and salts thereof, for use in the preparation of other solid state forms of compound (I) and/or compound (I) co-crystals and/or salts, and solid state forms thereof.

The present invention also provides for the use of one or more crystalline forms as described herein in the preparation of another solid state form of compound (I) or salt thereof or co-crystal thereof.

The present invention also relates to a process for preparing another solid state form of compound (I) or salt or co-crystal thereof, said process comprising preparing a crystalline form according to the invention and converting to another solid state form of compound (I) or salt or co-crystal thereof.

The present invention also relates to the use of one or more crystalline forms as described herein in the preparation of a pharmaceutical composition.

The present invention also relates to one or more crystalline forms as described herein for use in the preparation of a pharmaceutical composition.

DETAILED DESCRIPTION

Polymorphism, the occurrence of different crystal forms, is a property of some molecules and molecular complexes. A single compound, like compound (I), may give rise to a variety of polymorphs having distinct crystal structures and physical properties like melting point, thermal behaviors (e.g. measured by thermogravimetric analysis—"TGA", or differential scanning calorimetry—"DSC"), X-ray powder diffraction (XRPD) pattern, infrared absorption fingerprint, Raman absorption fingerprint, and solid state ($^{13}$C-) NMR spectrum. One or more of these techniques may be used to distinguish different polymorphic forms of a compound.

In particular, the crystalline forms of the invention may be characterised by a range of different analytical techniques, including x-ray powder diffraction and differential scanning calorimetry. Further details of these techniques and equipment are set forth in the accompanying Examples section. Preferably, the XRPD characterisation is carried out using a PANalytical diffractometer using CuK$_\alpha$ radiation (45 kV, 40 mA). As used herein, unless stated otherwise, XRPD peaks reported herein are optionally measured using CuK$_\alpha$ radiation, $\lambda=1.5418$ Å. XRPD values are given as degrees 2-theta±0.2 degrees 2-theta.

The solid state forms of compound (I) and salts thereof according to the present invention may have advantageous properties selected from at least one of: chemical or polymorphic purity, flowability, solubility, wettability, low hygroscopicity, low solvent (e.g. water) content, dissolution rate, bioavailability, morphology or crystal habit, stability—such as chemical stability as well as thermal and mechanical stability with respect to polymorphic conversion, stability towards dehydration and/or storage stability, a lower degree of hygroscopicity, low content of residual solvents and advantageous processing and handling characteristics such as compressibility, or bulk density.

A crystal form may be referred to herein as being characterized by graphical data "as shown in" or "substantially in accordance with" a Figure. Such data include, for example, powder X-ray diffractograms and DSC curves. As is well-known in the art, the graphical data potentially provides additional technical information to further define the respective solid state form (a so-called "fingerprint") which cannot necessarily be described by reference to numerical values or peak positions alone. The skilled person would understand that such graphical representations of data may be subject to small variations, e.g., in peak relative intensities and peak positions due to factors such as variations in instrument response and variations in sample concentration and purity. Nonetheless, the skilled person would readily be capable of comparing the graphical data in the Figures herein with graphical data generated for an unknown crystal form and confirm whether the two sets of graphical data are characterizing the same crystal form or two different crystal forms. A crystalline form of compound (I) referred to herein as being characterized by graphical data "as shown in" a Figure will thus be understood to include any crystalline forms of the compound (I) characterized with the graphical data having such small variations, as are well known to the skilled person, in comparison with the Figure.

A solid state form (or polymorph) may be referred to herein as polymorphically pure or as substantially free of any other solid state (or polymorphic) forms. As used herein in this context, the expression "substantially free of any other forms" will be understood to mean that the solid state form contains about 20% or less, about 10% or less, about 5% or less, about 2% or less, about 1% or less, or 0% of any other crystalline forms of that particular salt of compound (I) as measured, for example, by XRPD. Thus, the solid state form of a particular salt of compound (I) described herein as substantially free of any other solid state forms of that salt would be understood to contain greater than about 80%

(w/w), greater than about 90% (w/w), greater than about 95% (w/w), greater than about 98% (w/w), greater than about 99% (w/w), or 100% of the subject solid state form.

As used herein, the term "solvate" or "solvated form" refers to a crystal having one or more molecules of solvent associated therewith as an inherent part of the crystal structure. The solvent in a solvate may be present in either a stoichiometric or non-stoichiometric amount. Preferably, the solvate or solvated form is the hydrate, more preferably the monohydrate.

As used herein, the term "isolated" in reference to solid state forms of compound (I) and salts thereof corresponds to a solid state form that is physically separated from the reaction mixture in which it is formed.

As used herein, the term "anhydrous" in reference to solid state forms of compound (I) and salts thereof corresponds to a solid state form which does not contain any crystalline water (or other solvents) in a defined stoichiometric amount within the crystal. Typically, an "anhydrous" form does not contain more than 1% (w/w) of either water or organic solvents, as measured, for example, by TGA.

As used herein, "ambient temperature" means close to or at the same temperature as the surrounding space (e.g. room or fume hood) in which the sample is located. Typically ambient temperature is from about 15° C. to about 25° C., more preferably about 20° C. to about 25° C.

As used throughout, the term "cooling/cooled" refers to reducing the temperature, for example, of a reaction mixture. The term includes active methods (e.g. subjecting the reaction mixture to cooling conditions such as immersing the reaction vessel in a cooling bath), and passive methods e.g. allowing the reaction mixture to cool (for example, to room temperature) by removing the heat source.

In general, different plural crystalline forms (polymorphs) of the same compound can be produced by varying the crystallisation conditions used. These different crystalline forms have different three-dimensional structures and different physicochemical properties. However, the existence of polymorphs is inherently unpredictable and theoretical calculations to predict polymorphs are extremely unreliable, with many more polymorphs predicted than can actually be isolated in practice.

The present invention encompasses the crystalline form of various pharmaceutically acceptable salts, hydrates and/or co-crystals of compound (I).

In one preferred embodiment, the invention relates to crystalline forms which are co-crystals or salts formed by the interaction (or reaction) of compound (I) with an acid selected from hydrochloric acid, maleic acid, L-malic acid, succinic acid, p-toluenesulfonic acid and hydrobromic acid. The monohydrochloride monohydrate form is particularly preferred.

In one preferred embodiment, the crystalline form is a co-crystal. As used herein, the term "co-crystal" refers to a crystalline material composed of two or more different molecules, one of which is an active pharmaceutical ingredient (API), and one of which is a co-crystal former ("co-former"), in a defined stoichiometric ratio within the same crystal lattice that are associated by non-ionic and non-covalent bonds (see definition in FDA Regulatory Classification of Pharmaceutical Co-Crystals Guidance for Industry, February 2018). As used herein, a "conformer" is a component that interacts non-ionically with the API in the crystal lattice, that is not a solvent (including water), and is typically non-volatile. Pharmaceutical co-crystals have provided opportunities for engineering solid-state forms beyond conventional solid-state forms of an API, such as salts and polymorphs. Co-crystals can be tailored to enhance drug product bioavailability and stability and to enhance the processability of APIs during drug product manufacture.

Co-crystals are distinguished from salts because unlike salts, the components that co-exist in the co-crystal lattice with a defined stoichiometry interact non-ionically. In addition, co-crystals differ from polymorphs, which are defined as including 1) single-component crystalline forms that have different arrangements or conformations of the molecules in the crystal lattice, 2) amorphous forms, and 3) multicomponent phases such as solvate and hydrate forms. Instead, co-crystals are more similar to solvates, in that both contain more than one component in the lattice. From a physical chemistry perspective, co-crystals can be viewed as a special case of solvates and hydrates, wherein the second component, the coformer, is not a solvent (including water), and is typically non-volatile.

The skilled person would understand that whether compound (I) forms a salt or a co-crystal with a particular acid will ultimately depend on the relative pKa values.

Generally speaking, if the API (compound (I)) and its coformer have a $\Delta$pKa (pKa (conjugate acid of base)–pKa (acid))>1, there will be substantial proton transfer resulting in ionization and potential formation of a salt as opposed to a co-crystal. On the other hand, if the API and its coformer have a $\Delta$pKa (pKa (conjugate acid of base)–pKa (acid))<1, there will be less than substantial proton transfer. If this criterion is met, the API-coformer entity is generally classified as a co-crystal.

In one preferred embodiment, the invention encompasses crystalline forms of the hydrochloride, maleate, L-malate, succinate, p-toluenesulfonate and hydrobromide salts of compound (I). The monohydrochloride monohydrate salt is particularly preferred.

When the crystalline forms of compound (I) are allowed to stand so that they are open to the atmosphere or are mixed with water or a solvent, they may absorb water or a solvent to form a hydrate or solvate. The present invention encompasses these hydrates and solvates as well as the anhydrous/non-solvated forms.

Compound (I) can be prepared according to the procedure described in WO 2009/040556, as illustrated by Schemes 1-3 in the accompanying Examples section.

In one preferred embodiment, the crystalline forms of the invention can be obtained from a supersaturated solution. The supersaturated solution can be prepared through dissolution of the pharmaceutically acceptable salt of compound (I) in an appropriate solvent, optional pH adjustment of said solution, concentration of said solution, cooling said solution, addition of a solvent in which the salt of compound (I) is slightly soluble to a solution of the salt of compound (I) in a solvent in which compound (I) is readily soluble.

In one preferred embodiment, the crystalline salt form is prepared in a single step by admixing a solution or suspension of compound (I) with a solution of the appropriate counterion (e.g. HCl, L-malic acid, succinic acid, HBr, maleic acid or p-toluenesulfonic acid) and crystallising the product therefrom.

In one preferred embodiment, the crystalline salt form is prepared in a single step by treating a solution or suspension of compound (I) in free base form with the appropriate counterion (e.g. HCl, L-malic acid, succinic acid, HBr, maleic acid or p-toluenesulfonic acid) and crystallising the product therefrom. Preferably, the counterion is in the form of a solution, more preferably, a solution comprising ethanol or a mixture of ethanol/THF.

Preferably, the compound of formula (I) is in the form of a solution or suspension which comprises ethanol. Preferably, the counterion is in the form of a solution, more preferably, in ethanol or a mixture of ethanol/THF. Preferably, the compound of formula (I) is in the form of a solution or suspension in ethanol. More preferably, the ethanol is used in an amount of from about 5 to about 10 ml, or about 6 to about 9 ml, or about 7 to about 9 ml per gram of compound (I).

Preferably, the mixture is heated, and then cooled in a controlled, stepwise manner to ambient temperature, preferably with agitation. In one preferred embodiment, the process comprises adding an antisolvent (preferably, ethyl acetate) to aid crystallisation. Preferably, the antisolvent is added prior to or during the cooling process.

In one preferred embodiment, the solution or suspension of compound (I) is heated to a temperature of at least about 70° C., more preferably, at least about 75° C., more preferably, from about 75° C. to about 85° C. Preferably, the solution or suspension of compound (I) is heated at this temperature for at least 30 minutes, preferably at least 1 hour. Preferably, the solution or suspension is then cooled to a temperature of from about 65° C. to about 75° C. Preferably, the counterion solution is added thereto and the resulting mixture is maintained at 65° C. to about 75° C. for at least 10 minutes, more preferably, at least 30 minutes. Preferably, the mixture is then cooled to a temperature of from about 15° C. to about 25° C. Preferably, the mixture is maintained at a temperature of from about 15° C. to about 25° C. for at least 2 hours, preferably at least 4 hours, more preferably at least 6 hours, more preferably at least 8 hours, even more preferably at least 12 hours. In one preferred embodiment, the mixture is further cooled to a temperature of from about 0 to about 10° C. Preferably, the resulting suspension is filtered, washed, dried.

In another preferred embodiment, the solution or suspension of compound (I) is heated to a temperature of at least about 70° C., more preferably, at least about 75° C., more preferably, from about 75° C. to about 85° C. Preferably, the solution or suspension of compound (I) is heated at this temperature for at least 30 minutes, preferably at least 1 hour. The counterion is then added thereto. Preferably, the mixture is then cooled to a temperature of from about 55° C. to about 65° C., more preferably, about 60° C. Preferably, the mixture is maintained at this temperature (about 55° C. to about 65° C., more preferably, about 60° C.) for at least 1 hour, more preferably at least 2 hours, even more preferably, about 2 hours. Preferably, the mixture is then further cooled to a temperature of from about 35° C. to about 45° C., more preferably, about 40° C. Preferably, the mixture is maintained at this temperature (about 35° C. to about 45° C., more preferably, about 40° C.) for at least 1 hour, more preferably at least 2 hours, even more preferably, about 2 hours. Preferably, the mixture is then cooled to a temperature of from about 15° C. to about 25° C. Preferably, the mixture is maintained at this temperature (about 15° C. to about 25° C.) for at least 2 hours, preferably at least 4 hours, more preferably at least 6 hours, more preferably at least 8 hours, even more preferably at least 12 hours. In one preferred embodiment, the mixture is then further cooled to a temperature of from about 0 to about 10° C. Preferably, the resulting suspension is filtered, washed, dried.

In another preferred embodiment, a suspension of a crystal or amorphous solid of the salt of compound (I) in an appropriate solvent is converted into a slurry and is then stirred to transform into an alternate crystalline form. This is known as solvent-mediated transformation.

In another preferred embodiment, precipitation of the crystals takes place spontaneously in the reaction vessel or can be started or accelerated by addition of a crystalline seed, by mechanical stimulation such as through use of ultrasonic waves, or by scratching the inside of the reaction vessel.

The temperature for crystallisation is typically from about 0 to about 100° C., preferably from about 5° C. to about 75° C.

Precipitated crystals can be collected by filtration, centrifugation or decantation methods. Isolated crystals may be washed with an appropriate solvent.

Isolated crystals are typically dried at a temperature of from about 10 to about 100° C., preferably from about 30 to about 50° C., until the weight of the crystals becomes constant, if necessary, in the presence of a drying agent such as silica gel or calcium chloride and optionally under reduced pressure (e.g. 10 μbar to 50 mbar).

Dried crystals may absorb water under conditions of about 20 to 90% relative humidity at temperatures of from about 10 to about 30° C., preferably about 50 to about 80% relative humidity at temperatures of from about 20 about 30° C., until the weight of the crystalline form becomes constant.

Crystals obtained in accordance with the invention can be further purified by recrystallisation or slurry purification.

Recrystallisation may be accomplished by techniques familiar to those skilled in the art, including the following methods:

(1) Cooling method: the salt of compound (I) is dissolved in a hot solvent and the resulting solution is cooled;
(2) Concentration method: a solution of the salt of compound (I) is concentrated;
(3) Precipitation method: a solvent in which the salt of compound (I) is slightly soluble is added to a solution of the salt of compound (I) in a solvent in which the salt of compound (I) is readily soluble.

Slurry purification typically comprises stirring a suspension of the salt of compound (I) in an appropriate solvent.

Solvents employed in the preparation of crystalline salt forms of compound (I) include ICH class 2 or preferably class 3 solvents. For example, esters such as ethyl acetate, alcohols such as ethanol, ketones such as methyl ethyl ketone, ethers such as methyl t-butyl ether, alkanes such as heptane, and water. These solvents may be used singly or as mixtures. Preferred solvents include IMS, acetonitrile, tetralin, cumene, 3-methyl-1-butanol, ethanol, methanol, isopropanol, ethyl acetate, methyl acetate, isopropyl acetate, water, heptane, TBME, THF, MEK, methyl isobutyl ketone, nPrOH and nBuOAc and mixtures thereof.

The present invention encompasses individual crystalline forms as defined above, and mixtures thereof with one or more other crystalline forms.

Crystalline Hydrochloride Salt

In one preferred embodiment of the invention, the crystalline form is a co-crystal or salt formed by the interaction (or reaction) of compound (I) with hydrochloric acid.

In one preferred embodiment of the invention, the crystalline form is a hydrochloride salt of compound (I). More preferably, the crystalline form is a hydrate, even more preferably a monohydrochloride monohydrate salt.

In one preferred embodiment, the crystalline form is characterized by an x-ray powder diffraction pattern having two or more diffraction peaks at 2[theta] values selected from 5.57±0.2, 6.19±0.2, 7.97±0.2, 8.32±0.2, 10.48±0.2, 10.72±0.2, 11.83±0.2, 12.5±0.2, 12.74±0.2, 13.34±0.2, 13.86±0.2, 14.69±0.2, 15.62±0.2, 16.02±0.2, 16.75±0.2, 17.02±0.2, 17.42±0.2, 18.19±0.2, 18.81±0.2, 19.08±0.2, 19.49±0.2, 19.83±0.2, 20.15±0.2, 20.55±0.2, 21.12±0.2, 22.82±0.2, 23.78±0.2, 24.68±0.2, 25.10±0.2, 25.70±0.2, 25.86±0.2, 26.86±0.2, 27.92±0.2, 28.53±0.2, 28.92±0.2, 29.71±0.2, 30.80±0.2, 31.56±0.2, 32.38±0.2, 32.98±0.2 and 34.13±0.2.

In one preferred embodiment, the crystalline form is characterized by having two of the aforementioned diffraction peaks.

More preferably, the crystalline form is characterized by having three or more, four or more, five or more, or six or more of the aforementioned diffraction peaks. More preferably, the crystalline form is characterized by having 7, 8, 9, 10, 11, 12, 13, 14, 15, 16, 17, 18, 19, 20 . . . 40 or more of the aforementioned diffraction peaks.

More preferably, the crystalline form is characterized by having three, four or five of the aforementioned diffraction peaks.

In one preferred embodiment, the crystalline form is characterized by having three or more of the aforementioned diffraction peaks. In a more preferred embodiment, the crystalline form is characterized by having three of the aforementioned diffraction peaks. In one preferred embodiment, the crystalline form is characterized by having four or more of the aforementioned diffraction peaks. In a more preferred embodiment, the crystalline form is characterized by having four of the aforementioned diffraction peaks.

In one preferred embodiment, the crystalline form is characterized by having five or more of the aforementioned diffraction peaks. In a more preferred embodiment, the crystalline form is characterized by having five of the aforementioned diffraction peaks.

In one preferred embodiment, the crystalline form is characterized by having six or more of the aforementioned diffraction peaks. In a more preferred embodiment, the crystalline form is characterized by having six of the aforementioned diffraction peaks.

In one preferred embodiment, the crystalline form is characterized by having seven or more of the aforementioned diffraction peaks. In a more preferred embodiment, the crystalline form is characterized by having seven of the aforementioned diffraction peaks.

In one preferred embodiment, the crystalline form is characterized by having eight or more of the aforementioned diffraction peaks. In a more preferred embodiment, the crystalline form is characterized by having eight of the aforementioned diffraction peaks.

In one preferred embodiment, the crystalline form is characterized by having nine or more of the aforementioned diffraction peaks. In a more preferred embodiment, the crystalline form is characterized by having nine of the aforementioned diffraction peaks.

In one preferred embodiment, the crystalline form is characterized by having ten or more of the aforementioned diffraction peaks. In a more preferred embodiment, the crystalline form is characterized by having ten of the aforementioned diffraction peaks.

Preferably, the crystalline form is characterized by an x-ray powder diffraction pattern comprising two or more diffraction peaks at 2[theta] values selected from 8.32±0.2, 10.48±0.2, 11.83±0.2, 12.53±0.2, 16.02±0.2, 16.75±0.2, 18.19±0.2, 18.81±0.2, 19.49±0.2, 20.55±0.2, and 25.70±0.2. More preferably, the crystalline form is characterized by having three, four or five of the aforementioned diffraction peaks. More preferably, the crystalline form is characterized by having 6, 7, 8, 9 or 10 of the aforementioned diffraction peaks.

In one highly preferred embodiment, the crystalline form is characterized by an x-ray powder diffraction pattern in which the peak positions are substantially in accordance with the peak positions of the pattern shown in FIG. 25 or as listed in Table 1. Preferably, the crystalline form is characterized by having three, four, five or six diffraction peaks as shown in FIG. 25 or as listed in Table 1.

In one preferred embodiment, the crystalline form is characterized by a differential scanning calorimetry trace recorded at a heating rate of 20° C. per minute which shows a maximum endothermic peak at a temperature between about 265° C. and about 275° C., more preferably between about 268° C. and about 273° C.

In one highly preferred embodiment, the crystalline form is characterized by a differential scanning calorimetry trace substantially in accordance with that shown in FIG. 4.

In one preferred embodiment, the crystalline form is characterized by:

(a) an x-ray powder diffraction pattern having two or more diffraction peaks at 2[theta] values selected from 5.57±0.2, 6.19±0.2, 7.97±0.2, 8.32±0.2, 10.48±0.2, 10.72±0.2, 11.83±0.2, 12.53±0.2, 12.74±0.2, 13.34±0.2, 13.86±0.2, 14.69±0.2, 15.62±0.2, 16.02±0.2, 16.75±0.2, 17.02±0.2, 17.42±0.2, 18.19±0.2, 18.81±0.2, 19.08±0.2, 19.49±0.2, 19.83±0.2, 20.15±0.2, 20.55±0.2, 21.12±0.2, 22.82±0.2, 23.78±0.2, 24.68±0.2, 25.10±0.2, 25.70±0.2, 25.86±0.2, 26.86±0.2, 27.92±0.2, 28.53±0.2, 28.92±0.2, 29.71±0.2, 30.80±0.2, 31.56±0.2, 32.38±0.2, 32.98±0.2 and 34.13±0.2, or an x-ray powder diffraction pattern in which the peak positions are as shown in FIG. 25; and/or (b) a differential scanning calorimetry trace recorded at a heating rate of 20° C. per minute which shows a maximum endothermic peak at a temperature between about 265° C. and about 275° C., more preferably between about 268° C. and about 273° C., or a differential scanning calorimetry trace as shown in FIG. 4.

In one preferred embodiment, the crystalline form is characterized by (a) and (b) above.

Advantageously, the crystalline monohydrochloride monohydrate salt/co-crystal of compound (I) as defined herein is only slightly hygroscopic (as defined by the classification in Table 9; Hygroscopicity Classification adopted from Ph.Eur. and Sihorkar et al, Pharmaceutical Dev. & Technol. (2013), 18(2), 348-358).

In one preferred embodiment, the crystalline form is isolated. In one preferred embodiment, the crystalline form can be isolated by crystallisation.

In one embodiment, the crystalline form is substantially free of any other forms.

A further aspect of the invention relates to a crystalline form of compound (I) which is a hydrochloride salt, and which contains no more than about 20%, no more than about 10%, no more than about 5%, no more than about 2%, no more than about 1% or about 0% of any other crystalline forms of the hydrochloride salt of compound (I), for example, as measured by XRPD.

A further aspect of the invention relates to a crystalline form of compound (I) which is a monohydrochloride monohydrate salt, and which contains no more than about 20%, no more than about 10%, no more than about 5%, no more than about 2%, no more than about 1% or about 0% of any other crystalline forms of the monohydrochloride monohydrate salt of compound (I), for example, as measured by XRPD.

In one preferred embodiment, the crystalline form of the hydrochloride salt of compound (I) is obtained by a cooling method.

In one preferred embodiment, the invention relates to a process for preparing the hydrochloride salt of compound (I) in crystalline form, said process comprising crystallizing the hydrochloride salt from a solution of ethanol or an ethanol/THF mixture.

In one preferred embodiment, the invention relates to a process for preparing the hydrochloride salt of compound (I) in crystalline form, said process comprising treating a solution or suspension of compound (I) in free base form with HCl, and crystallising the product therefrom. Preferably, about 1 to about 1.2 equivalents of HCl are used relative to the compound of formula (I). Preferably, the HCl is in the form of a solution, more preferably, comprising ethanol or a mixture of ethanol/THF. Preferably, the compound of formula (I) is in the form of a solution or suspension comprising ethanol. In one preferred embodiment, the process comprises adding an antisolvent (preferably, ethyl acetate) to aid crystallisation. Preferably, the process comprises heating the mixture, followed by stepwise cooling as set out above in the detailed description.

More preferably, the invention relates to a process for preparing a crystalline form of the hydrochloride salt of compound (I), said process comprising the steps of:
(i) preparing a mixture comprising compound (I) and ethanol, and heating said mixture to at least about 70° C.;
(ii) preparing a solution of hydrochloric acid in ethanol or ethanol/THF, and charging to the mixture formed in step (i);
(iii) cooling the mixture formed in step (ii) to ambient temperature in a stepwise manner; and
(iv) isolating the crystalline form from the mixture.

In one preferred embodiment, EtOAc can be added as an antisolvent prior to the cooling step. Advantageously this can increase the yield. An antisolvent is a solvent in which the compound is insoluble, or sparingly soluble. The use of an antisolvent reduces the solubility of the solute in the solution and induces crystallization.

More preferably, step (iii) comprises:
(a) cooling the mixture formed in step (ii) to about 60° C. with agitation and holding at about 60° C. for at least 1 hour;
(b) cooling the mixture from step (iii) to about 40° C. with agitation and holding at about 40° C. for at least 1 hour; and
(c) cooling the mixture from step (iv) to ambient temperature and agitating at ambient temperature for at least 12 hours.

Preferably, the process comprises heating a mixture of compound (I) in ethanol to at least about 75° C., preparing a counter ion solution (e.g. HCl) in ethanol or ethanol/THF mixture and charging to the ethanol solution of compound (I), cooling in a stepwise manner to ambient temperature with agitation from about 75° C. to about 60° C. and holding for at least 2 hours, cooling to about 40° C. and holding for at least 2 hours, and then cooling to ambient temperature and agitating for at least 18 hours.

Preferably, the solid is isolated by filtration, more preferably vacuum filtration. Preferably, the isolated solid is dried in vacuo, preferably for at least 12 hours, or at least 24 hours, at temperature of at least 40° C., more preferably, at least 50° C.

Another aspect of the invention relates to a product obtainable by, or obtained by, the above process.

Malate Salt

In one preferred embodiment of the invention, the crystalline form is a co-crystal or salt formed by the interaction (or reaction) of compound (I) with L-malic acid.

In one preferred embodiment of the invention, the crystalline form is a malate salt of compound (I), more preferably, an L-malate salt. Preferably, the ratio of L-malate to compound (I) is 2:1, i.e. one molecule of compound (I) to two molecules of L-malic acid.

In one preferred embodiment, the the crystalline form is anhydrous.

In one preferred embodiment, the crystalline form is characterized by an x-ray powder diffraction pattern having two or more diffraction peaks at 2[theta] values selected from 4.48±0.2, 5.57±0.2, 5.89±0.2, 7.64±0.2, 9.02±0.2, 9.95±0.2, 10.20±0.2, 10.90±0.2, 12.20±0.2, 12.81±0.2, 13.47±0.2, 14.15±0.2, 14.69±0.2, 14.95±0.2, 15.67±0.2, 16.06±0.2, 17.91±0.2, 18.56±0.2, 19.25±0.2, 20.15±0.2, 20.65±0.2, 21.35±0.2, 21.94±0.2, 22.85±0.2, 24.07±0.2, 24.28±0.2, 24.98±0.2, 25.63±0.2, 26.82±0.2, 27.70±0.2, 29.25±0.2, 30.24±0.2, 31.28±0.2, 32.16±0.2, 33.03±0.2 and 34.47±0.2.

More preferably, the crystalline form is characterized by having three or more, four or more, five or more, or six or more of the aforementioned diffraction peaks. More preferably, the crystalline form is characterized by having 7, 8, 9, 10, 11, 12, 13, 14, 15, 16, 17, 18, 19, 20 . . . 35 or more of the aforementioned diffraction peaks.

More preferably, the crystalline form is characterized by having three, four or five of the aforementioned diffraction peaks.

In a more preferred embodiment, the crystalline form is characterized by having two of the aforementioned diffraction peaks.

In one preferred embodiment, the crystalline form is characterized by having three or more of the aforementioned diffraction peaks. In a more preferred embodiment, the crystalline form is characterized by having three of the aforementioned diffraction peaks.

In one preferred embodiment, the crystalline form is characterized by having four or more of the aforementioned diffraction peaks. In a more preferred embodiment, the crystalline form is characterized by having four of the aforementioned diffraction peaks.

In one preferred embodiment, the crystalline form is characterized by having five or more of the aforementioned diffraction peaks. In a more preferred embodiment, the crystalline form is characterized by having five of the aforementioned diffraction peaks.

In one preferred embodiment, the crystalline form is characterized by having six or more of the aforementioned diffraction peaks. In a more preferred embodiment, the crystalline form is characterized by having six of the aforementioned diffraction peaks.

In one preferred embodiment, the crystalline form is characterized by having seven or more of the aforementioned diffraction peaks. In a more preferred embodiment, the crystalline form is characterized by having seven of the aforementioned diffraction peaks.

In one preferred embodiment, the crystalline form is characterized by having eight or more of the aforementioned diffraction peaks. In a more preferred embodiment, the crystalline form is characterized by having eight of the aforementioned diffraction peaks.

In one preferred embodiment, the crystalline form is characterized by having nine or more of the aforementioned diffraction peaks. In a more preferred embodiment, the crystalline form is characterized by having nine of the aforementioned diffraction peaks.

In one preferred embodiment, the crystalline form is characterized by having ten or more of the aforementioned diffraction peaks. In a more preferred embodiment, the crystalline form is characterized by having ten of the aforementioned diffraction peaks.

Preferably, the crystalline form is characterized by an x-ray powder diffraction pattern comprising two or more diffraction peaks at 2[theta] values selected from 14.69±0.2, 14.95±0.2, 16.06±0.2, 17.91±0.2, 18.56±0.2, 19.25±0.2, 20.15±0.2, 21.94±0.2, 24.07±0.2 and 24.28±0.2. More preferably, the crystalline form is characterized by having three, four or five of the aforementioned diffraction peaks. More preferably, the crystalline form is characterized by having 6, 7, 8, 9 or 10 of the aforementioned diffraction peaks.

In one highly preferred embodiment, the crystalline form is characterized by an x-ray powder diffraction pattern in which the peak positions are substantially in accordance with the peak positions of the pattern shown in FIG. 26 or as listed in Table 2. Preferably, the crystalline form is characterized by having three, four, five or six diffraction peaks as shown in FIG. 26 or as listed in Table 2.

In one preferred embodiment, the crystalline form is characterized by a differential scanning calorimetry trace recorded at a heating rate of 20° C. per minute which shows a maximum endothermic peak at a temperature between about 185° C. and about 190° C. and a second broader peak at about 220° C. Preferably, the maximum endothermic peak at is at a temperature between about 186° C. and about 189° C., more preferably about 188° C.

In one highly preferred embodiment, the crystalline form is characterized by a differential scanning calorimetry trace substantially in accordance with that shown in FIG. 6.

In one preferred embodiment, the crystalline form is characterized by:
(a) an x-ray powder diffraction pattern having two or more diffraction peaks at 2[theta] values selected from 4.48±0.2, 5.57±0.2, 5.89±0.2, 7.64±0.2, 9.02±0.2, 9.95±0.2, 10.20±0.2, 10.90±0.2, 12.20±0.2, 12.81±0.2, 13.47±0.2, 14.15±0.2, 14.69±0.2, 14.95±0.2, 15.67±0.2, 16.06±0.2, 17.91±0.2, 18.56±0.2, 19.25±0.2, 20.15±0.2, 20.65±0.2, 21.35±0.2, 21.94±0.2, 22.85±0.2, 24.07±0.2, 24.28±0.2, 24.98±0.2, 25.63±0.2, 26.82±0.2, 27.70±0.2, 29.25±0.2, 30.24±0.2, 31.28±0.2, 32.16±0.2, 33.03±0.2 and 34.47±0.2, or an x-ray powder diffraction pattern in which the peak positions are as shown in FIG. 26; and/or
(b) a differential scanning calorimetry trace recorded at a heating rate of 20° C. per minute which shows a maximum endothermic peak at a temperature between about 185° C. and about 190° C. and a second broader peak at about 220° C., or a differential scanning calorimetry trace as shown in FIG. 6.

In one preferred embodiment, the crystalline form is characterized by (a) and (b) above.

Advantageously, the crystalline L-malate salt/co-crystal of compound (I) as defined herein is only slightly hygroscopic (as defined by the classification in Table 9; Hygroscopicity Classification adopted from Ph.Eur. and Sihorkar et al, Pharmaceutical Dev. & Technol. (2013), 18(2), 348-358).

In one preferred embodiment, the crystalline form is isolated. In one preferred embodiment, the crystalline form can be isolated by crystallisation.

In one embodiment, the crystalline form is substantially free of any other forms.

A further aspect of the invention relates to a crystalline form of compound (I) which is an L-malate salt, and which contains no more than about 20%, no more than about 10%, no more than about 5%, no more than about 2%, no more than about 1% or about 0% of any other crystalline forms of the L-malate salt of compound (I), for example, as measured by XRPD.

In one preferred embodiment, the crystalline form of the L-malate salt of compound (I) is obtained by a cooling method.

In one preferred embodiment, the invention relates to a process for preparing the L-malate salt of compound (I) in crystalline form, said process comprising treating a solution or suspension of compound (I) in free base form with L-malic acid, and crystallising the product therefrom. Preferably, about 2 to about 2.5, or about 2 to about 2.2, or about 2.2 equivalents of L-malic acid are used relative to the compound of formula (I). Preferably, the L-malic acid is in the form of a solution, more preferably, comprising ethanol or a mixture of ethanol/THF. Preferably, the compound of formula (I) is in the form of a solution or suspension comprising ethanol. In one preferred embodiment, the process comprises adding an antisolvent (preferably, ethyl acetate) to aid crystallisation. Preferably, the process comprises heating the mixture, followed by stepwise cooling as set out above in the detailed description.

In one preferred embodiment, the invention relates to a process for preparing the L-malate salt of compound (I) in crystalline form, said process comprising crystallizing the L-malate salt from a solution of ethanol or an ethanol/THF mixture.

More preferably, the invention relates to a process for preparing a crystalline form of the L-malate salt of compound (I), said process comprising the steps of:
(i) preparing a mixture comprising compound (I) and ethanol, and heating said mixture to at least about 70° C.;
(ii) preparing a solution of L-malic acid in ethanol or ethanol/THF, and charging to the mixture formed in step (i);
(iii) cooling the mixture formed in step (ii) to ambient temperature in a stepwise manner; and
(iv) isolating the crystalline form from the mixture.

More preferably, step (iii) comprises:
(a) cooling the mixture formed in step (ii) to about 60° C. with agitation and holding at about 60° C. for at least 1 hour;
(b) cooling the mixture from step (iii) to about 40° C. with agitation and holding at about 40° C. for at least 1 hour; and
(c) cooling the mixture from step (iv) to ambient temperature and agitating at ambient temperature for at least 12 hours.

Preferably, the cooling conditions are as defined above for the hydrochloride salt (more specifically, the monohydrochloride monohydrate salt).

Preferably, the solid is isolated by filtration, more preferably vacuum filtration. Preferably the isolated solid is dried in vacuo, preferably for at least 12 hours, or at least 24 hours, at temperature of at least 40° C., more preferably, at least 50° C.

Another aspect of the invention relates to a product obtainable by, or obtained by, the above process.

Succinate Salt

In one preferred embodiment of the invention, the crystalline form is a co-crystal or salt formed by the interaction (or reaction) of compound (I) with succinic acid.

In one preferred embodiment of the invention, the crystalline form is a succinate salt of compound (I). Preferably, the ratio of succinate to compound (I) is 2:1, i.e. one molecule of compound (I) to two molecules of succinic acid.

In one preferred embodiment, the the crystalline form is anhydrous.

In one preferred embodiment, the crystalline form is characterized by an x-ray powder diffraction pattern having two or more diffraction peaks at 2[theta] values selected from 3.16±0.2, 5.47±0.2, 9.01±0.2, 10.10±0.2, 11.45±0.2, 12.12±0.2, 12.94±0.2, 13.17±0.2, 14.19±0.2, 14.43±0.2, 14.67±0.2, 15.08±0.2, 15.51±0.2, 15.69±0.2, 16.76±0.2, 17.55±0.2, 17.69±0.2, 18.54±0.2, 18.95±0.2, 19.52±0.2, 19.84±0.2, 20.30±0.2, 20.45±0.2, 21.04±0.2, 21.36±0.2, 21.83±0.2, 22.12±0.2, 22.76±0.2, 23.11±0.2, 23.44±0.2, 23.96±0.2, 24.60±0.2, 24.98±0.2, 25.21±0.2, 25.44±0.2, 25.61±0.2, 25.83±0.2, 26.18±0.2, 26.57±0.2, 26.89±0.2, 27.36±0.2, 27.72±0.2, 28.63±0.2, 29.23±0.2, 29.99±0.2, 30.44±0.2, 30.66±0.2, 31.36±0.2, 31.99±0.2, 32.33±0.2, 32.77±0.2, 33.11±0.2, 33.53±0.2, 34.05±0.2 and 34.50±0.2.

More preferably, the crystalline form is characterized by having three or more, four or more, five or more, or six or more of the aforementioned diffraction peaks. More preferably, the crystalline form is characterized by having 7, 8, 9, 10, 11, 12, 13, 14, 15, 16, 17, 18, 19, 20 . . . 54 or more of the aforementioned diffraction peaks.

More preferably, the crystalline form is characterized by having three, four or five of the aforementioned diffraction peaks.

In a more preferred embodiment, the crystalline form is characterized by having two of the aforementioned diffraction peaks.

In one preferred embodiment, the crystalline form is characterized by having three or more of the aforementioned diffraction peaks. In a more preferred embodiment, the crystalline form is characterized by having three of the aforementioned diffraction peaks.

In one preferred embodiment, the crystalline form is characterized by having four or more of the aforementioned diffraction peaks. In a more preferred embodiment, the crystalline form is characterized by having four of the aforementioned diffraction peaks.

In one preferred embodiment, the crystalline form is characterized by having five or more of the aforementioned diffraction peaks. In a more preferred embodiment, the crystalline form is characterized by having five of the aforementioned diffraction peaks.

In one preferred embodiment, the crystalline form is characterized by having six or more of the aforementioned diffraction peaks. In a more preferred embodiment, the crystalline form is characterized by having six of the aforementioned diffraction peaks.

In one preferred embodiment, the crystalline form is characterized by having seven or more of the aforementioned diffraction peaks. In a more preferred embodiment, the crystalline form is characterized by having seven of the aforementioned diffraction peaks.

In one preferred embodiment, the crystalline form is characterized by having eight or more of the aforementioned diffraction peaks. In a more preferred embodiment, the crystalline form is characterized by having eight of the aforementioned diffraction peaks.

In one preferred embodiment, the crystalline form is characterized by having nine or more of the aforementioned diffraction peaks. In a more preferred embodiment, the crystalline form is characterized by having nine of the aforementioned diffraction peaks.

In one preferred embodiment, the crystalline form is characterized by having ten or more of the aforementioned diffraction peaks. In a more preferred embodiment, the crystalline form is characterized by having ten of the aforementioned diffraction peaks.

Preferably, the crystalline form is characterized by an x-ray powder diffraction pattern comprising two or more diffraction peaks at 2[theta] values selected from 10.10±0.2, 14.67±0.2, 15.08±0.2, 15.51±0.2, 15.69±0.2, 17.55±0.2, 18.54±0.2, 18.94±0.2, 19.52±0.2 and 21.83±0.2. More preferably, the crystalline form is characterized by having three, four or five of the aforementioned diffraction peaks. More preferably, the crystalline form is characterized by having 6, 7, 8, 9 or 10 of the aforementioned diffraction peaks.

In one highly preferred embodiment, the crystalline form is characterized by an x-ray powder diffraction pattern in which the peak positions are substantially in accordance with the peak positions of the pattern shown in FIG. 27 or as listed in Table 3. Preferably, the crystalline form is characterized by having three, four, five or six diffraction peaks as shown in FIG. 27 or as listed in Table 3.

In one preferred embodiment, the crystalline form is characterized by a differential scanning calorimetry trace recorded at a heating rate of 20° C. per minute which shows a maximum endothermic peak at a temperature between about 185° C. and about 190° C. Preferably, the maximum endothermic peak at is at a temperature between about 187° C. and about 190° C., more preferably about 189° C.

In one highly preferred embodiment, the crystalline form is characterized by a differential scanning calorimetry trace substantially in accordance with that shown in FIG. 10.

In one preferred embodiment, the crystalline form is characterized by:

(a) an x-ray powder diffraction pattern having two or more diffraction peaks at 2[theta] values selected from 3.16±0.2, 5.47±0.2, 9.01±0.2, 10.10±0.2, 11.45±0.2, 12.12±0.2, 12.94±0.2, 13.17±0.2, 14.19±0.2, 14.43±0.2, 14.67±0.2, 15.08±0.2, 15.51±0.2, 15.69±0.2, 16.76±0.2, 17.55±0.2, 17.69±0.2, 18.54±0.2, 18.95±0.2, 19.52±0.2, 19.84±0.2, 20.30±0.2, 20.45±0.2, 21.04±0.2, 21.36±0.2, 21.83±0.2, 22.12±0.2, 22.76±0.2, 23.11±0.2, 23.44±0.2, 23.96±0.2, 24.60±0.2, 24.98±0.2, 25.21±0.2, 25.44±0.2, 25.61±0.2, 25.83±0.2, 26.18±0.2, 26.57±0.2, 26.89±0.2, 27.36±0.2, 27.72±0.2, 28.63±0.2, 29.23±0.2, 29.99±0.2, 30.44±0.2, 30.66±0.2, 31.36±0.2, 31.99±0.2, 32.33±0.2, 32.77±0.2, 33.11±0.2, 33.53±0.2, 34.05±0.2 and 34.50±0.2, or an x-ray powder diffraction pattern in which the peak positions are as shown in FIG. 27; and/or (b) a differential scanning calorimetry trace recorded at a heating rate of 20° C. per minute which shows a maximum endothermic peak at a temperature between about 185° C. and about 190° C., or a differential scanning calorimetry trace as shown in FIG. 10.

In one preferred embodiment, the crystalline form is characterized by (a) and (b) above.

Advantageously, the crystalline succinate salt/co-crystal of compound (I) as defined herein is only slightly hygroscopic (as defined by the classification in Table 9; Hygroscopicity Classification adopted from Ph.Eur. and Sihorkar et al, Pharmaceutical Dev. & Technol. (2013), 18(2), 348-358).

In one preferred embodiment, the crystalline form is isolated. In one preferred embodiment, the crystalline form can be isolated by crystallisation.

In one embodiment, the crystalline form is substantially free of any other forms.

A further aspect of the invention relates to a crystalline form of compound (I) which is a succinate salt, and which contains no more than about 20%, no more than about 10%, no more than about 5%, no more than about 2%, no more than about 1% or about 0% of any other crystalline forms of the succinate salt of compound (I), for example, as measured by XRPD.

In one preferred embodiment, the crystalline form of the succinate salt of compound (I) is obtained by a cooling method.

In one preferred embodiment, the invention relates to a process for preparing the succinate salt of compound (I) in crystalline form, said process comprising treating a solution or suspension of compound (I) in free base form with succinic acid, and crystallising the product therefrom. Preferably, about 2 to about 2.5, or about 2 to about 2.2, or about 2.2 equivalents of succinic acid are used relative to the compound of formula (I). Preferably, the succinic acid is in the form of a solution, more preferably, comprising ethanol or a mixture of ethanol/THF. Preferably, the compound of formula (I) is in the form of a solution or suspension comprising ethanol. In one preferred embodiment, the process comprises adding an antisolvent (preferably, ethyl acetate) to aid crystallisation. Preferably, the process comprises heating the mixture, followed by stepwise cooling as set out above in the detailed description.

In one preferred embodiment, the invention relates to a process for preparing the succinate salt of compound (I) in crystalline form, said process comprising crystallizing the succinate salt from a solution of ethanol or an ethanol/THF mixture.

More preferably, the invention relates to a process for preparing a crystalline form of the succinate salt of compound (I), said process comprising the steps of:
(i) preparing a mixture comprising compound (I) and ethanol, and heating said mixture to at least about 70° C.;
(ii) preparing a solution of succinic acid in ethanol or ethanol/THF, and charging to the mixture formed in step (i);
(iii) cooling the mixture formed in step (ii) to ambient temperature in a stepwise manner; and
(iv) isolating the crystalline form from the mixture.

More preferably, step (iii) comprises:
(a) cooling the mixture formed in step (ii) to about 60° C. with agitation and holding at about 60° C. for at least 1 hour;
(b) cooling the mixture from step (iii) to about 40° C. with agitation and holding at about 40° C. for at least 1 hour; and
(c) cooling the mixture from step (iv) to ambient temperature and agitating at ambient temperature for at least 12 hours.

Preferably, the cooling conditions are as defined above for the hydrochloride salt (more specifically, the monohydrochloride monohydrate salt).

Preferably, the solid is isolated by filtration, more preferably vacuum filtration. Preferably the isolated solid is dried in vacuo, preferably for at least 12 hours, or at least 24 hours, at temperature of at least 40° C., more preferably, at least 50° C.

Another aspect of the invention relates to a product obtainable by, or obtained by, the above process.

Maleate Salt

In one preferred embodiment of the invention, the crystalline form is a co-crystal or salt formed by the interaction (or reaction) of compound (I) with maleic acid.

In one preferred embodiment of the invention, the crystalline form is a maleate salt of compound (I). Preferably, the ratio of maleate to compound (I) is 2:1, i.e. one molecule of compound (I) to two molecules of maleic acid.

In one preferred embodiment, the the crystalline form is anhydrous.

In one preferred embodiment, the crystalline form is characterized by an x-ray powder diffraction pattern having two or more diffraction peaks at 2[theta] values selected from 4.16±0.2, 5.48±0.2, 7.78±0.2, 9.10±0.2, 9.92±0.2, 10.45±0.2, 10.74±0.2, 11.47±0.2, 12.01±0.2, 12.57±0.2, 13.11±0.2, 14.24±0.2, 14.86±0.2, 15.17±0.2, 15.76±0.2, 16.28±0.2, 16.68±0.2, 17.22±0.2, 17.94±0.2, 18.13±0.2, 18.25±0.2, 18.71±0.2, 19.04±0.2, 19.47±0.2, 19.71±0.2, 20.11±0.2, 20.81±0.2, 21.75±0.2, 21.96±0.2, 22.63±0.2, 23.57±0.2, 24.21±0.2, 24.88±0.2, 25.28±0.2, 25.83±0.2, 26.33±0.2, 26.93±0.2, 27.33±0.2, 27.62±0.2, 28.25±0.2, 29.07±0.2, 30.63±0.2, 31.28±0.2, 31.66±0.2, 31.97±0.2, 32.76±0.2, 33.29±0.2, 33.81±0.2 and 34.31±0.2.

More preferably, the crystalline form is characterized by having three or more, four or more, five or more, or six or more of the aforementioned diffraction peaks. More preferably, the crystalline form is characterized by having 7, 8, 9, 10, 11, 12, 13, 14, 15, 16, 17, 18, 19, 20 . . . 48 or more of the aforementioned diffraction peaks.

More preferably, the crystalline form is characterized by having three, four or five of the aforementioned diffraction peaks.

In a more preferred embodiment, the crystalline form is characterized by having two of the aforementioned diffraction peaks.

In one preferred embodiment, the crystalline form is characterized by having three or more of the aforementioned diffraction peaks. In a more preferred embodiment, the crystalline form is characterized by having three of the aforementioned diffraction peaks.

In one preferred embodiment, the crystalline form is characterized by having four or more of the aforementioned diffraction peaks. In a more preferred embodiment, the crystalline form is characterized by having four of the aforementioned diffraction peaks.

In one preferred embodiment, the crystalline form is characterized by having five or more of the aforementioned diffraction peaks. In a more preferred embodiment, the crystalline form is characterized by having five of the aforementioned diffraction peaks.

In one preferred embodiment, the crystalline form is characterized by having six or more of the aforementioned diffraction peaks. In a more preferred embodiment, the crystalline form is characterized by having six of the aforementioned diffraction peaks.

In one preferred embodiment, the crystalline form is characterized by having seven or more of the aforementioned diffraction peaks. In a more preferred embodiment, the crystalline form is characterized by having seven of the aforementioned diffraction peaks.

In one preferred embodiment, the crystalline form is characterized by having eight or more of the aforementioned diffraction peaks. In a more preferred embodiment, the crystalline form is characterized by having eight of the aforementioned diffraction peaks.

In one preferred embodiment, the crystalline form is characterized by having nine or more of the aforementioned diffraction peaks. In a more preferred embodiment, the crystalline form is characterized by having nine of the aforementioned diffraction peaks.

In one preferred embodiment, the crystalline form is characterized by having ten or more of the aforementioned diffraction peaks. In a more preferred embodiment, the crystalline form is characterized by having ten of the aforementioned diffraction peaks.

Preferably, the crystalline form is characterized by an x-ray powder diffraction pattern comprising two or more diffraction peaks at 2[theta] values selected from 9.92±0.2, 14.86±0.2, 15.76±0.2, 17.94±0.2, 18.13±0.2, 18.25±0.2, 19.04±0.2, 19.47±0.2, 19.71±0.2 and 24.21±0.2. More preferably, the crystalline form is characterized by having three, four or five of the aforementioned diffraction peaks. More preferably, the crystalline form is characterized by having 6, 7, 8, 9 or 10 of the aforementioned diffraction peaks.

In one highly preferred embodiment, the crystalline form is characterized by an x-ray powder diffraction pattern in which the peak positions are substantially in accordance with the peak positions of the pattern shown in FIG. 28 or as listed in Table 4. Preferably, the crystalline form is characterized by having three, four, five or six diffraction peaks as shown in FIG. 28 or as listed in Table 4.

In one preferred embodiment, the crystalline form is characterized by a differential scanning calorimetry trace recorded at a heating rate of 20° C. per minute which shows a maximum endothermic peak at a temperature between about 200° C. and about 205° C. Preferably, the maximum endothermic peak at is at a temperature between about 202° C. and about 205° C., more preferably about 204° C.

In one highly preferred embodiment, the crystalline form is characterized by a differential scanning calorimetry trace substantially in accordance with that shown in FIG. 14.

In one preferred embodiment, the crystalline form is characterized by:

(a) an x-ray powder diffraction pattern having two or more diffraction peaks at 2[theta] values selected from 4.16±0.2, 5.48±0.2, 7.78±0.2, 9.10±0.2, 9.92±0.2, 10.45±0.2, 10.74±0.2, 11.47±0.2, 12.01±0.2, 12.57±0.2, 13.11±0.2, 14.24±0.2, 14.86±0.2, 15.17±0.2, 15.76±0.2, 16.28±0.2, 16.68±0.2, 17.22±0.2, 17.94±0.2, 18.13±0.2, 18.25±0.2, 18.71±0.2, 19.04±0.2, 19.47±0.2, 19.71±0.2, 20.11±0.2, 20.81±0.2, 21.75±0.2, 21.96±0.2, 22.63±0.2, 23.57±0.2, 24.21±0.2, 24.88±0.2, 25.28±0.2, 25.83±0.2, 26.33±0.2, 26.93±0.2, 27.33±0.2, 27.62±0.2, 28.25±0.2, 29.07±0.2, 30.63±0.2, 31.28±0.2, 31.66±0.2, 31.97±0.2, 32.76±0.2, 33.29±0.2, 33.81±0.2 and 34.31±0.2, or an x-ray powder diffraction pattern in which the peak positions are as shown in FIG. 28; and/or (b) a differential scanning calorimetry trace recorded at a heating rate of 20° C. per minute which shows a maximum endothermic peak at a temperature between about 200° C. and about 205° C., or a differential scanning calorimetry trace as shown in FIG. 14.

In one preferred embodiment, the crystalline form is characterized by (a) and (b) above.

Advantageously, the crystalline maleate salt/co-crystal of compound (I) as defined herein is only slightly hygroscopic (as defined by the classification in Table 9; Hygroscopicity Classification adopted from Ph.Eur. and Sihorkar et al, Pharmaceutical Dev. & Technol. (2013), 18(2), 348-358).

In one preferred embodiment, the crystalline form is isolated. In one preferred embodiment, the crystalline form can be isolated by crystallisation.

In one embodiment, the crystalline form is substantially free of any other forms.

A further aspect of the invention relates to a crystalline form of compound (I) which is a maleate salt, and which contains no more than about 20%, no more than about 10%, no more than about 5%, no more than about 2%, no more than about 1% or about 0% of any other crystalline forms of the maleate salt of compound (I), for example, as measured by XRPD.

In one preferred embodiment, the crystalline form of the maleate salt of compound (I) is obtained by a cooling method.

In one preferred embodiment, the invention relates to a process for preparing the maleate salt of compound (I) in crystalline form, said process comprising treating a solution or suspension of compound (I) in free base form with maleic acid, and crystallising the product therefrom. Preferably, about 2 to about 2.5, or about 2 to about 2.2, or about 2.2 equivalents of maleic acid are used relative to the compound of formula (I). Preferably, the maleic acid is in the form of a solution, more preferably, comprising ethanol or a mixture of ethanol/THF. Preferably, the compound of formula (I) is in the form of a solution or suspension comprising ethanol.

In one preferred embodiment, the process comprises adding an antisolvent (preferably, ethyl acetate) to aid crystallisation. Preferably, the process comprises heating the mixture, followed by stepwise cooling as set out above in the detailed description.

In one preferred embodiment, the invention relates to a process for preparing the maleate salt of compound (I) in crystalline form, said process comprising crystallizing the maleate salt from a solution of ethanol or an ethanol/THF mixture.

More preferably, the invention relates to a process for preparing a crystalline form of the maleate salt of compound (I), said process comprising the steps of:

(i) preparing a mixture comprising compound (I) and ethanol, and heating said mixture to at least about 70° C.;

(ii) preparing a solution of maleic acid in ethanol or ethanol/THF, and charging to the mixture formed in step (i);

(iii) cooling the mixture formed in step (ii) to ambient temperature in a stepwise manner; and (iv) isolating the crystalline form from the mixture.

More preferably, step (iii) comprises:

(a) cooling the mixture formed in step (ii) to about 60° C. with agitation and holding at about 60° C. for at least 1 hour;

(b) cooling the mixture from step (iii) to about 40° C. with agitation and holding at about 40° C. for at least 1 hour; and (c) cooling the mixture from step (iv) to ambient temperature and agitating at ambient temperature for at least 12 hours.

Preferably, the cooling conditions are as defined above for the hydrochloride salt (more specifically, the monohydrochloride monohydrate salt).

Preferably, the solid is isolated by filtration, more preferably vacuum filtration. Preferably the isolated solid is dried in vacuo, preferably for at least 12 hours, or at least 24 hours, at temperature of at least 40° C., more preferably, at least 50° C.

Another aspect of the invention relates to a product obtainable by, or obtained by, the above process.

Hydrobromide Salt

In one preferred embodiment of the invention, the crystalline form is a co-crystal or salt formed by the interaction (or reaction) of compound (I) with hydrobromic acid.

In one preferred embodiment of the invention, the crystalline form is hydrobromide salt of compound (I), more preferably, a monohydrobromide monohydrate salt.

In one preferred embodiment, the crystalline form is characterized by an x-ray powder diffraction pattern having two or more diffraction peaks at 2[theta] values selected from 4.23±0.2, 5.38±0.2, 5.66±0.2, 8.11±0.2, 8.31±0.2, 8.61±0.2, 10.02±0.2, 10.45±0.2, 10.75±0.2, 11.32±0.2, 11.98±0.2, 12.45±0.2, 12.60±0.2, 13.10±0.2, 13.94±0.2, 14.71±0.2, 15.76±0.2, 15.91±0.2, 16.26±0.2, 16.72±0.2, 17.00±0.2, 17.24±0.2, 17.64±0.2, 17.97±0.2, 18.91±0.2, 19.19±0.2, 19.51±0.2, 19.76±0.2, 20.05±0.2, 20.19±0.2, 20.77±0.2, 21.53±0.2, 22.07±0.2, 22.60±0.2, 23.14±0.2, 23.47±0.2, 24.16±0.2, 24.62±0.2, 25.21±0.2, 25.41±0.2, 25.85±0.2, 26.57±0.2, 26.76±0.2, 27.39±0.2, 28.32±0.2, 28.89±0.2, 29.58±0.2, 30.33±0.2, 31.28±0.2, 31.79±0.2, 32.25±0.2, 32.85±0.2, 33.36±0.2, 33.83±0.2 and 34.20±0.2.

More preferably, the crystalline form is characterized by having three or more, four or more, five or more, or six or more of the aforementioned diffraction peaks. More preferably, the crystalline form is characterized by having 7, 8, 9, 10, 11, 12, 13, 14, 15, 16, 17, 18, 19, 20 . . . 54 or more of the aforementioned diffraction peaks.

More preferably, the crystalline form is characterized by having three, four or five of the aforementioned diffraction peaks.

In a more preferred embodiment, the crystalline form is characterized by having two of the aforementioned diffraction peaks.

In one preferred embodiment, the crystalline form is characterized by having three or more of the aforementioned diffraction peaks. In a more preferred embodiment, the crystalline form is characterized by having three of the aforementioned diffraction peaks.

In one preferred embodiment, the crystalline form is characterized by having four or more of the aforementioned diffraction peaks. In a more preferred embodiment, the crystalline form is characterized by having four of the aforementioned diffraction peaks.

In one preferred embodiment, the crystalline form is characterized by having five or more of the aforementioned diffraction peaks. In a more preferred embodiment, the crystalline form is characterized by having five of the aforementioned diffraction peaks.

In one preferred embodiment, the crystalline form is characterized by having six or more of the aforementioned diffraction peaks. In a more preferred embodiment, the crystalline form is characterized by having six of the aforementioned diffraction peaks.

In one preferred embodiment, the crystalline form is characterized by having seven or more of the aforementioned diffraction peaks. In a more preferred embodiment, the crystalline form is characterized by having seven of the aforementioned diffraction peaks.

In one preferred embodiment, the crystalline form is characterized by having eight or more of the aforementioned diffraction peaks. In a more preferred embodiment, the crystalline form is characterized by having eight of the aforementioned diffraction peaks.

In one preferred embodiment, the crystalline form is characterized by having nine or more of the aforementioned diffraction peaks. In a more preferred embodiment, the crystalline form is characterized by having nine of the aforementioned diffraction peaks.

In one preferred embodiment, the crystalline form is characterized by having ten or more of the aforementioned diffraction peaks. In a more preferred embodiment, the crystalline form is characterized by having ten of the aforementioned diffraction peaks.

Preferably, the crystalline form is characterized by an x-ray powder diffraction pattern comprising two or more diffraction peaks at 2[theta] values selected from 10.45±0.2, 10.75±0.2, 11.98±0.2, 16.72±0.2, 17.97±0.2, 18.91±0.2, 19.19±0.2, 19.51±0.2, 25.21±0.2 and 25.41±0.2. More preferably, the crystalline form is characterized by having three, four or five of the aforementioned diffraction peaks. More preferably, the crystalline form is characterized by having 6, 7, 8, 9 or 10 of the aforementioned diffraction peaks.

In one highly preferred embodiment, the crystalline form is characterized by an x-ray powder diffraction pattern in which the peak positions are substantially in accordance with the peak positions of the pattern shown in FIG. 29 or as listed in Table 5. Preferably, the crystalline form is characterized by having three, four, five or six diffraction peaks as shown in FIG. 29 or as listed in Table 5.

In one preferred embodiment, the crystalline form is characterized by a differential scanning calorimetry trace recorded at a heating rate of 20° C. per minute which shows a maximum endothermic peak at a temperature between about 248° C. and about 253° C. Preferably, the maximum endothermic peak at is at a temperature between about 249° C. and about 251° C., more preferably about 250° C.

In one highly preferred embodiment, the crystalline form is characterized by a differential scanning calorimetry trace substantially in accordance with that shown in FIG. 18.

In one preferred embodiment, the crystalline form is characterized by:

(a) an x-ray powder diffraction pattern having two or more diffraction peaks at 2[theta] values selected from 4.23±0.2, 5.38±0.2, 5.66±0.2, 8.11±0.2, 8.31±0.2, 8.61±0.2, 10.02±0.2, 10.45±0.2, 10.75±0.2, 11.32±0.2, 11.98±0.2, 12.45±0.2, 12.60±0.2, 13.10±0.2, 13.94±0.2, 14.71±0.2, 15.76±0.2, 15.91±0.2, 16.26±0.2, 16.72±0.2, 17.00±0.2, 17.24±0.2, 17.64±0.2, 17.97±0.2, 18.91±0.2, 19.19±0.2, 19.51±0.2, 19.76±0.2, 20.05±0.2, 20.19±0.2, 20.77±0.2, 21.53±0.2, 22.07±0.2, 22.60±0.2, 23.14±0.2, 23.47±0.2, 24.16±0.2, 24.62±0.2, 25.21±0.2, 25.41±0.2, 25.85±0.2, 26.57±0.2, 26.76±0.2, 27.39±0.2, 28.32±0.2, 28.89±0.2, 29.58±0.2, 30.33±0.2, 31.28±0.2, 31.79±0.2, 32.25±0.2, 32.85±0.2, 33.36±0.2, 33.83±0.2 and 34.20±0.2, or an x-ray powder diffraction pattern in which the peak positions are as shown in FIG. 29; and/or (b) a differential scanning calorimetry trace recorded at a heating rate of 20° C. per minute which shows a maximum endothermic peak at a temperature between about 248° C. and about 253° C., or a differential scanning calorimetry trace as shown in FIG. 18.

In one preferred embodiment, the crystalline form is characterized by (a) and (b) above.

Advantageously, the crystalline hydrobromide salt/co-crystal of compound (I) as defined herein is only slightly hygroscopic (as defined by the classification in Table 9; Hygroscopicity Classification adopted from Ph.Eur. and Sihorkar et al, Pharmaceutical Dev. & Technol. (2013), 18(2), 348-358).

In one preferred embodiment, the crystalline form is isolated. In one preferred embodiment, the crystalline form can be isolated by crystallisation.

In one embodiment, the crystalline form is substantially free of any other forms.

A further aspect of the invention relates to a crystalline form of compound (I) which is a hydrobromide salt, and which contains no more than about 20%, no more than about 10%, no more than about 5%, no more than about 2%, no more than about 1% or about 0% of any other crystalline forms of the hydrobromide salt of compound (I), for example, as measured by XRPD.

A further aspect of the invention relates to a crystalline form of compound (I) which is a monohydrobromide monohydrate salt, and which contains no more than about 20%, no more than about 10%, no more than about 5%, no more than about 2%, no more than about 1% or about 0% of any other crystalline forms of the monohydrobromide monohydrate salt of compound (I), for example, as measured by XRPD.

In one preferred embodiment, the crystalline form of the hydrobromide salt of compound (I) is obtained by a cooling method.

In one preferred embodiment, the invention relates to a process for preparing the hydrobromide salt of compound (I) in crystalline form, said process comprising treating a solution or suspension of compound (I) in free base form with hydrobromic acid, and crystallising the product therefrom. Preferably, about 1 to about 1.2 equivalents of HBr are used relative to the compound of formula (I). Preferably, the hydrobromic acid is in the form of a solution, more preferably, comprising ethanol or a mixture of ethanol/THF. Preferably, the compound of formula (I) is in the form of a solution or suspension comprising ethanol. In one preferred embodiment, the process comprises adding an antisolvent (preferably, ethyl acetate) to aid crystallisation. Preferably, the process comprises heating the mixture, followed by stepwise cooling as set out above in the detailed description.

In one preferred embodiment, the invention relates to a process for preparing the hydrobromide salt of compound (I) in crystalline form, said process comprising crystallizing the hydrobromide salt from a solution of ethanol or an ethanol/THF mixture.

More preferably, the invention relates to a process for preparing a crystalline form of the hydrobromide salt of compound (I), said process comprising the steps of:
(i) preparing a mixture comprising compound (I) and ethanol, and heating said mixture to at least about 70° C.;
(ii) preparing a solution of hydrobromic acid in ethanol or ethanol/THF, and charging to the mixture formed in step (i);
(iii) cooling the mixture formed in step (ii) to ambient temperature in a stepwise manner; and
(iv) isolating the crystalline form from the mixture.
More preferably, step (iii) comprises:
(a) cooling the mixture formed in step (ii) to about 60° C. with agitation and holding at about 60° C. for at least 1 hour;
(b) cooling the mixture from step (iii) to about 40° C. with agitation and holding at about 40° C. for at least 1 hour; and
(c) cooling the mixture from step (iv) to ambient temperature and agitating at ambient temperature for at least 12 hours.

Preferably, the cooling conditions are as defined above for the hydrochloride salt (more specifically, the monohydrochloride monohydrate salt).

Preferably, the solid is isolated by filtration, more preferably vacuum filtration. Preferably the isolated solid is dried in vacuo, preferably for at least 12 hours, or at least 24 hours, at temperature of at least 40° C., more preferably, at least 50° C.

Another aspect of the invention relates to a product obtainable by, or obtained by, the above process.

p-Toluenesulfonate Salt

In one preferred embodiment of the invention, the crystalline form is a co-crystal or salt formed by the interaction (or reaction) of compound (I) with p-toluenesulfonic acid.

In one preferred embodiment of the invention, the crystalline form is a p-toluenesulfonate salt of compound (I). Preferably, the ratio of compound (I) to p-toluenesulfonate is 1:1.

In one preferred embodiment, the the crystalline form is anhydrous.

In one preferred embodiment, the crystalline form is characterized by an x-ray powder diffraction pattern having two or more diffraction peaks at 2[theta] values selected from 5.56±0.2, 7.91±0.2, 8.15±0.2, 8.76±0.2, 10.10±0.2, 10.29±0.2, 10.42±0.2, 12.17±0.2, 12.56±0.2, 13.61±0.2, 13.82±0.2, 14.00±0.2, 14.65±0.2, 14.89±0.2, 15.00±0.2, 15.45±0.2, 15.92±0.2, 16.40±0.2, 16.66±0.2, 16.89±0.2, 17.03±0.2, 17.38±0.2, 17.63±0.2, 17.85±0.2, 18.29±0.2, 19.10±0.2, 19.42±0.2, 19.89±0.2, 20.14±0.2, 20.54±0.2, 20.73±0.2, 21.26±0.2, 21.65±0.2, 21.92±0.2, 22.47±0.2, 23.96±0.2, 24.77±0.2, 25.06±0.2, 25.60±0.2, 26.05±0.2, 26.57±0.2, 27.02±0.2, 27.26±0.2, 27.88±0.2, 28.27±0.2, 29.21±0.2, 29.79±0.2, 30.13±0.2, 31.44±0.2, 32.28±0.2, 34.03±0.2 and 34.67±0.2.

More preferably, the crystalline form is characterized by having three or more, four or more, five or more, or six or more of the aforementioned diffraction peaks. More preferably, the crystalline form is characterized by having 7, 8, 9, 10, 11, 12, 13, 14, 15, 16, 17, 18, 19, 20 . . . 51 or more of the aforementioned diffraction peaks.

More preferably, the crystalline form is characterized by having three, four or five of the aforementioned diffraction peaks.

In a more preferred embodiment, the crystalline form is characterized by having two of the aforementioned diffraction peaks.

In one preferred embodiment, the crystalline form is characterized by having three or more of the aforementioned diffraction peaks. In a more preferred embodiment, the crystalline form is characterized by having three of the aforementioned diffraction peaks.

In one preferred embodiment, the crystalline form is characterized by having four or more of the aforementioned diffraction peaks. In a more preferred embodiment, the crystalline form is characterized by having four of the aforementioned diffraction peaks.

In one preferred embodiment, the crystalline form is characterized by having five or more of the aforementioned diffraction peaks. In a more preferred embodiment, the crystalline form is characterized by having five of the aforementioned diffraction peaks.

In one preferred embodiment, the crystalline form is characterized by having six or more of the aforementioned diffraction peaks. In a more preferred embodiment, the crystalline form is characterized by having six of the aforementioned diffraction peaks.

In one preferred embodiment, the crystalline form is characterized by having seven or more of the aforementioned diffraction peaks. In a more preferred embodiment, the crystalline form is characterized by having seven of the aforementioned diffraction peaks.

In one preferred embodiment, the crystalline form is characterized by having eight or more of the aforementioned diffraction peaks. In a more preferred embodiment, the crystalline form is characterized by having eight of the aforementioned diffraction peaks.

In one preferred embodiment, the crystalline form is characterized by having nine or more of the aforementioned diffraction peaks. In a more preferred embodiment, the crystalline form is characterized by having nine of the aforementioned diffraction peaks.

In one preferred embodiment, the crystalline form is characterized by having ten or more of the aforementioned diffraction peaks. In a more preferred embodiment, the crystalline form is characterized by having ten of the aforementioned diffraction peaks.

Preferably, the crystalline form is characterized by an x-ray powder diffraction pattern comprising two or more diffraction peaks at 2[theta] values selected from 10.42±0.2, 12.17±0.2, 12.56±0.2, 17.63±0.2, 18.29±0.2, 19.10±0.2, 19.89±0.2, 20.14±0.2, 20.54±0.2 and 22.47±0.2. More preferably, the crystalline form is characterized by having three, four or five of the aforementioned diffraction peaks. More preferably, the crystalline form is characterized by having 6, 7, 8, 9 or 10 of the aforementioned diffraction peaks.

In one highly preferred embodiment, the crystalline form is characterized by an x-ray powder diffraction pattern in which the peak positions are substantially in accordance with the peak positions of the pattern shown in FIG. 30 or as listed in Table 6. Preferably, the crystalline form is characterized by having three, four, five or six diffraction peaks as shown in FIG. 30 or as listed in Table 6.

In one preferred embodiment, the crystalline form is characterized by a differential scanning calorimetry trace recorded at a heating rate of 20° C. per minute which shows a maximum endothermic peak at a temperature between about 235° C. and about 240° C. Preferably, the maximum endothermic peak at is at a temperature between about 238° C. and about 240° C., more preferably about 239° C.

In one highly preferred embodiment, the crystalline form is characterized by a differential scanning calorimetry trace substantially in accordance with that shown in FIG. 22.

In one preferred embodiment, the crystalline form is characterized by:
(a) an x-ray powder diffraction pattern having two or more diffraction peaks at 2[theta] values selected from 5.56±0.2, 7.91±0.2, 8.15±0.2, 8.76±0.2, 10.10±0.2, 10.29±0.2, 10.42±0.2, 12.17±0.2, 12.56±0.2, 13.61±0.2, 13.82±0.2, 14.00±0.2, 14.65±0.2, 14.89±0.2, 15.00±0.2, 15.45±0.2, 15.92±0.2, 16.40±0.2, 16.66±0.2, 16.89±0.2, 17.03±0.2, 17.38±0.2, 17.63±0.2, 17.85±0.2, 18.29±0.2, 19.10±0.2, 19.42±0.2, 19.89±0.2, 20.14±0.2, 20.54±0.2, 20.73±0.2, 21.26±0.2, 21.65±0.2, 21.92±0.2, 22.47±0.2, 23.96±0.2, 24.77±0.2, 25.06±0.2, 25.60±0.2, 26.05±0.2, 26.57±0.2, 27.02±0.2, 27.26±0.2, 27.88±0.2, 28.27±0.2, 29.21±0.2, 29.79±0.2, 30.13±0.2, 31.44±0.2, 32.28±0.2, 34.03±0.2 and 34.67±0.2, or an x-ray powder diffraction pattern in which the peak positions are as shown in FIG. 30; and/or
(b) a differential scanning calorimetry trace recorded at a heating rate of 20° C. per minute which shows a maximum endothermic peak at a temperature between about 235° C. and about 240° C., or a a differential scanning calorimetry trace as shown in FIG. 22.

In one preferred embodiment, the crystalline form is characterized by (a) and (b) above.

Advantageously, the crystalline p-toluenesulfonate salt/co-crystal of compound (I) as defined herein is only slightly hygroscopic (as defined by the classification in Table 9; Hygroscopicity Classification adopted from Ph.Eur. and Sihorkar et al, Pharmaceutical Dev. & Technol. (2013), 18(2), 348-358).

In one preferred embodiment, the crystalline form is isolated. In one preferred embodiment, the crystalline form can be isolated by crystallisation.

In one embodiment, the crystalline form is substantially free of any other forms.

A further aspect of the invention relates to a crystalline form of compound (I) which is a p-toluenesulfonate salt, and which contains no more than about 20%, no more than about 10%, no more than about 5%, no more than about 2%, no more than about 1% or about 0% of any other crystalline forms of the p-toluenesulfonate salt of compound (I), for example, as measured by XRPD.

In one preferred embodiment, the crystalline form of the p-toluenesulfonate salt of compound (I) is obtained by a cooling method.

In one preferred embodiment, the invention relates to a process for preparing the p-toluenesulfonate salt of compound (I) in crystalline form, said process comprising crystallizing the p-toluenesulfonate salt from a mixture of ethanol/THF.

In one preferred embodiment, the invention relates to a process for preparing the p-toluenesulfonate salt of compound (I) in crystalline form, said process comprising treating a solution or suspension of compound (I) in free base form with p-toluenesulfonic acid, and crystallising the product therefrom. Preferably, about 1 to about 1.2 equivalents of p-toluenesulfonic acid are used relative to the compound of formula (I). Preferably, the p-toluenesulfonic acid is in the form of a solution, more preferably, comprising ethanol or a mixture of ethanol/THF. Preferably, the compound of formula (I) is in the form of a solution or suspension comprising ethanol or a mixture of ethanol/THF. In one preferred embodiment, the process comprises adding an antisolvent (preferably, ethyl acetate) to aid crystallisation. Preferably, the process comprises heating the mixture, followed by stepwise cooling as set out above in the detailed description.

More preferably, the invention relates to a process for preparing a crystalline form of the p-toluenesulfonate salt of compound (I), said process comprising the steps of:
(i) preparing a mixture comprising compound (I), ethanol and THF, and heating with agitation to at least about 55° C.;
(ii) preparing a solution of p-toluenesulfonic acid in ethanol and charging to the mixture formed in step (i);
(iii) cooling the mixture formed in step (ii) to ambient temperature and agitating for at least about 48 hours;
(iv) reducing the volume of solvent of the mixture from step (iii) under a nitrogen stream to form a suspension and agitating for at least 1 hour;
(v) adding ethanol to the suspension of step (iv) and agitating for at least 12 hours; and
(vi) isolating the solid from step (v).

Preferably, the ratio of THF to EtOH is at least 3:1, more preferably, at least 4:1, more preferably at least 5:1, more preferably at least 6:1, more preferably at least 7:1, more preferably at least 8:1, more preferably at least 9:1, more preferably at least 10:1.

In one preferred embodiment, the ratio of THF to EtOH is about 3:1, more preferably, about 4:1, more preferably about 5:1, more preferably about 6:1, more preferably about 7:1, more preferably about 8:1, more preferably about 9:1, more preferably about 7.5:1.

More preferably, the process comprises the steps of:
(i) preparing a mixture comprising compound (I), ethanol and THF, and heating with agitation to at least about 60° C.;
(ii) preparing a solution of p-toluenesulfonic acid in ethanol and charging to the mixture formed in step (i);
(iii) cooling the mixture formed in step (ii) to ambient temperature and agitating for at least about 90 hours;

(iv) reducing the volume of solvent of the mixture from step (iii) under a nitrogen stream to form a suspension and agitating for at least 3 hours;
(v) adding ethanol to the suspension of step (iv) and agitating for at least 20 hours; and
(vi) isolating the solid from step (v).

Preferably, the solid is isolated by filtration, more preferably vacuum filtration. Preferably the isolated solid is dried in vacuo, preferably for at least 12 hours, or at least 24 hours, at temperature of at least 40° C., more preferably, at least 50° C.

Another aspect of the invention relates to a product obtainable by, or obtained by, the above process.

Therapeutic Use

Compound (I) has shown to exhibit potent inhibitory activity on polo-like kinase, more specifically PLK1, and is therefore believed to be of use in the treatment of proliferative disorders (such as cancer, leukaemia, lymphoma and alopecia), immune-mediated and inflammatory disorders (such as graft-versus-host disease (GvHD), transplant rejection and psoriasis), autoimmune and autoimmune-mediated disorders (such as Hashimoto's thyroiditis, pernicious anaemia, Addison's disease, type I diabetes, rheumatoid arthritis, systemic lupus erythematosus, dermatomyositis, Sjogren's syndrome, drug-induced lupus erythematosus, multiple sclerosis, myasthenia gravis, Reiter's syndrome and Grave's disease, pemphigus vulgaris), kidney disorders (such as glomerulonephritis, nephronophthisis and polycystic kidney disease), viral disorders (such as influenza virus, hepatitis B virus (HBV), hepatitis C virus (HCV), human cytomegalovirus (HCMV) and human immunodeficiency virus type 1 (HIV-1).

Thus, one aspect of the invention relates to a crystalline form, or pharmaceutical composition, as described herein for use in medicine or for use as a medicament.

Yet another aspect of the invention relates to a crystalline form, or pharmaceutical composition, as described herein for use in the prevention or treatment of a proliferative disorder.

Another aspect of the invention relates to the use of a crystalline form as described above in the preparation of a medicament for the prevention or treatment of a proliferative disorder.

Another aspect of the invention relates to a method for the prevention or treatment of a proliferative disorder, said method comprising administering a pharmacologically effective amount of a crystalline form, or pharmaceutical composition, as described herein to a subject in need thereof.

Preferably, the subject is a warm blooded animal, more preferably still, a mammal, even more preferably, a human.

As used herein the phrase "preparation of a medicament" includes the use of one or more of the above described forms directly as the medicament in addition to their use in a screening programme for further antiproliferative agents or in any stage of the manufacture of such a medicament.

One preferred embodiment relates to the use of one or more compounds of the invention in the treatment of proliferative disorders. Preferably, the proliferative disorder is a cancer, leukaemia or lymphoma. The term proliferative disorder is used herein in a broad sense to include any disorder that requires control of the cell cycle, for example genetic proliferative diseases such as polycystic kidney disease.

As defined herein, an anti-proliferative effect within the scope of the present invention may be demonstrated by the ability to inhibit cell proliferation in an in vitro whole cell assay. Using such assays it may be determined whether a compound is anti-proliferative in the context of the present invention.

In one preferred embodiment, the proliferative disorder is a solid tumour. Preferably, the solid tumour is a bladder cancer, bone cancer, brain or nerve cancer, prostate cancer, skin cancer, lung cancer, breast cancer, colorectal, ovarian or uterine cancer or eosophageal cancer.

In another preferred embodiment, the proliferative disorder is a haematological cancer. Preferably, the haematological cancer is leukaemia or lymphoma, more preferably, advanced leukaemias or myelodysplastic syndromes (MDS). Other examples include acute myelogenous leukaemia (AML), acute lymphocytic leukaemia (ALL) or chronic lymphocytic leukaemia (CLL).

In another preferred embodiment, the proliferative disorder is selected from glomerulonephritis, rheumatoid arthritis and psoriasis.

Another aspect of the invention relates to a crystalline form, or pharmaceutical composition, as described herein for use in the prevention or treatment of an immune-mediated or inflammatory disorder. More preferably, the disorder is selected from graft-versus-host disease (GvHD), transplant rejection and psoriasis.

Another aspect of the invention relates to a crystalline form, or pharmaceutical composition, as described herein for use in the prevention or treatment of an autoimmune or autoimmune-mediated disorder. More preferably, the disorder is selected from Hashimoto's thyroiditis, pernicious anaemia, Addison's disease, type I diabetes, rheumatoid arthritis, systemic lupus erythematosus, dermatomyositis, Sjogren's syndrome, drug-induced lupus erythematosus, multiple sclerosis, myasthenia gravis, Reiter's syndrome and Grave's disease, pemphigus vulgaris.

Another aspect of the invention relates to a crystalline form, or pharmaceutical composition, as described herein for use in the prevention or treatment of a kidney disorder. More preferably, the disorder selected from glomerulonephritis, nephronophthisis and polycystic kidney disease.

Another aspect of the invention relates to a crystalline form, or pharmaceutical composition, as described herein for use in the prevention or treatment of a viral disorder. More preferably, the disorder is selected from influenza virus, hepatitis B virus (HBV), hepatitis C virus (HCV), human cytomegalovirus (HCMV) and human immunodeficiency virus type 1 (HIV-1).

Pharmaceutical Composition

When crystalline forms of the invention are used as a medicament, preferably as an agent for treatment or prevention of proliferative disorders, the crystalline form can be administered alone, or as a mixture of the crystalline form with an appropriate pharmacologically acceptable excipient(s), and/or diluent(s) and/or carrier(s).

Another aspect of the invention therefore relates to a pharmaceutical composition comprising a crystalline form according as described above and a pharmaceutically acceptable diluent, excipient or carrier.

A further aspect relates to a process for preparing a pharmaceutical composition as described above, said process comprising admixing a crystalline form according to the invention with a pharmaceutically acceptable diluent, excipient or carrier.

Compositions according to the present invention can be in unit dosage form such as tablets, capsules, granules, powders, syrups, injections, ointments, solutions, suspensions, aerosols, troches or the like for oral, topical (e.g. for psoriasis) or parenteral administration.

The choice of pharmaceutical carrier, excipient or diluent can be selected with regard to the intended route of administration and standard pharmaceutical practice. The pharmaceutical compositions may comprise as, or in addition to, the carrier, excipient or diluent any suitable binder(s), lubricant(s), suspending agent(s), coating agent(s), solubilising agent(s). The pharmaceutical compositions may be for human or animal usage in human and veterinary medicine.

In one preferred embodiment, the pharmaceutical composition is in solid form.

The pharmaceutical compositions can be prepared in a known manner by using additives such as excipients, binding agents, disintegrating agents, lubricating agents, stabilizing agents, corrigents, suspending agents, diluents and solvents.

Examples of such suitable excipients for the various different forms of pharmaceutical compositions described herein may be found in the "Handbook of Pharmaceutical Excipients, $2^{nd}$ Edition, (1994), Edited by A Wade and P J Weller. An example of an excipient includes a sugar derivative such as lactose, sucrose, glucose, mannitol, or sorbitol; a starch derivative such as corn starch, potato starch, alpha-starch, dextrin, carboxy methylstarch; a cellulose derivative such as crystalline cellulose, low-substituted hydroxypropylcellulose, hydroxypropylmethylcellulose, carboxymethylcellulose, calcium carboxymethylcellulose, internal-cross-linked sodium carboxymethylcellulose; acacia; dextran; pullulan; a silicate derivative such as light silicic acid anhydride, synthetic aluminum silicate, magnesium aluminate metasilicate; a phosphate derivative such as calcium phosphate; a carbonate derivative such as calcium carbonate; a sulfate derivative such as calcium sulfate; or the like.

Acceptable carriers or diluents for therapeutic use are well known in the pharmaceutical art, and are described, for example, in Remington's Pharmaceutical Sciences, Mack Publishing Co. (A. R. Gennaro edit. 1985). Examples of suitable carriers include lactose, starch, glucose, methyl cellulose, magnesium stearate, mannitol, sorbitol and the like. Examples of suitable diluents include ethanol, glycerol and water.

An example of a disintegrating agent includes an excipient described hereinbefore, a chemically modified starch or cellulose derivative such as sodium cross-carmellose, sodium carboxymethylstarch, cross-linked polyvinylpyrrolidone or the like.

Preservatives, stabilizers, dyes and even flavoring agents may be provided in the pharmaceutical composition. Examples of preservatives include sodium benzoate, sorbic acid and esters of p-hydroxybenzoic acid. Antioxidants and suspending agents may be also used.

An example of a stabilizing agent includes a para-hydroxybenzoic acid ester derivative such as methylparabene, propylparabene; an alcohol derivative such as chlorobutanol, benzyl alcohol, phenetyl alcohol; benzalkonium chloride; a phenol derivative such as phenol, cresol; thimerosal; acetic anhydride; sorbic acid; or the like.

An example of a corrigent includes a sweetening, souring, and flavoring agents or the like all of which are ordinarily used.

An example of a solvent includes water, ethanol, glycerin or the like.

Examples of suitable binders include an excipient described hereinbefore; gelatin; polyvinylpyrrolidone; macrogol; or the like, starch, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol.

An example of a lubricating agent includes talc; stearic acid; a metal stearate derivative such as calcium stearate, magnesium stearate, sodium stearate; colloidal silica; veegum; a wax such as beeswax or spermaceti; boric acid; a glycol; a carboxy acid derivative such as fumaric acid, adipic acid; a sodium carboxylate such as sodium benzoate; a sulfate such as sodium sulfate; leucine; a lauryl sulfate such as sodium lauryl sulfate, or magnesium lauryl sulfate; a silicic acid derivative such as silicic acid anhydride, silicic acid hydrate; a starch derivative described above as an excipient; sodium oleate, sodium acetate, sodium chloride, or the like.

Administration

The pharmaceutical compositions of the present invention may be adapted for oral, rectal, vaginal, parenteral, intramuscular, intraperitoneal, intraarterial, intrathecal, intrabronchial, subcutaneous, intradermal, intravenous, nasal, buccal or sublingual routes of administration.

For oral administration, particular use is made of compressed tablets, pills, tablets, gellules, drops, and capsules. Preferably, these compositions contain from 1 to 250 mg and more preferably from 10-100 mg, of active ingredient per dose.

Other forms of administration comprise solutions or emulsions which may be injected intravenously, intraarterially, intrathecally, subcutaneously, intradermally, intraperitoneally or intramuscularly, and which are prepared from sterile or sterilisable solutions. The pharmaceutical compositions of the present invention may also be in form of suppositories, pessaries, suspensions, emulsions, lotions, ointments, creams, gels, sprays, solutions or dusting powders.

An alternative means of transdermal administration is by use of a skin patch. For example, the active ingredient can be incorporated into a cream consisting of an aqueous emulsion of polyethylene glycols or liquid paraffin. The active ingredient can also be incorporated, at a concentration of between 1 and 10% by weight, into an ointment consisting of a white wax or white soft paraffin base together with such stabilisers and preservatives as may be required.

Injectable forms may contain between 10-1000 mg, preferably between 10-250 mg, of active ingredient per dose.

Compositions may be formulated in unit dosage form, i.e., in the form of discrete portions containing a unit dose, or a multiple or sub-unit of a unit dose.

Dosage

The dose of the crystalline form of compound (I) will depend on such factors as symptom, body surface area, body weight and age of the patient. A suitable dosage level is 10 mg (preferably 200 mg) per day to 700 mg (preferably 400 mg) per day. The crystalline form of the compound of formula (I) can be administered as either a single unit dosage, or if desired, the dosage may be divided into convenient subunits administered at one to several times throughout the day depending on the symptoms of the patient.

A person of ordinary skill in the art can easily determine an appropriate dose of one of the instant compositions to administer to a subject without undue experimentation. Typically, a physician will determine the actual dosage which will be most suitable for an individual patient and it will depend on a variety of factors including the activity of the specific compound employed, the metabolic stability and length of action of that compound, the age, body weight, general health, sex, diet, mode and time of administration, rate of excretion, drug combination, the severity of the particular condition, and the individual undergoing therapy. The dosages disclosed herein are exemplary of the average case. There can of course be individual instances where higher or lower dosage ranges are merited, and such are within the scope of this invention. The present invention is further described with reference to the following figures, wherein:

Figure 1:
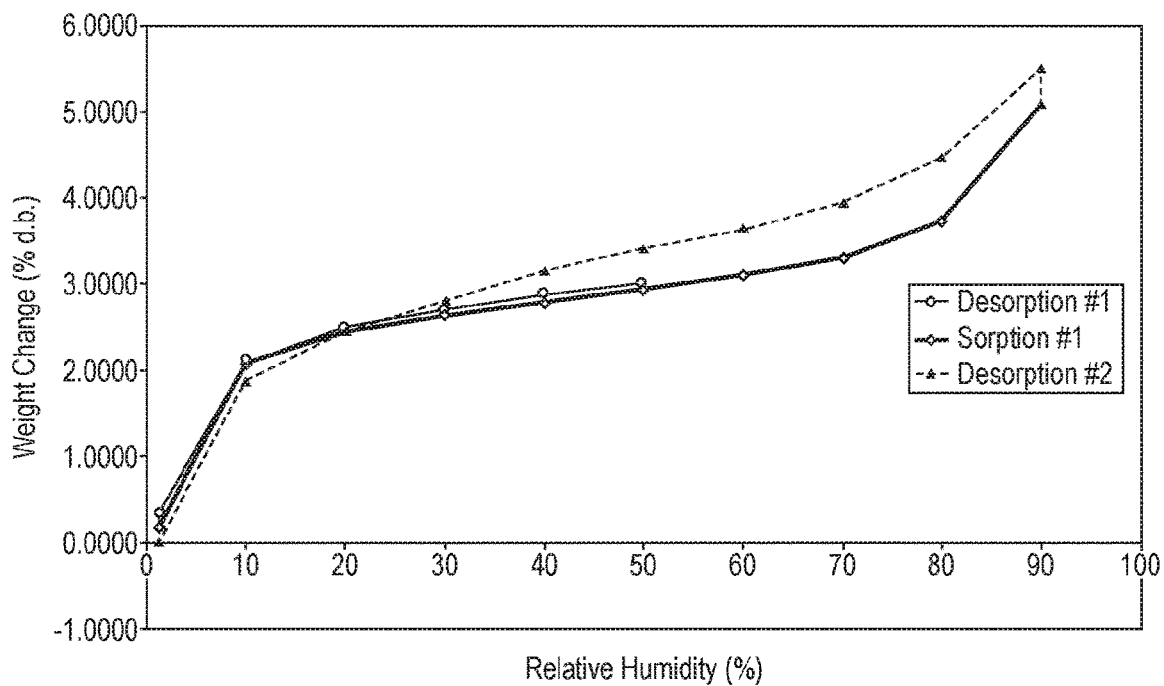
FIG. 1 shows the weight change (% d.b.) versus relative humidity (%) for the monohydrochloride salt of compound (I).
Figure 2:
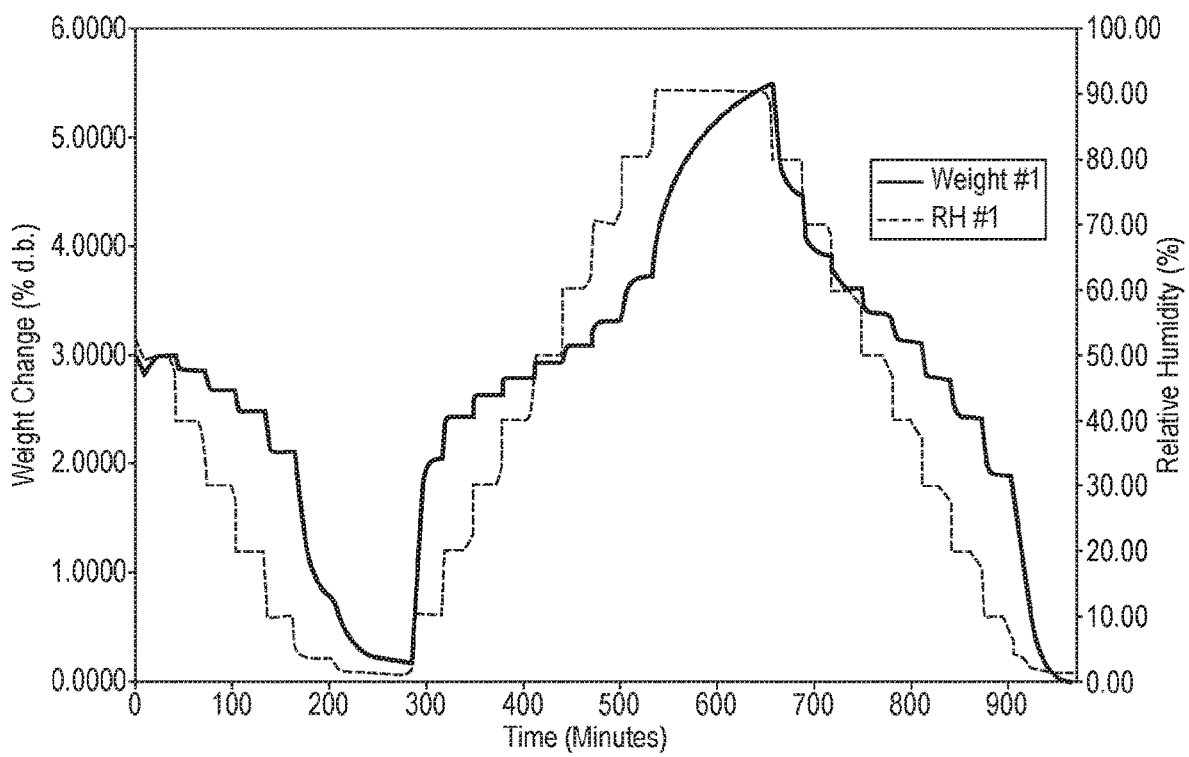
FIG. 2 is an isotherm plot for the monohydrochloride salt of compound (I) showing weight change (%) (left axis) and relative humidity (%) (right axis) versus time (minutes) (horizontal axis) as measured using a Hiden Isochema moisture sorption analyser.
Figure 3:
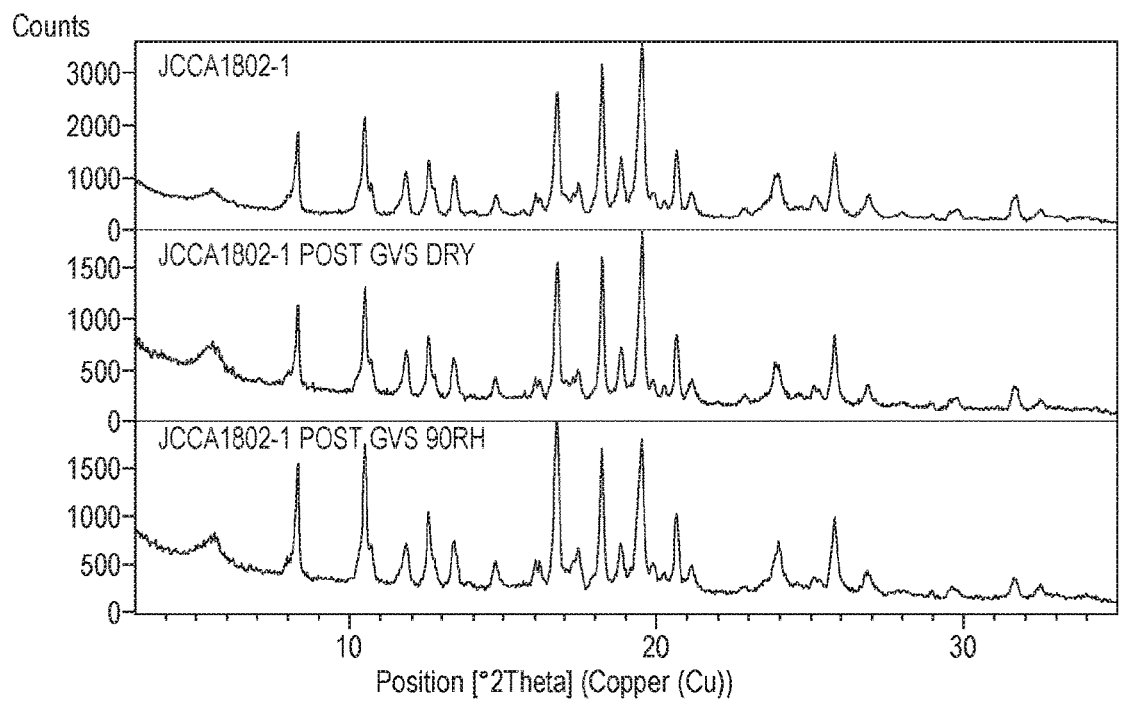
FIG. 3 shows the XRPD comparison of the monohydrochloride salt of compound (I) (upper trace), post GVS dry (middle trace) and post GVS 90% relative humidity (lower trace).
Figure 4:
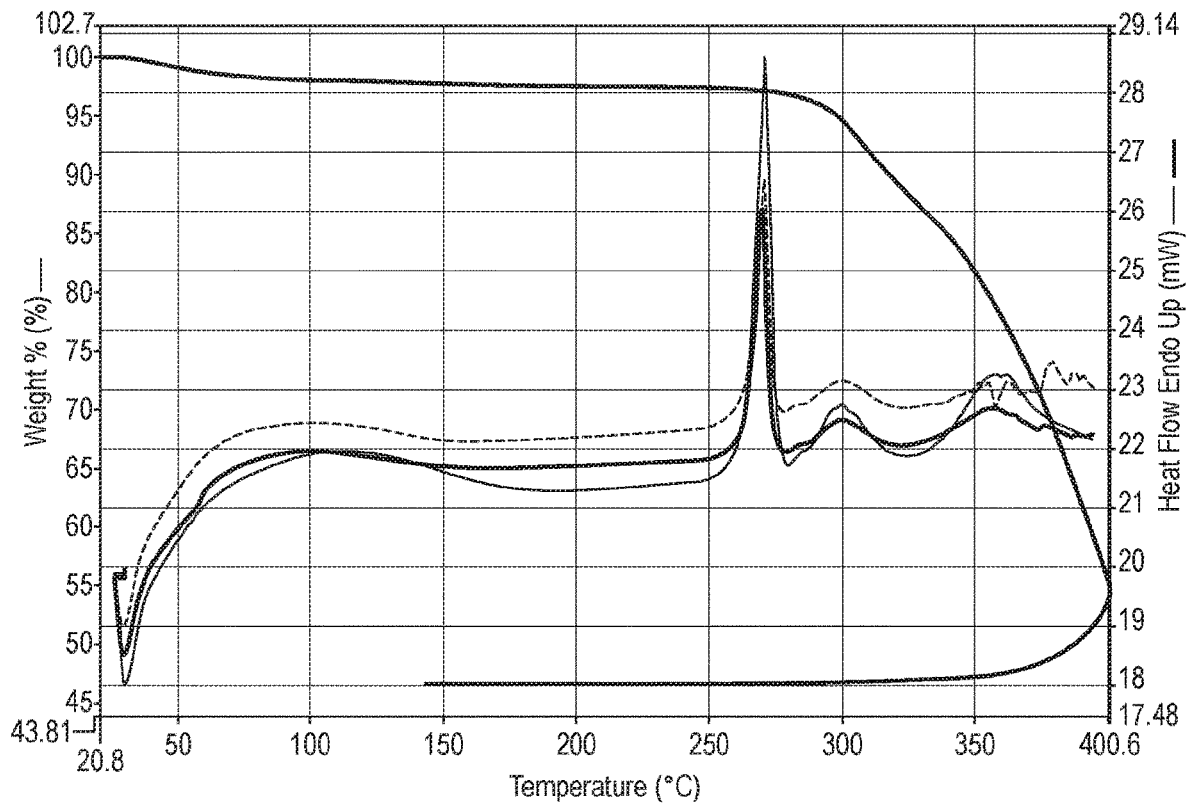

FIG. 4 shows the DSC/TGA trace for the monohydrochloride salt of compound (I), together with corresponding traces for post GVS dry and post GVS 90% relative humidity. The DSC thermogram (lower trace) was obtained using a PerkinElmer DSC 4000 at a heating rate of 20° C./min (peak max observed at around 268° C.). The upper trace shows TGA analysis for the same salt using a PerkinElmer Pyris 1 TGA at a heating rate of 20° C./min.

Figure 5:
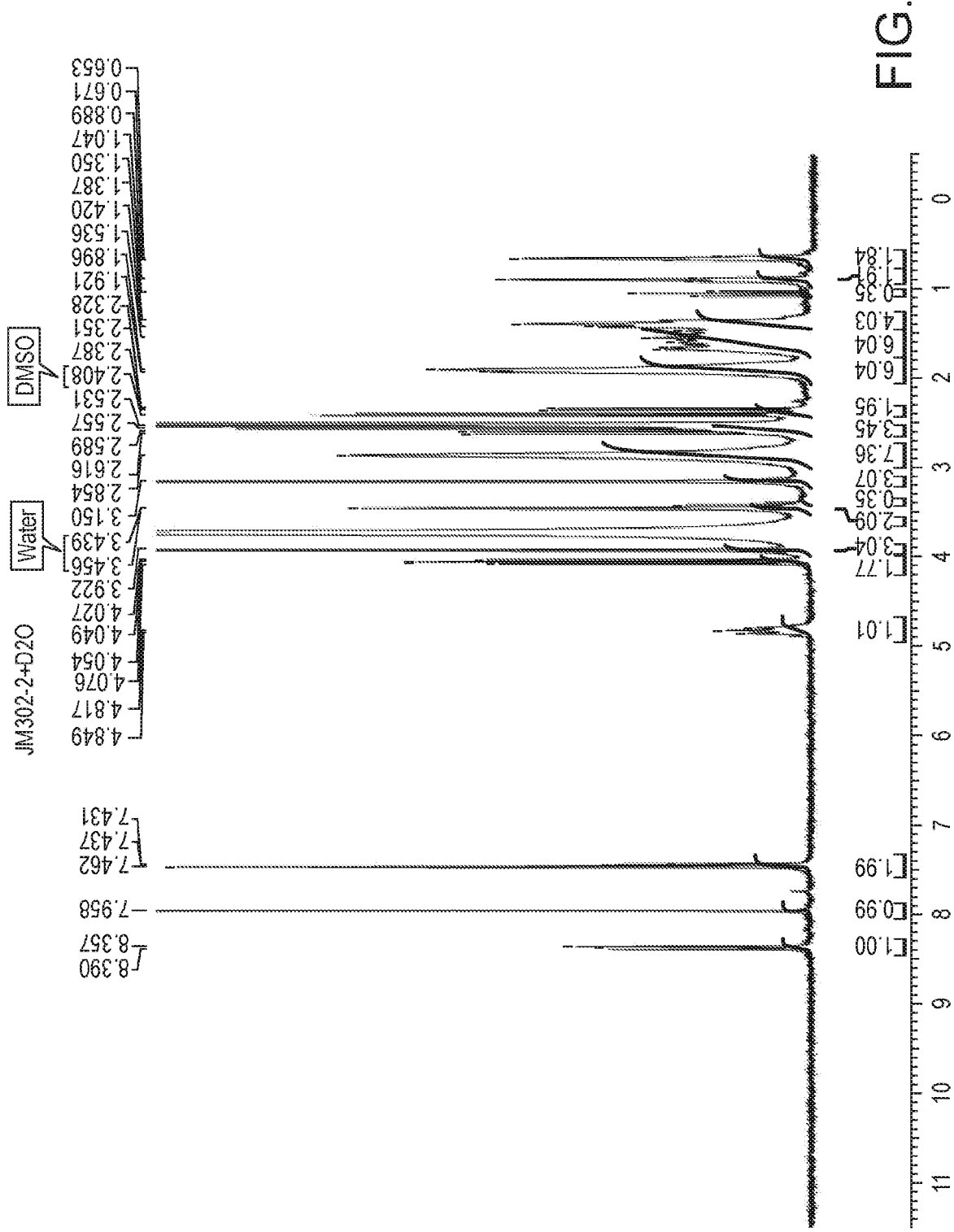

FIG. 5 shows the $^1$H NMR spectrum of the 1:2 L-malate salt of compound (I).

Figure 6:
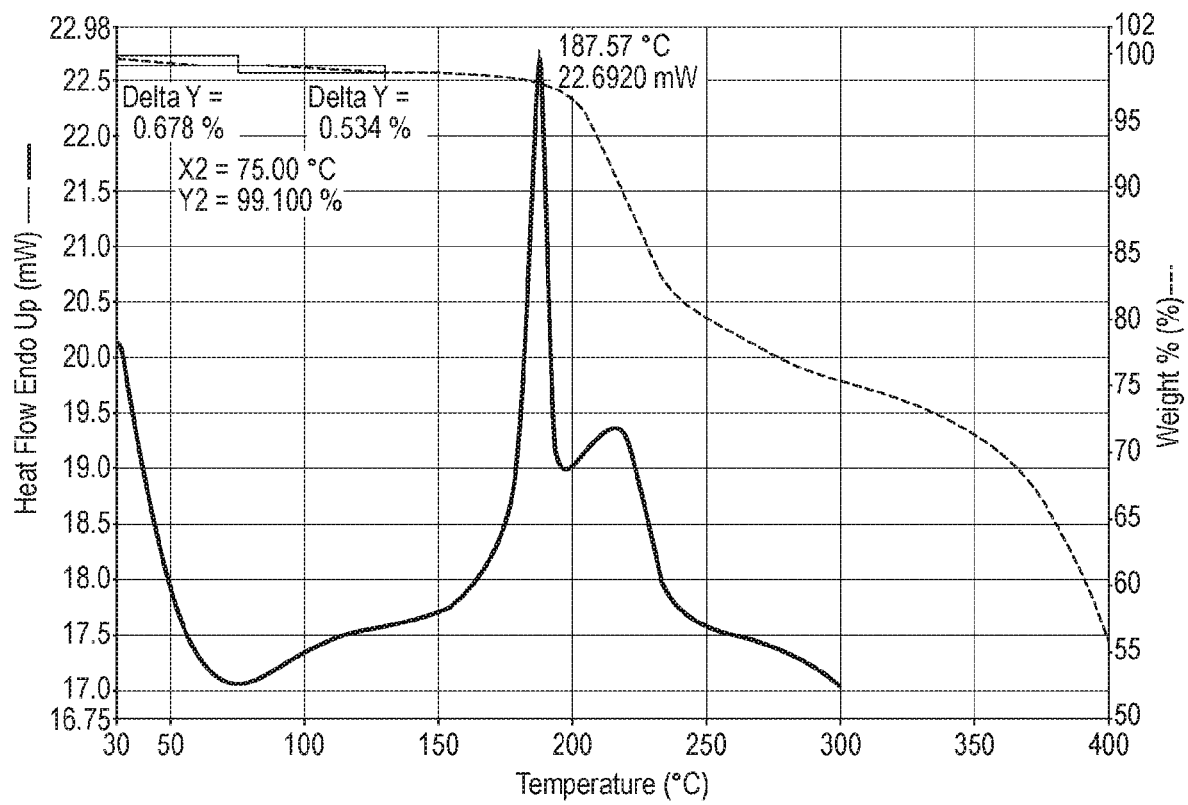

FIG. 6 shows the DSC and TGA thermographs for the 1:2 L-malate salt of compound (I). The DSC thermogram (lower trace) was obtained using a PerkinElmer DSC 4000 at a heating rate of 20° C./min (peak max observed at 187.57° C.). The upper trace shows TGA analysis for the same salt using a PerkinElmer Pyris 1 TGA at a heating rate of 20° C./min.

Figure 7:
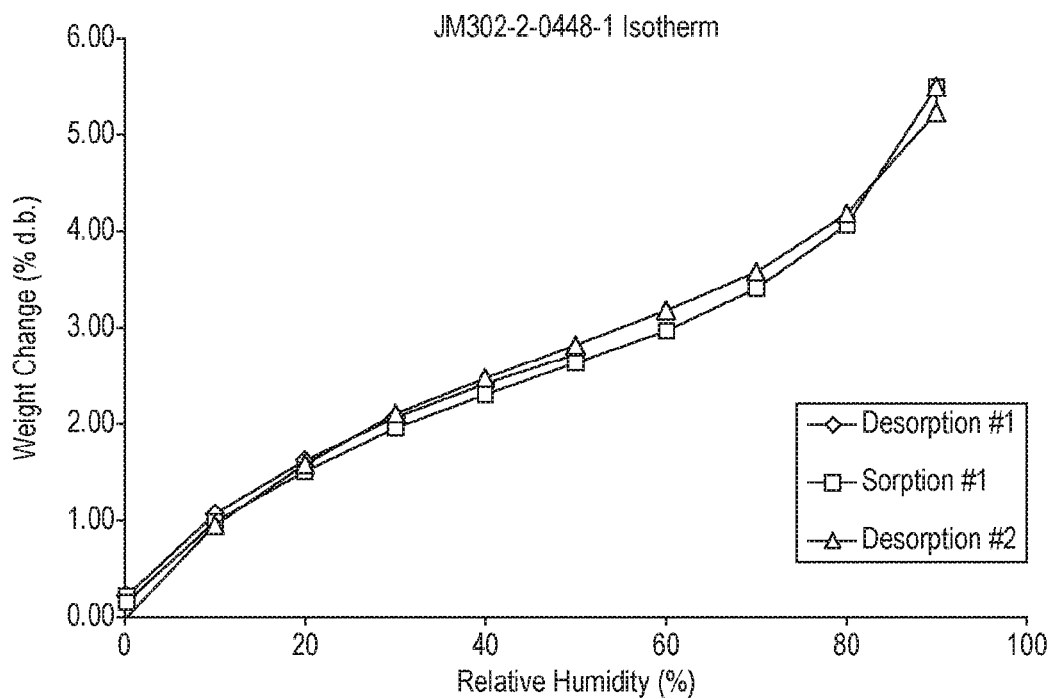

FIG. 7 shows the DVS profile of the 1:2 L-malate salt of compound (I), weight change (%) versus relative humidity (%).

Figure 8:
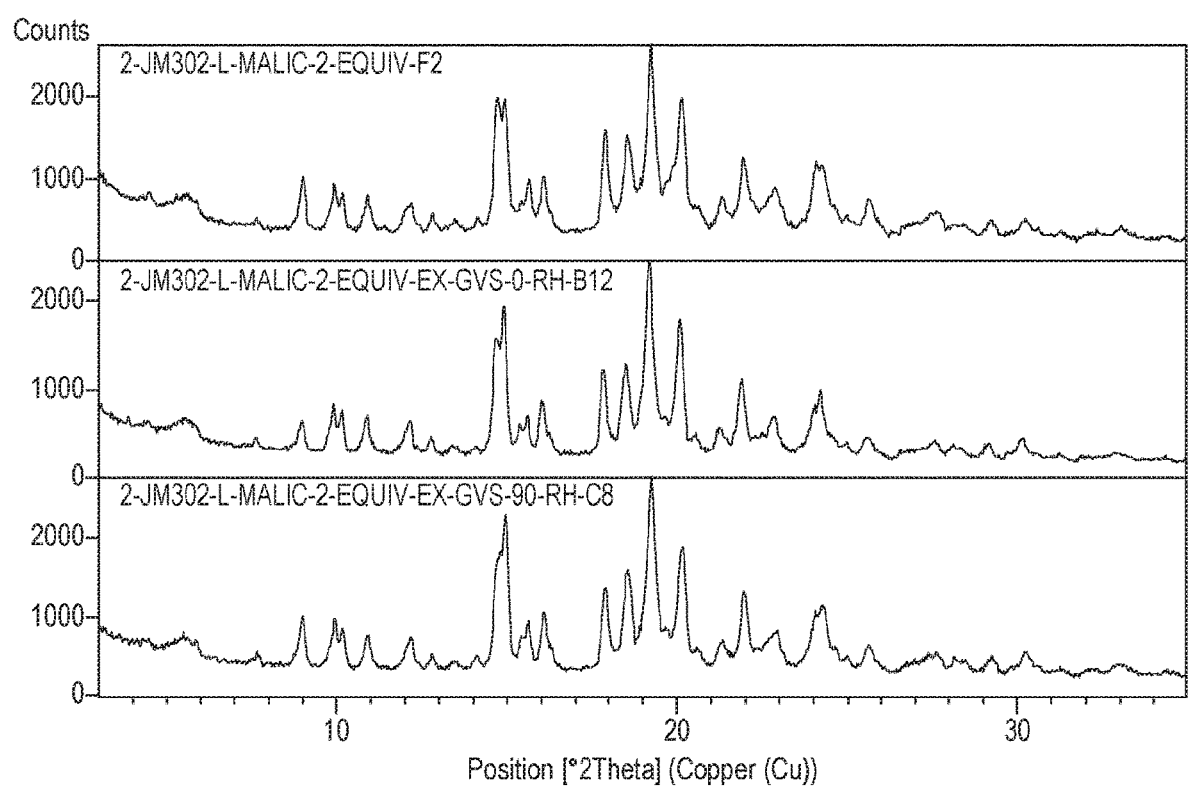

FIG. 8 shows the XRPD comparison of the 1:2 L-malate salt of compound (I) (upper trace), post GVS dry (middle trace) and post GVS 90% relative humidity (lower trace).

Figure 9:
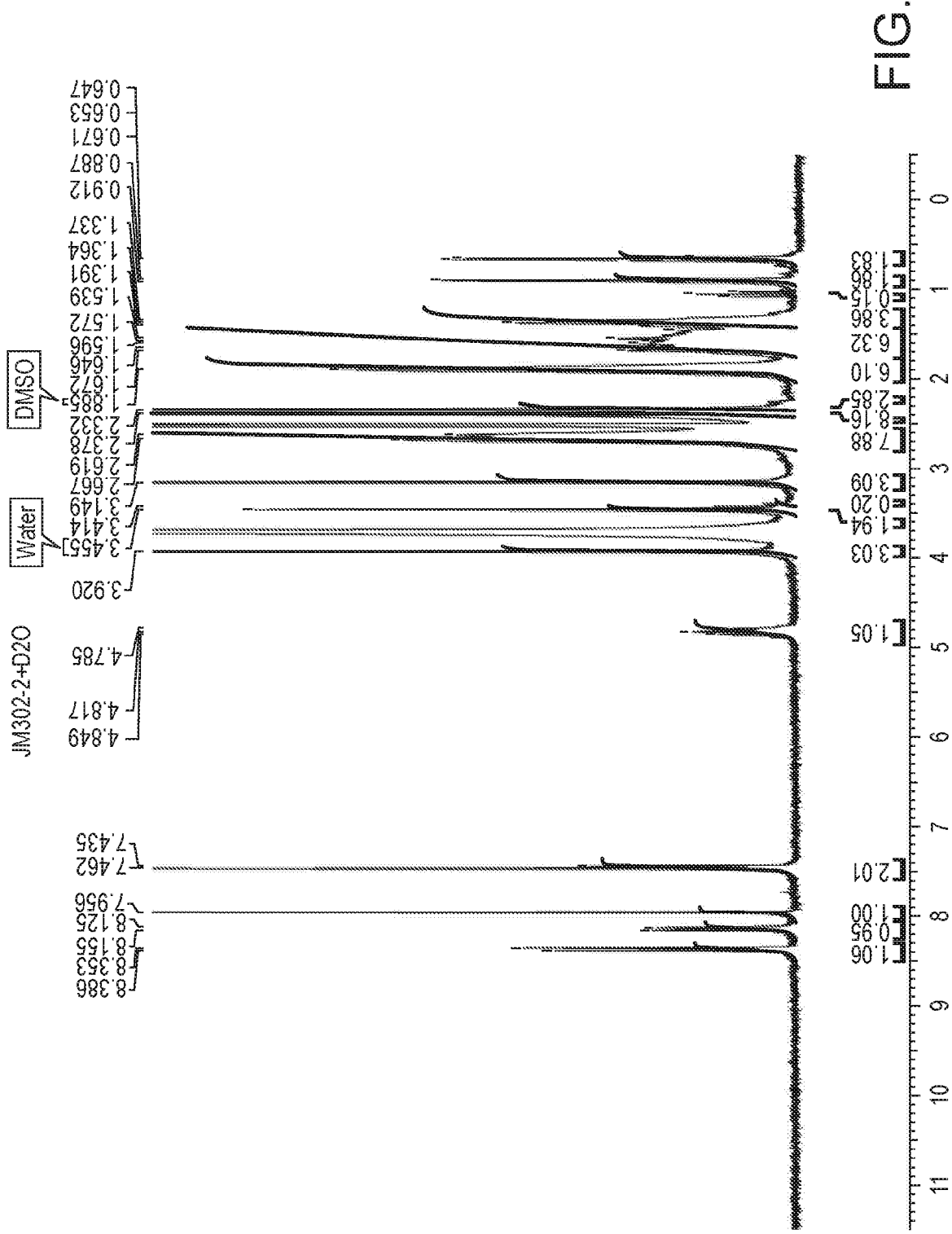

FIG. 9 shows the $^1$H NMR spectrum of the 1:2 succinate salt of compound (I).

Figure 10:
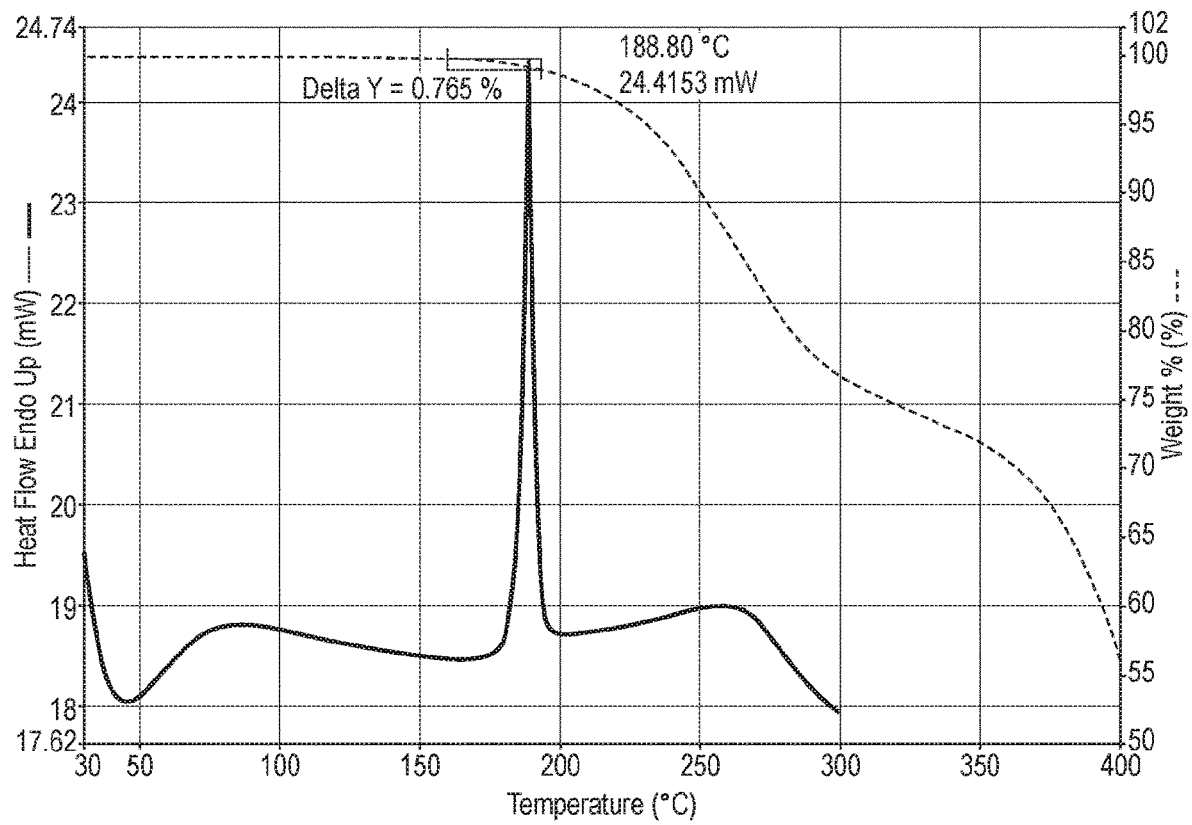

FIG. 10 shows the DSC and TGA thermographs for the 1:2 succinate salt of compound (I). The DSC thermogram (lower trace) was obtained using a PerkinElmer DSC 4000 at a heating rate of 20° C./min (peak max observed at 188.80° C.). The upper trace shows TGA analysis for the same salt using a PerkinElmer Pyris 1 TGA at a heating rate of 20° C./min.

Figure 11:
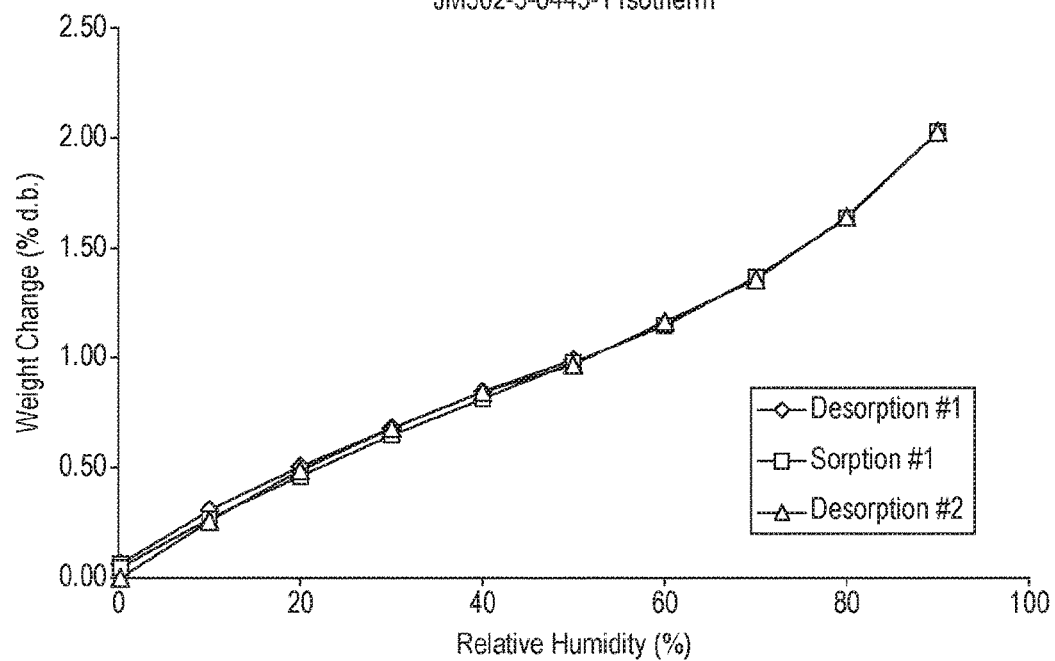

FIG. 11 shows the DVS profile of the 1:2 succinate salt of compound (I), weight change (%) versus relative humidity (%).

Figure 12:
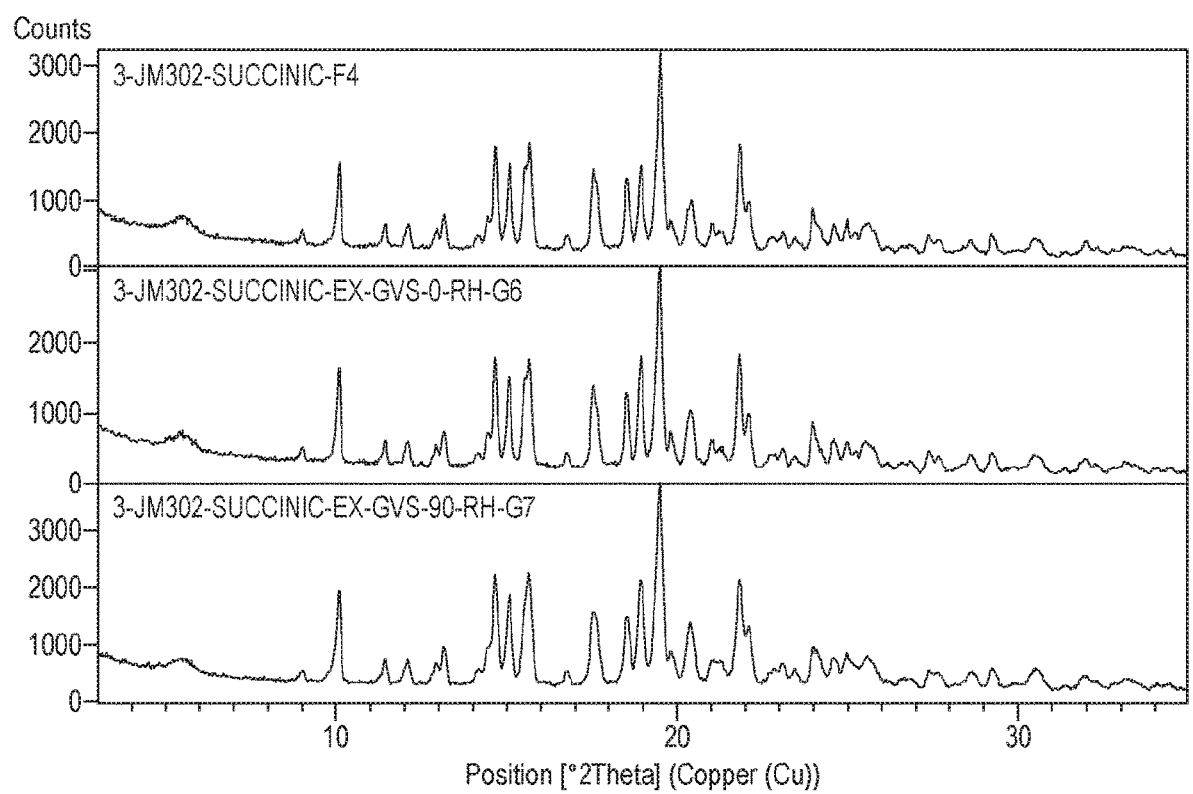

FIG. 12 shows the XRPD comparison of the 1:2 succinate salt of compound (I) (upper trace), post GVS dry (middle trace) and post GVS 90% relative humidity (lower trace).

Figure 13:
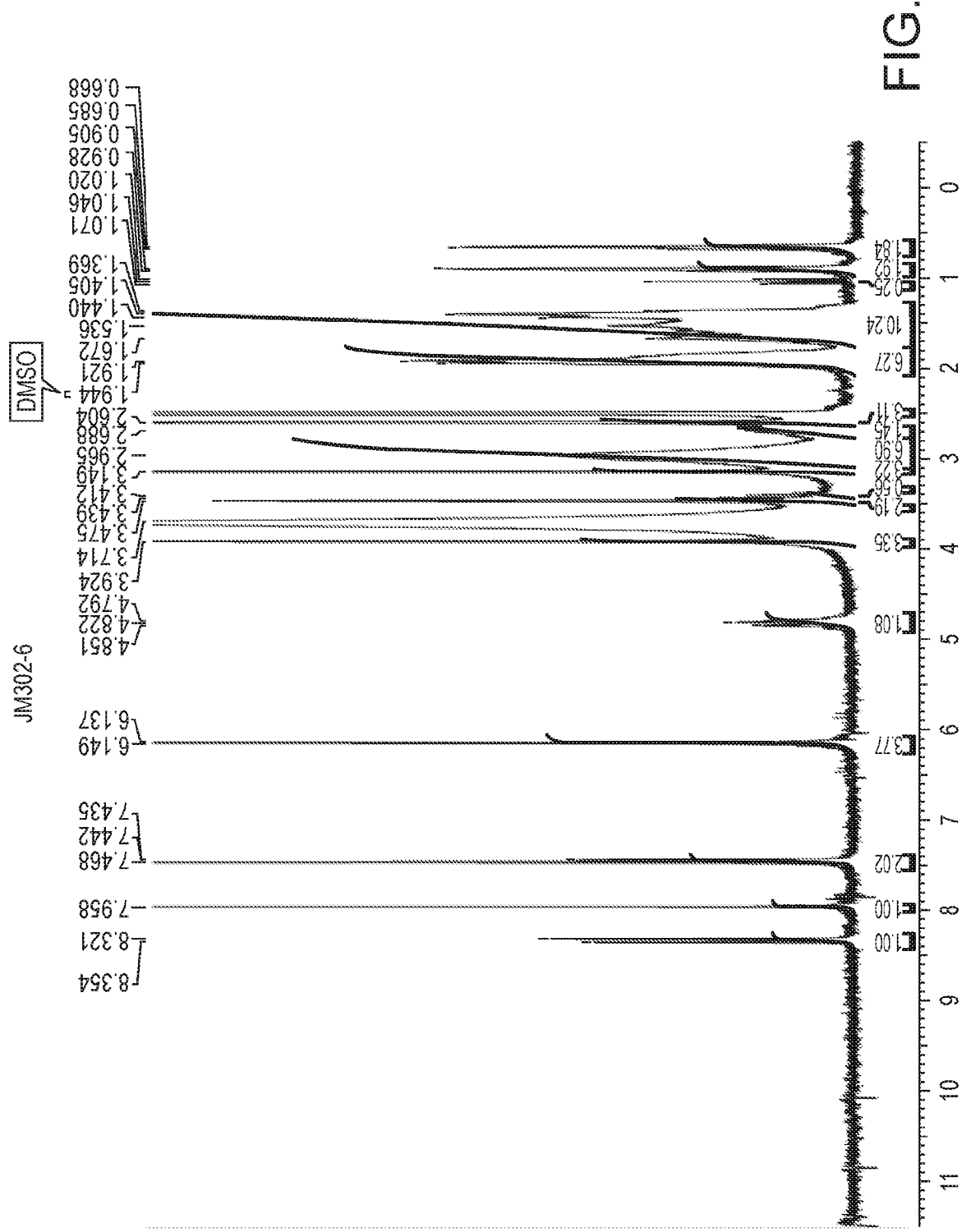

FIG. 13 shows the $^1$H NMR spectrum of the 1:2 maleate salt of compound (I).

Figure 14:
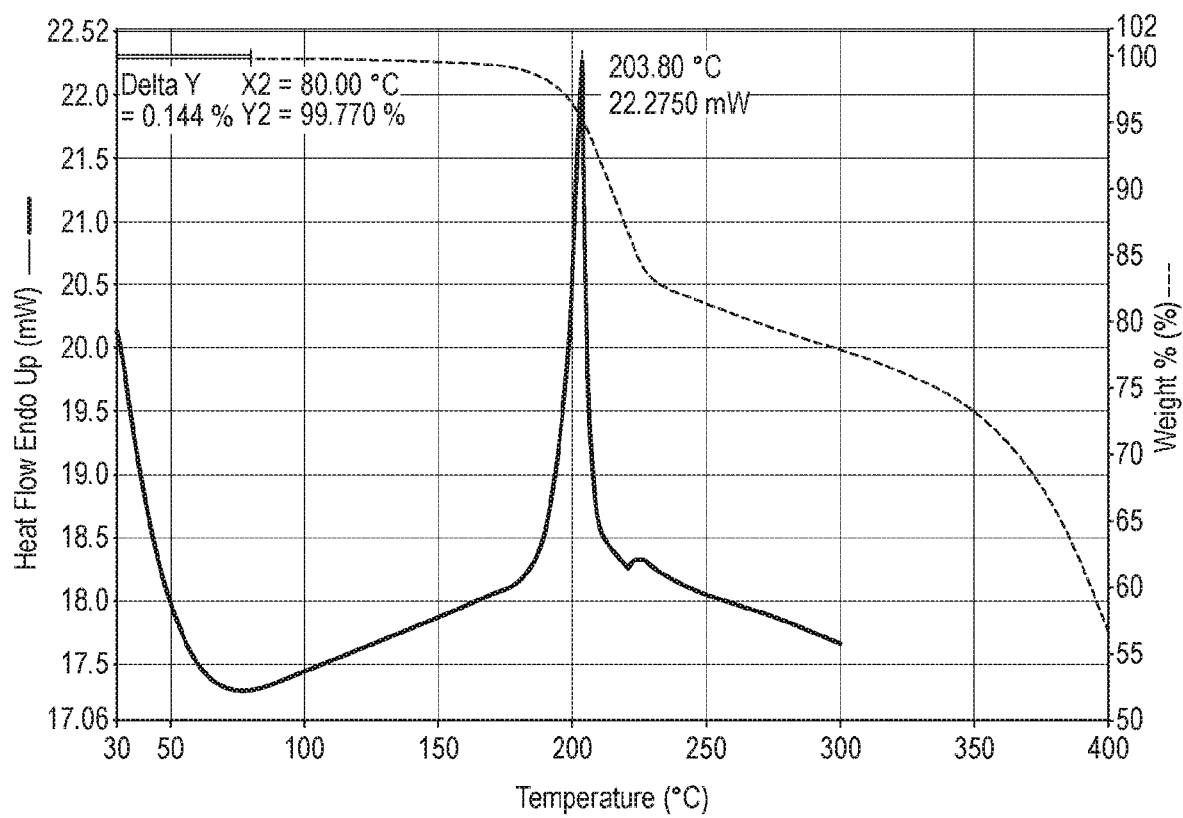

FIG. 14 shows the DSC and TGA thermographs for the 1:2 maleate salt of compound (I). The DSC thermogram (lower trace) was obtained using a PerkinElmer DSC 4000 at a heating rate of 20° C./min (peak max observed at 203.80° C.). The upper trace shows TGA analysis for the same salt using a PerkinElmer Pyris 1 TGA at a heating rate of 20° C./min.

Figure 15:
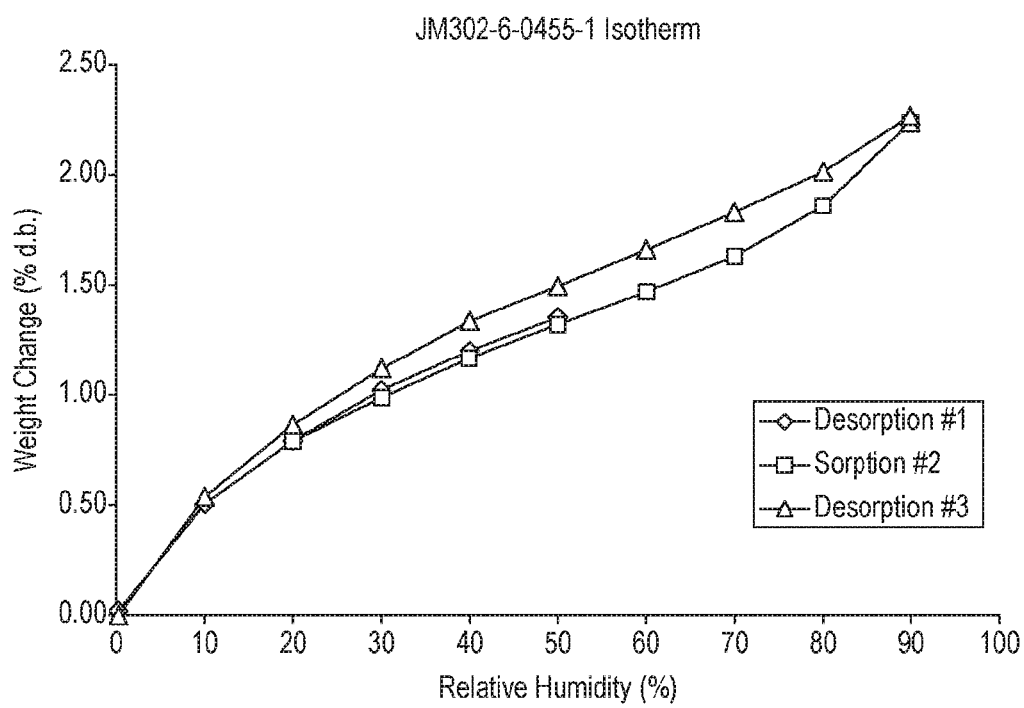

FIG. 15 shows the DVS profile of the 1:2 maleate salt of compound (I), weight change (%) versus relative humidity (%).

Figure 16:
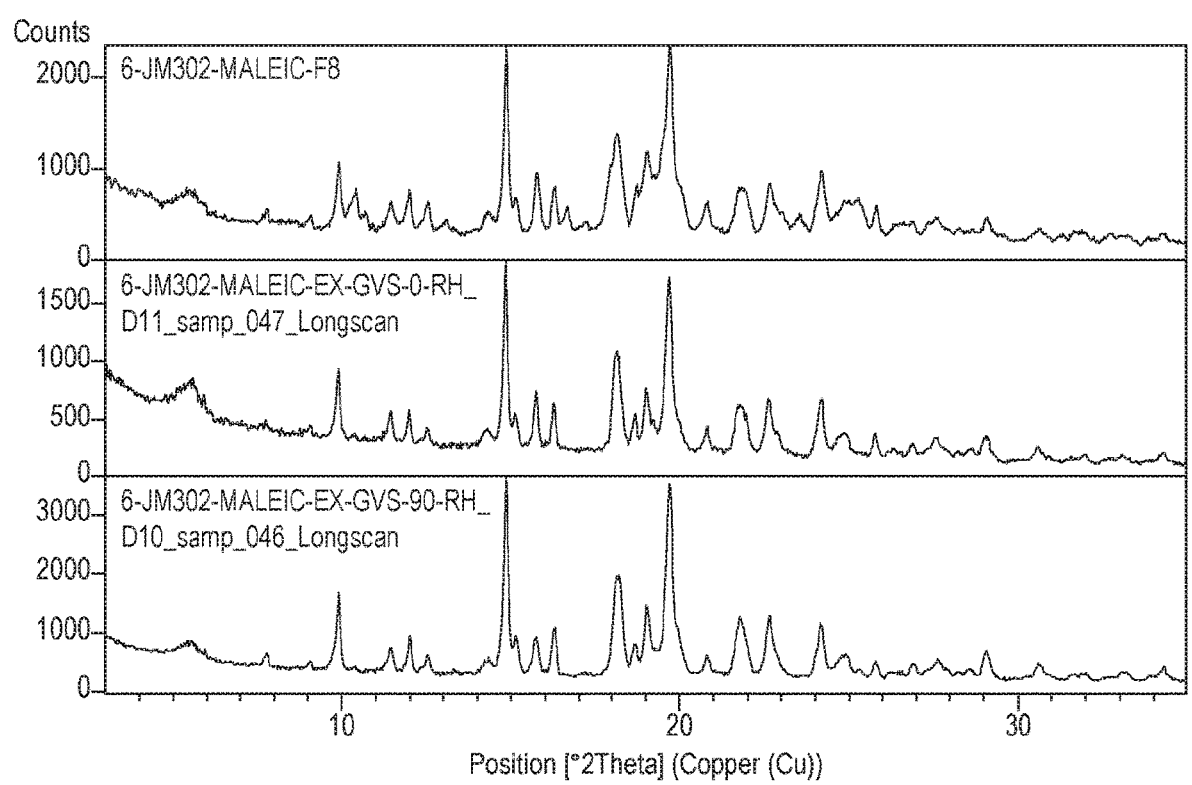

FIG. 16 shows the XRPD comparison of the 1:2 maleate salt of compound (I) (upper trace), post GVS dry (middle trace) and post GVS 90% relative humidity (lower trace).

Figure 17:
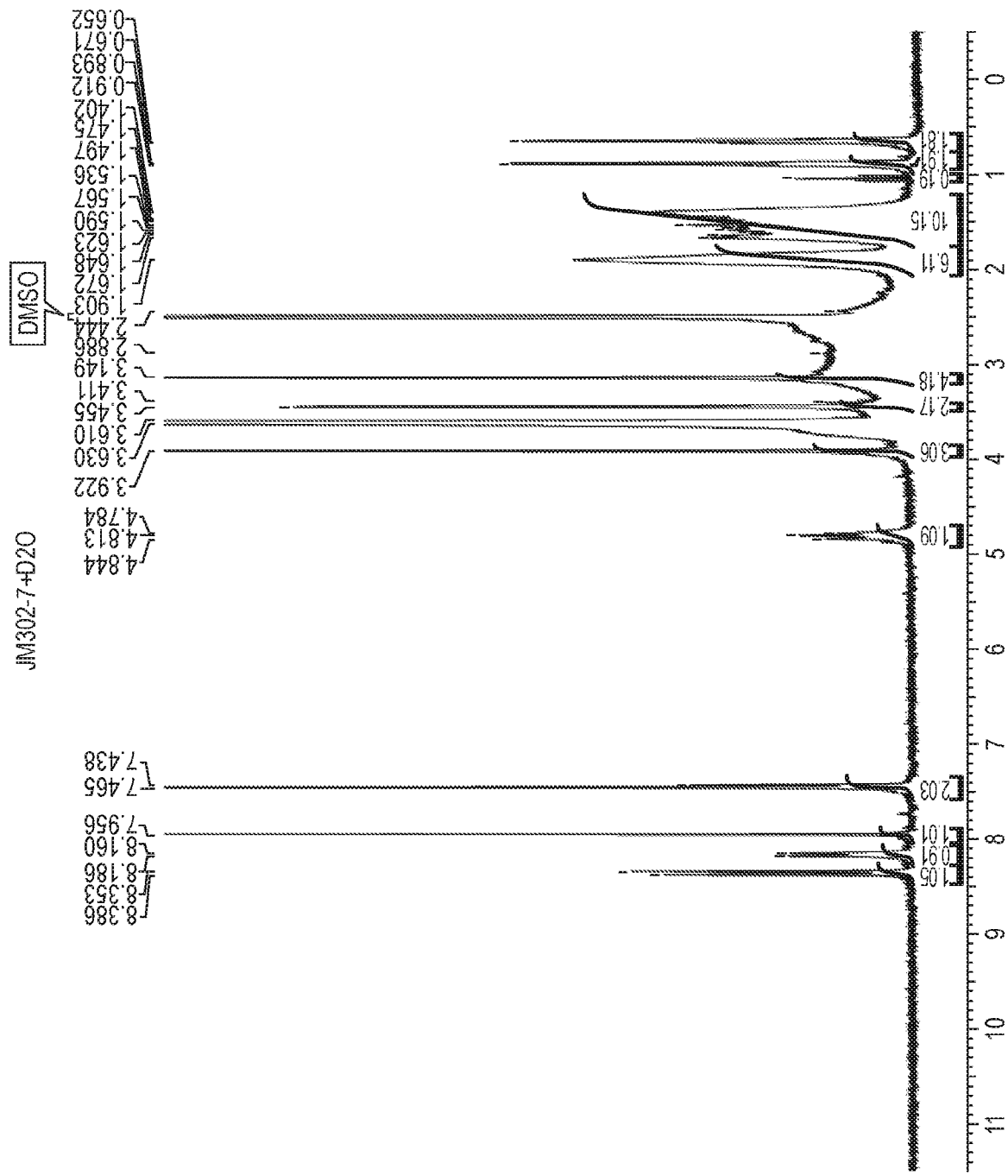

FIG. 17 shows the $^1$H NMR spectrum of the monohydrobromide monohydrate salt of compound (I).

Figure 18:
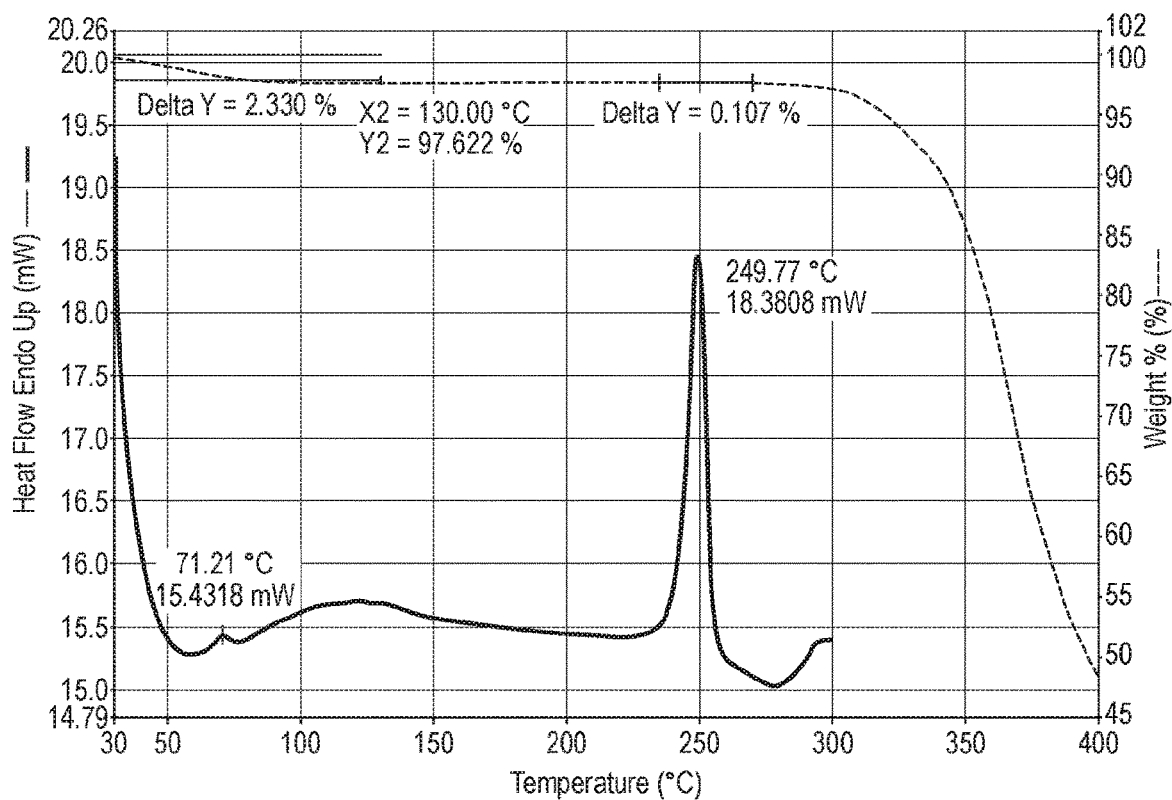

FIG. 18 shows the DSC and TGA thermographs for the monohydrobromide monohydrate salt of compound (I). The DSC thermogram (lower trace) was obtained using a PerkinElmer DSC 4000 at a heating rate of 20° C./min (peak max observed at 249.77° C.). The upper trace shows TGA analysis for the same salt using a PerkinElmer Pyris 1 TGA at a heating rate of 20° C./min.

Figure 19:
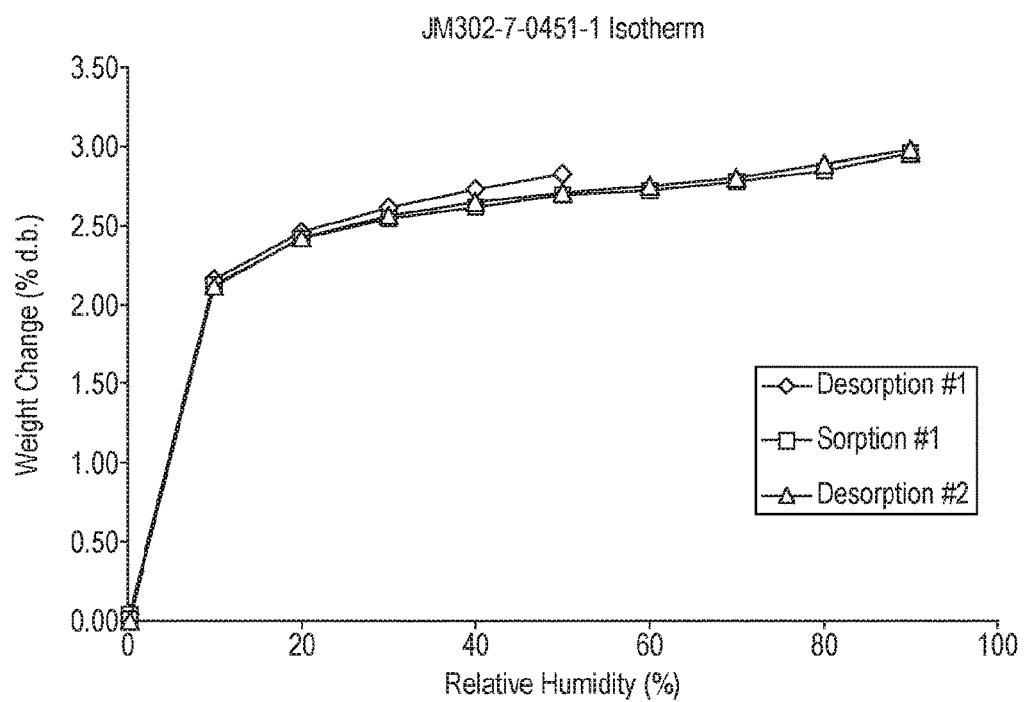

FIG. 19 shows the DVS profile of the monohydrobromide monohydrate salt of compound (I), weight change (%) versus relative humidity (%).

Figure 20:
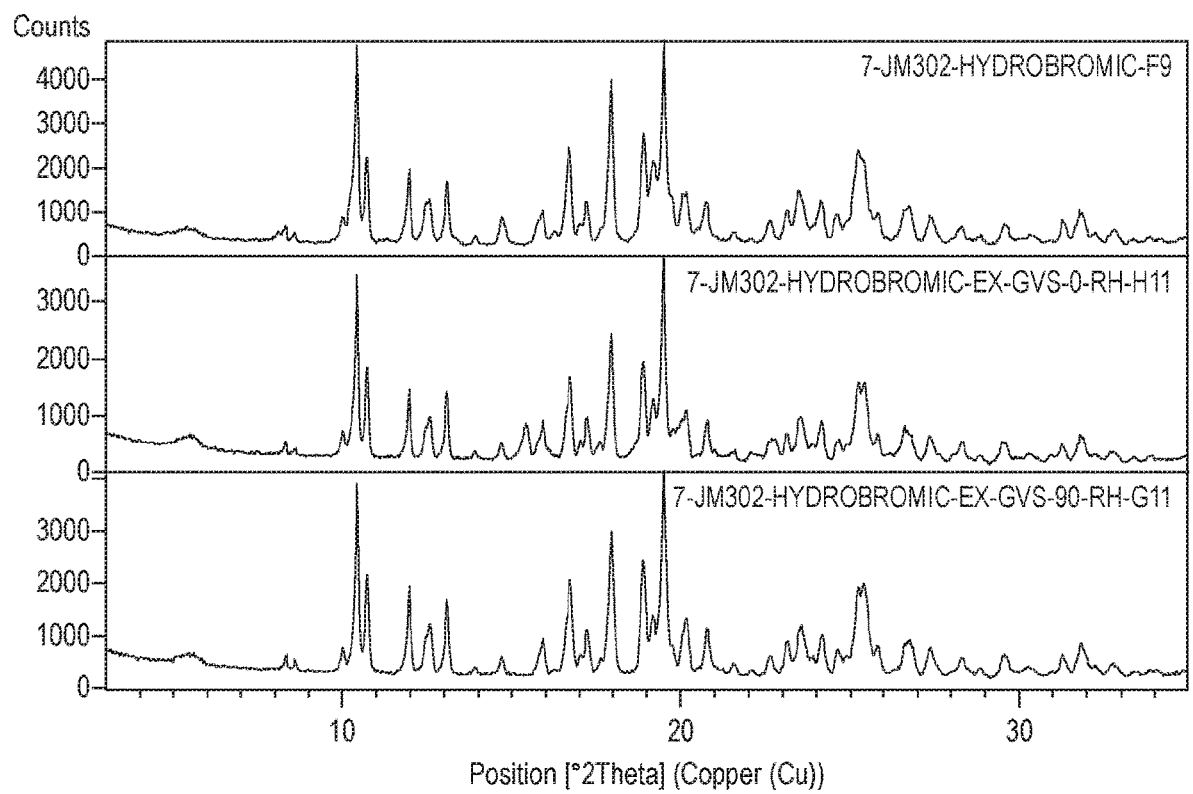

FIG. 20 shows the XRPD comparison of the monohydrobromide monohydrate salt of compound (I) (upper trace), post GVS dry (middle trace) and post GVS 90% relative humidity (lower trace).

Figure 21:
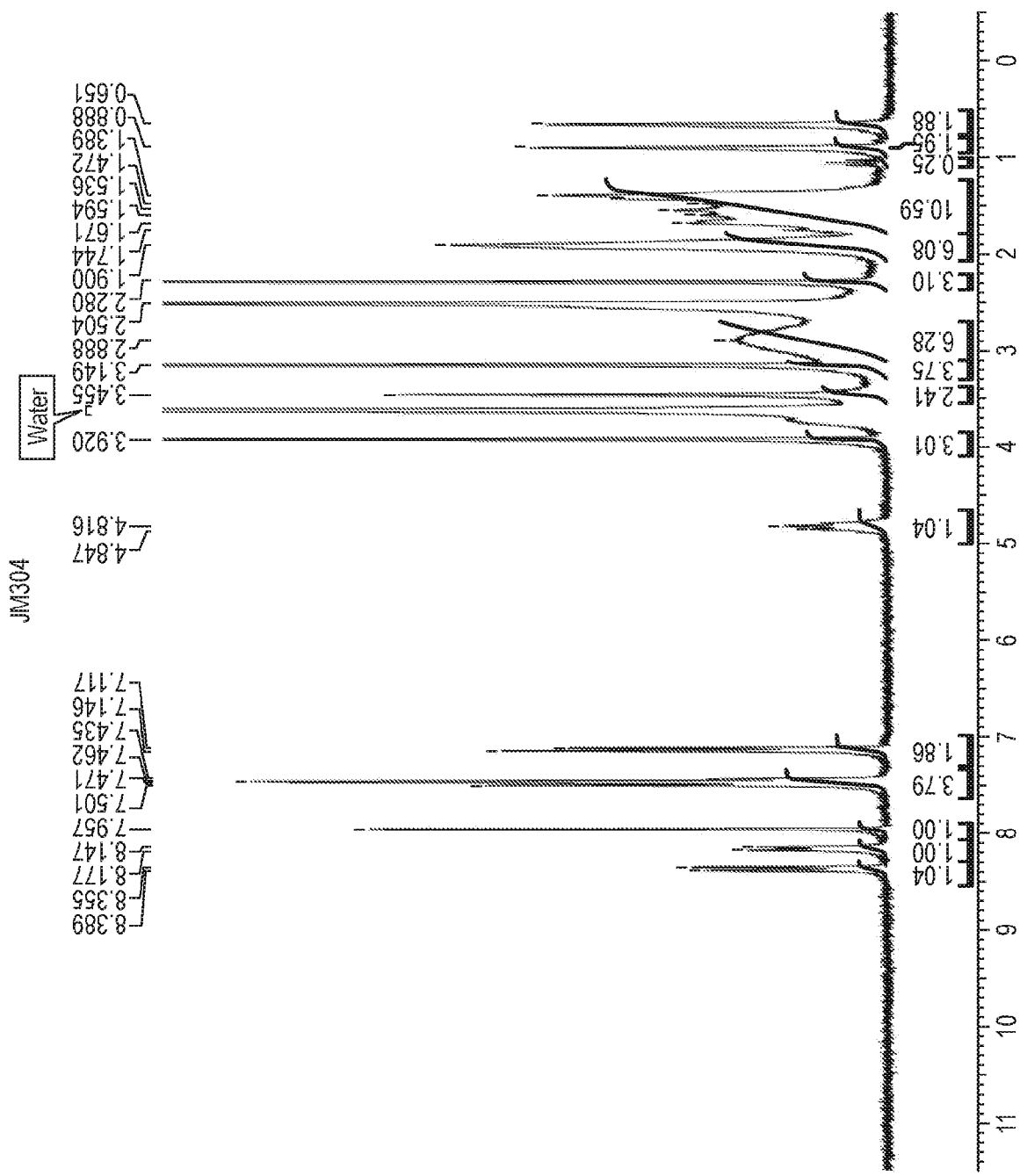

FIG. 21 shows the $^1$H NMR spectrum of the 1:1 p-toluenesulfonate salt of compound (I).

Figure 22:
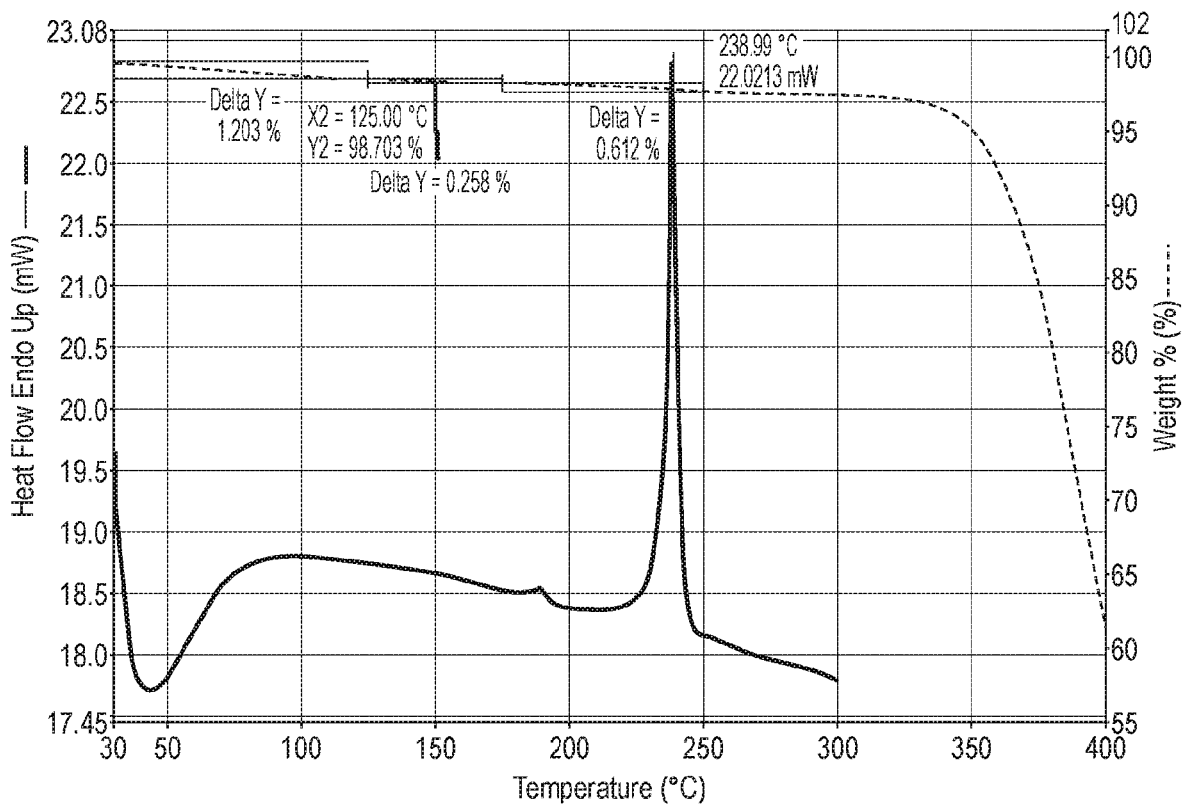

FIG. 22 shows the DSC and TGA thermographs for the 1:1 p-toluenesulfonate salt of compound (I). The DSC thermogram (lower trace) was obtained using a PerkinElmer DSC 4000 at a heating rate of 20° C./min (peak max observed at 238.99° C.). The upper trace shows TGA analysis for the same salt using a PerkinElmer Pyris 1 TGA at a heating rate of 20° C./min.

Figure 23:
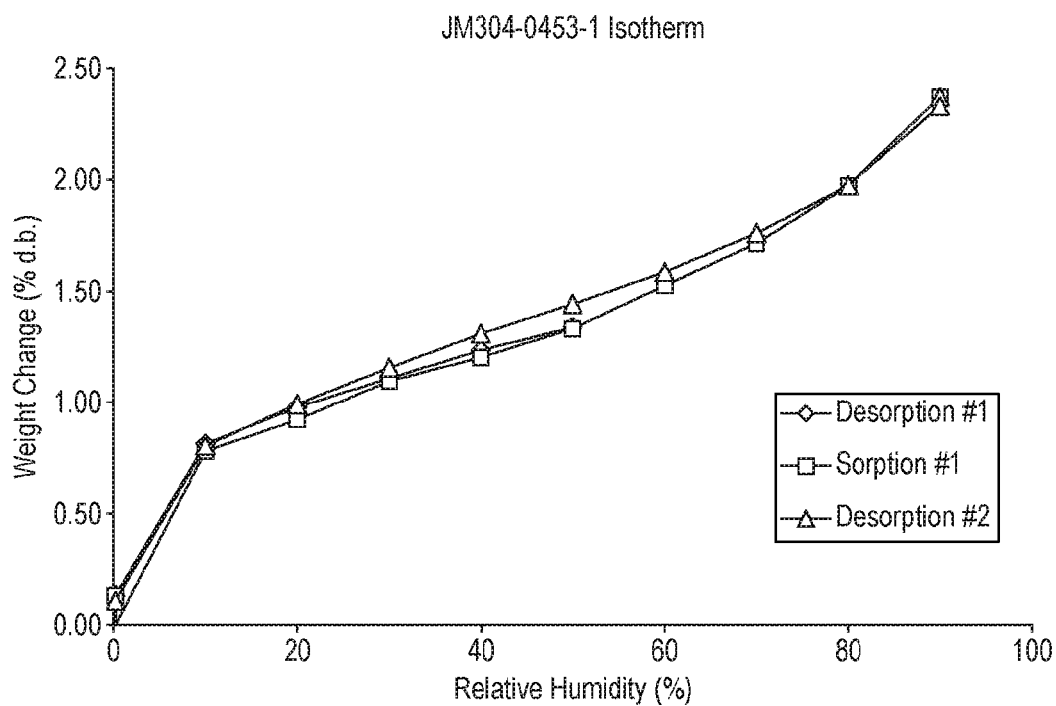

FIG. 23 shows the DVS profile of the 1:1 p-toluenesulfonate salt of compound (I), weight change (%) versus relative humidity (%).

Figure 24:
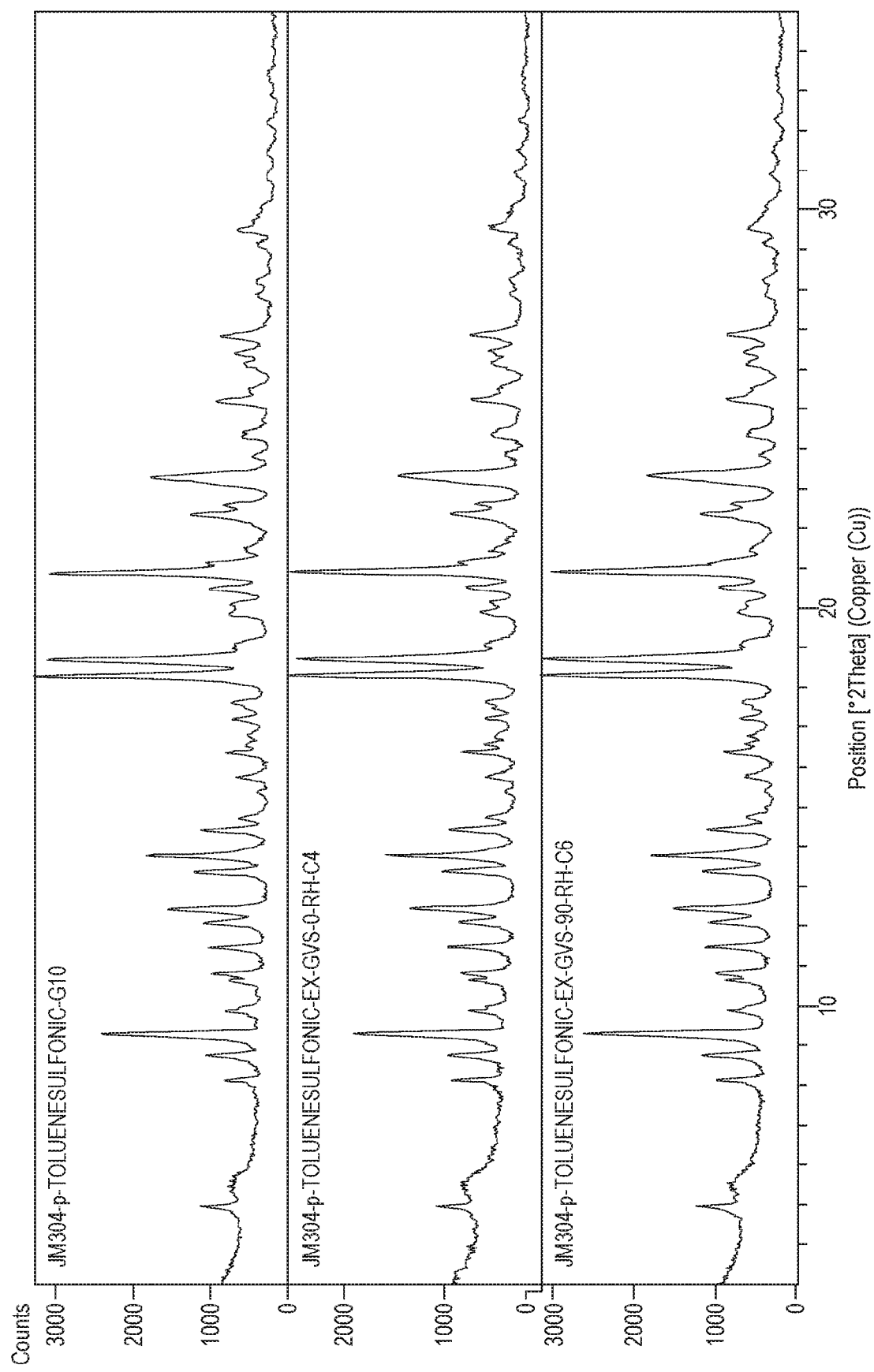

FIG. 24 shows the XRPD comparison of the 1:1 p-toluenesulfonate salt of compound (I) (upper trace), post GVS dry (middle trace) and post GVS 90% relative humidity (lower trace).

Figure 25:
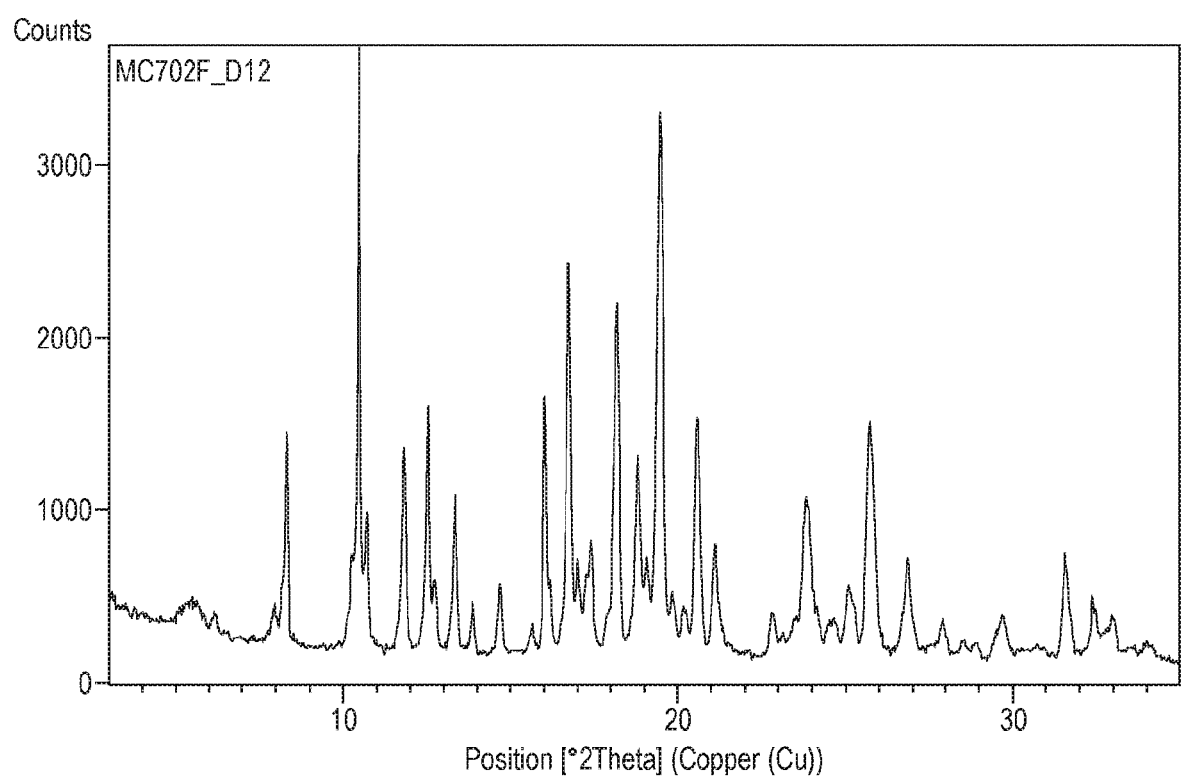

FIG. 25 shows the X-ray powder diffraction pattern of the monohydrochloride monohydrate salt of compound (I).

Figure 26:
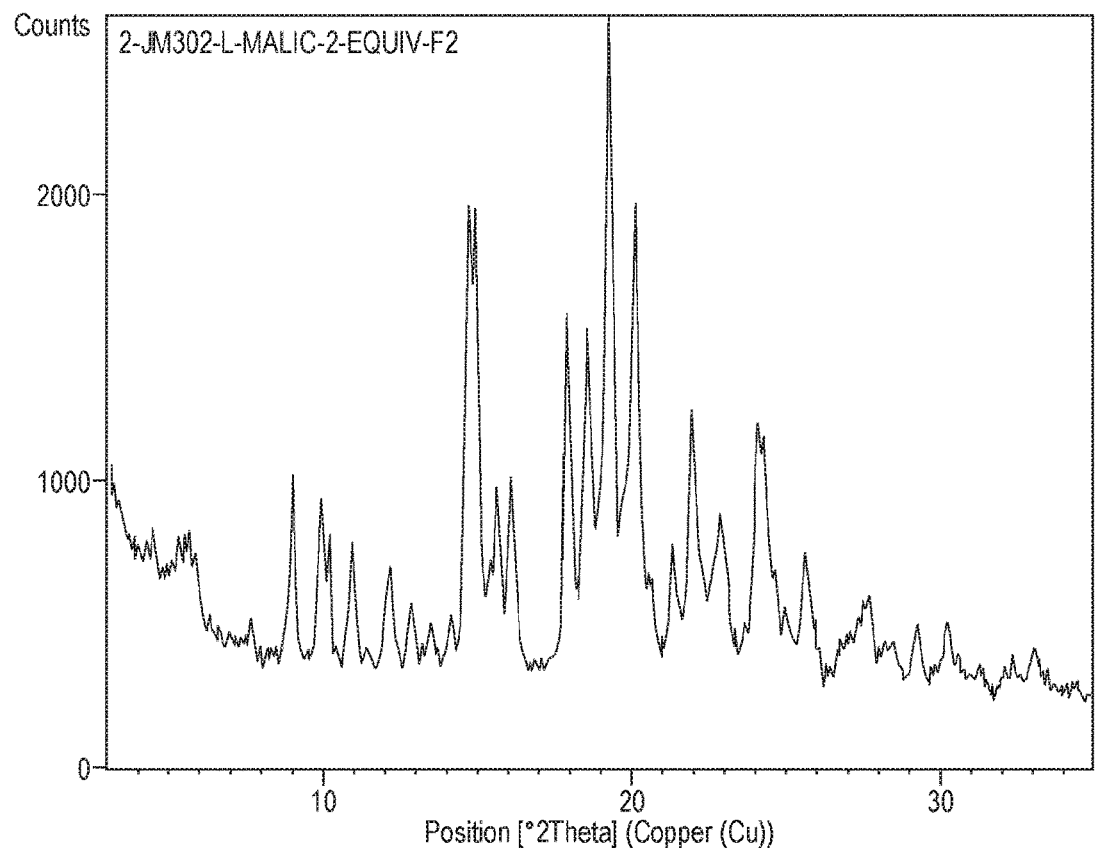
Figure 26:
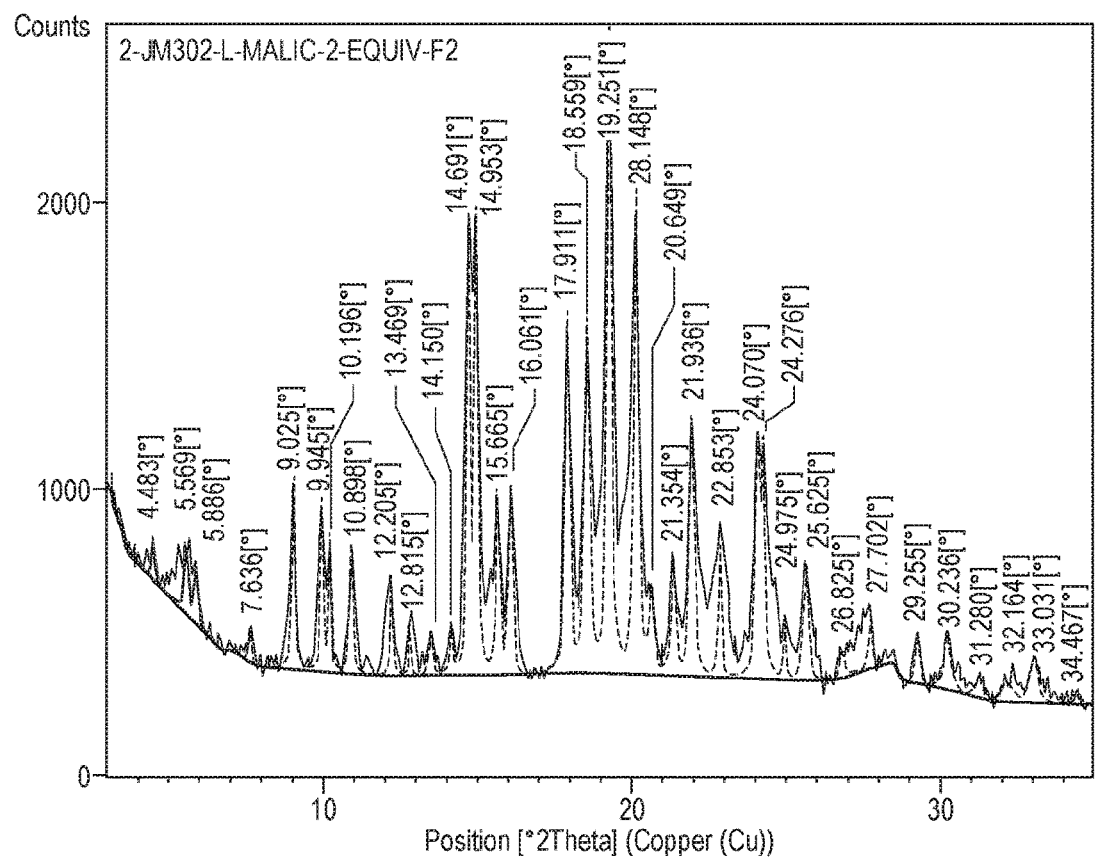

FIG. 26 shows the X-ray powder diffraction pattern of the 1:2 L-malate salt of compound (I).

Figure 27:
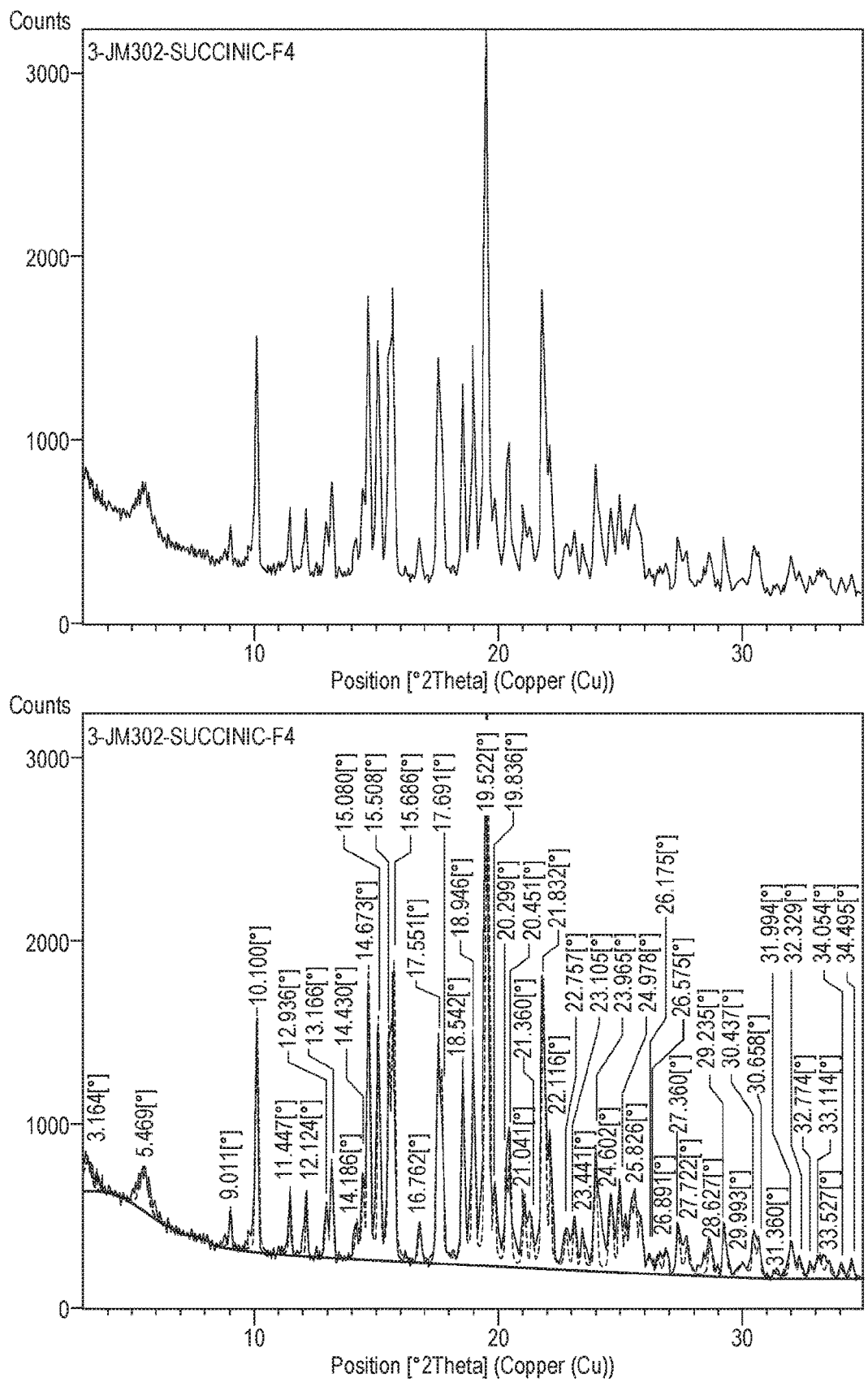

FIG. 27 shows the X-ray powder diffraction pattern of the 1:2 succinate salt of compound (I).

Figure 28:
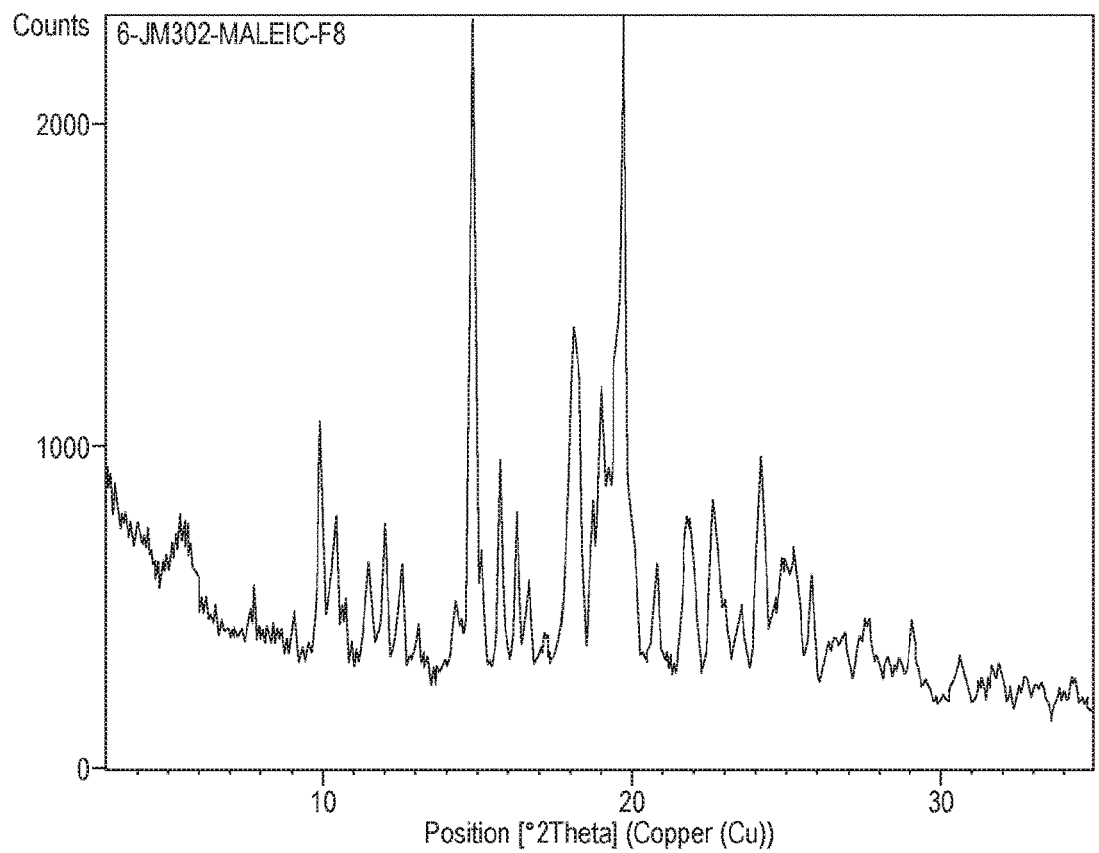
Figure 28:
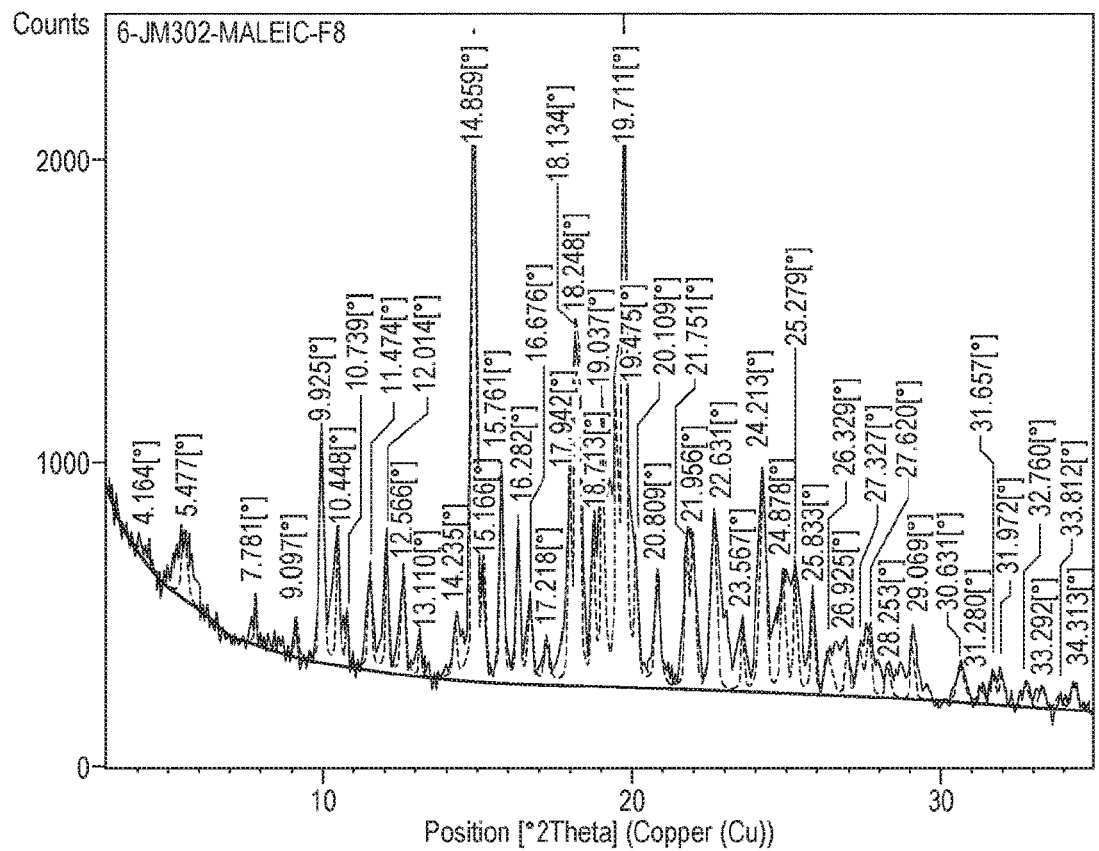

FIG. 28 shows the X-ray powder diffraction pattern of the 1:2 maleate salt of compound (I).

Figure 29:
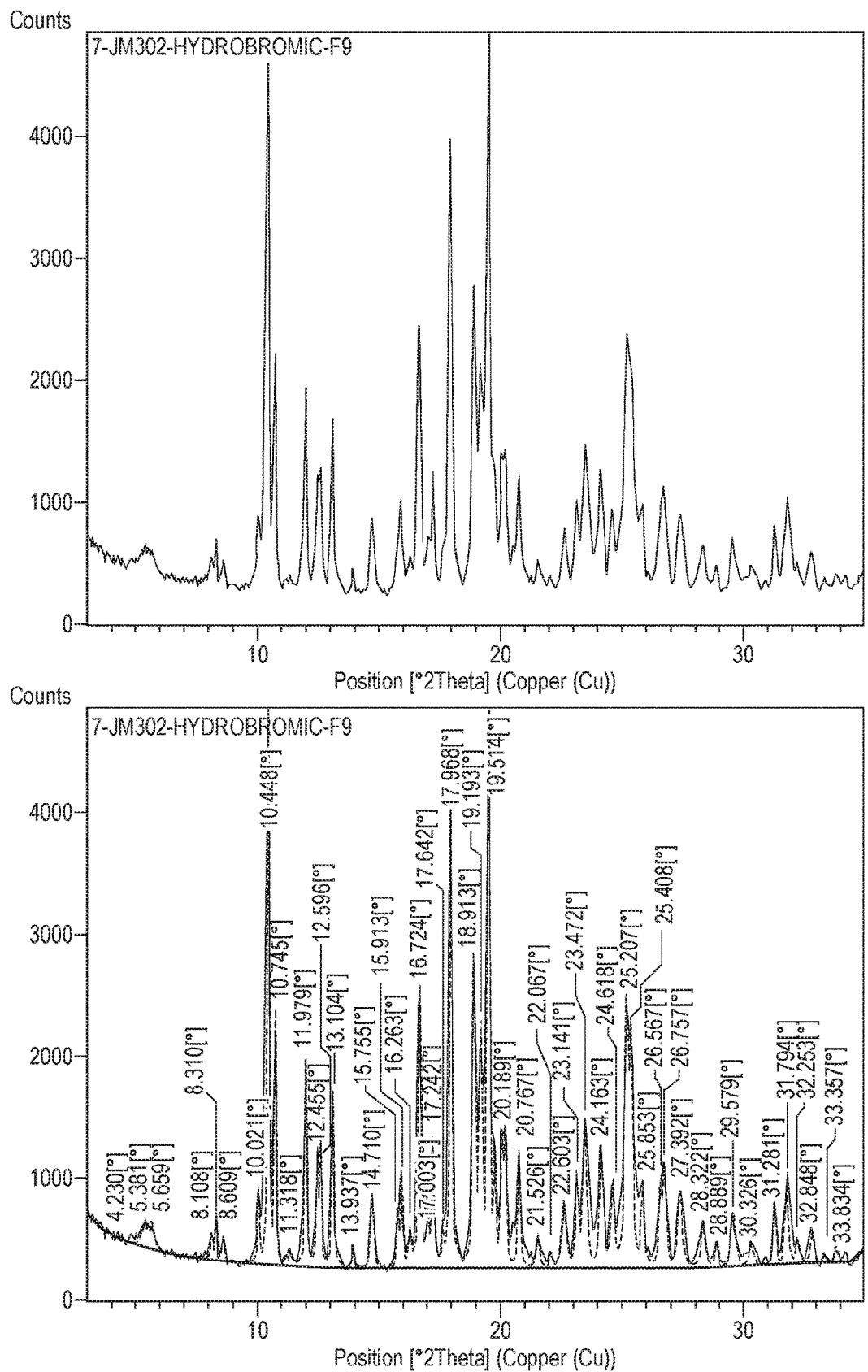

FIG. 29 shows the X-ray powder diffraction pattern of the monohydrobromide monohydrate salt of compound (I).

Figure 30:
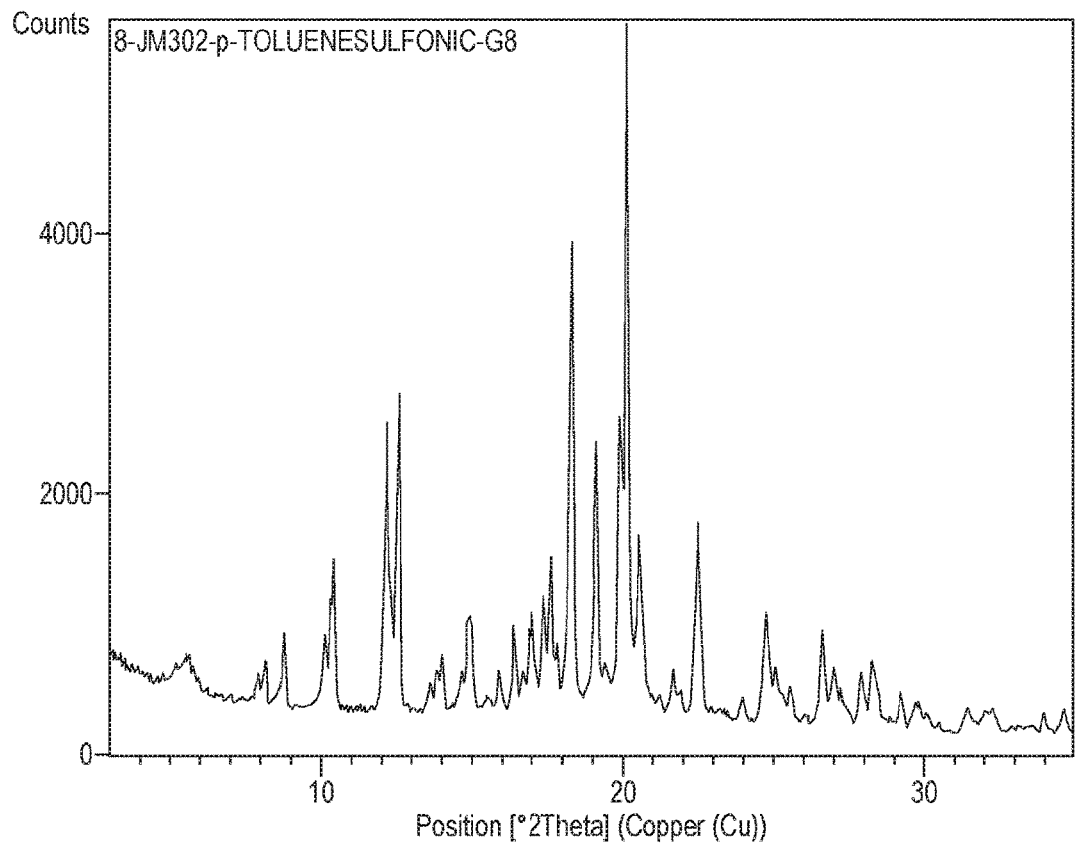
Figure 30:
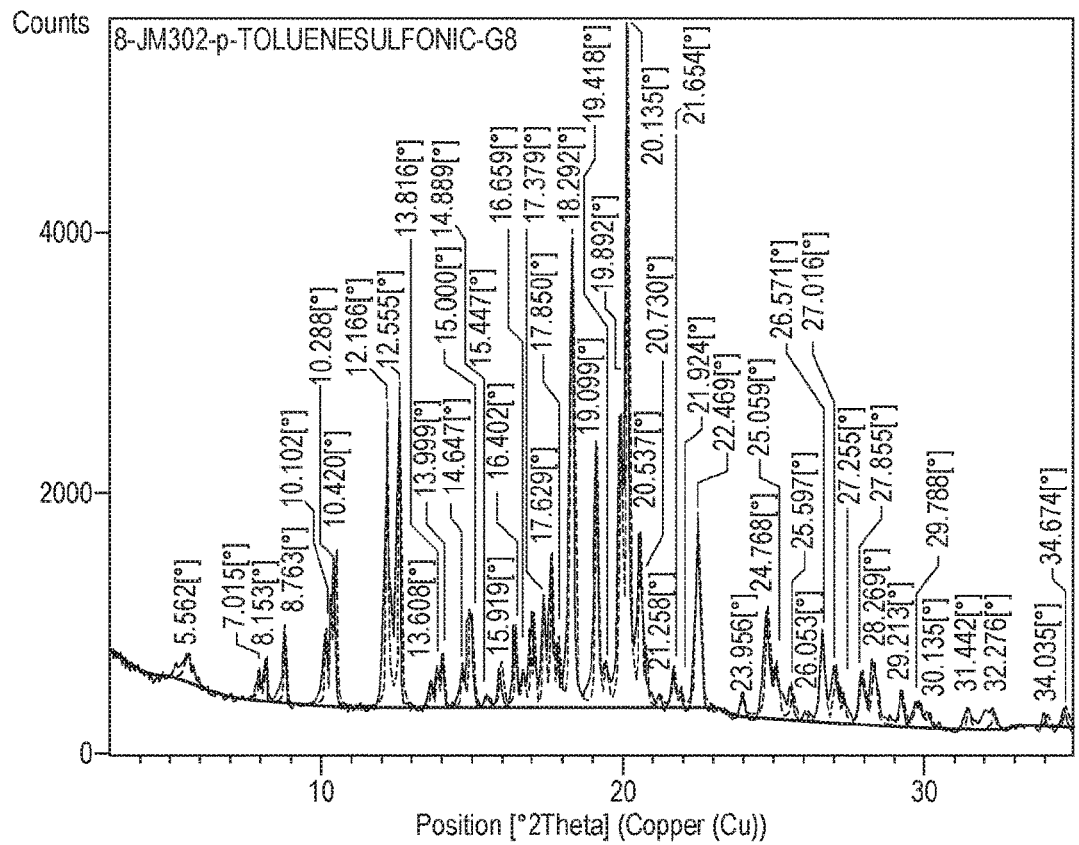

FIG. 30 shows the X-ray powder diffraction pattern of the 1:1 p-toluenesulfonate salt of compound (I).

Figure 31:
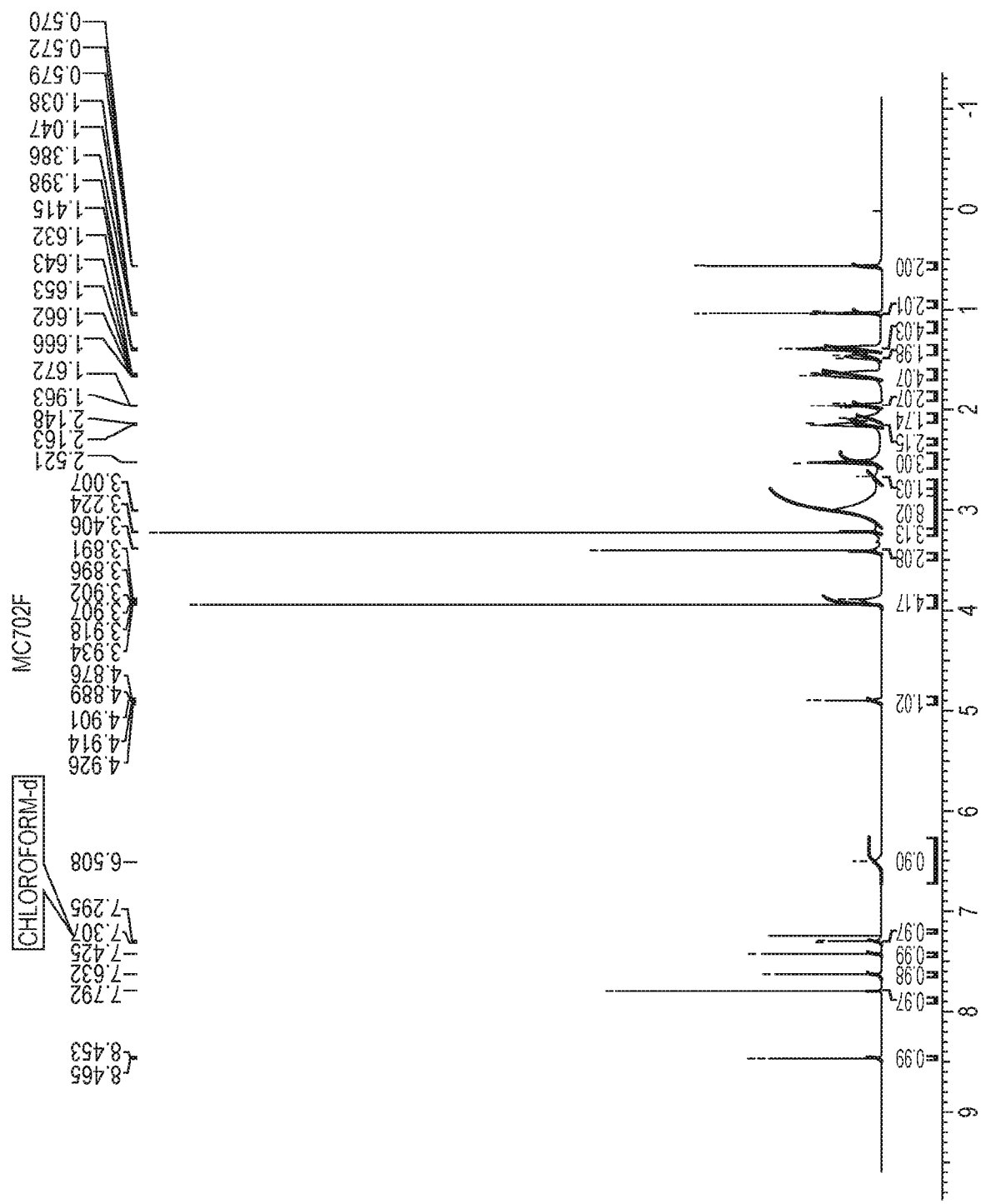

FIG. 31 shows the $^1$H NMR spectrum of the 1:1 monohydrochloride monohydrate salt of compound (I).

The present invention is further described with reference to the following non-limiting Examples.

EXAMPLES

Abbreviations
EtOH ethanol
MeOH methanol
EtOAc ethyl acetate
DCM dichloromethane
t-BuOK potassium tert-butoxide
MeI methyl iodide RT room temperature
Et₂O diethyl ether
NMP N-methylpyrrolidone
HPLC high performance liquid chromatography
HBTU (2-(1H-benzotriazol-1-yl)-1,1,3,3-tetramethyluronium hexafluorophosphate
DIPEA N,N-diisopropylethylamine
HOBt hydroxybenzotriazole
HRGC high resolution gas chromatography
KF Karl Fischer
MeCN acetonitrile
IMS industrial methylated spirits
TBME methyl tert-butyl ether
THF tetrahydrofuran
MEK methyl ethyl ketone
nBuOAc n-butyl acetate
nPrOH n-propanol 1. Instruments and Methods 1.1. Solution proton NMR $^1$H NMR spectra were collected using a JEOL EX 270 MHz spectrometer equipped with an auto-sampler. The samples were dissolved in a suitable deuterated solvent for analysis. The data was acquired using Delta NMR Processing and Control Software version 4.3.

1.2. X-Ray Powder Diffraction (XRPD)

X-Ray Powder Diffraction patterns were collected on a PANalytical diffractometer using Cu Kα radiation (45 kV, 40 mA), θ–θ goniometer, focusing mirror, divergence slit (½"), soller slits at both incident and divergent beam (4 mm) and a PIXcel detector. The software used for data collection was X'Pert Data Collector, version 2.2f and the data was presented using X'Pert Data Viewer, version 1.2d. XRPD patterns were acquired under ambient conditions via a transmission foil sample stage (polyimide—Kapton, 12.7 μm thickness film) under ambient conditions using a PANalytical X'Pert PRO. The data collection range was 2.994–35° 2θ with a continuous scan speed of 0.202004° s$^{-1}$. XRPD values are given as degrees 2-theta±0.2 degrees 2-theta. 2-theta values in the accompanying tables are presented to 4 decimal places; in the accompanying claims the 2-theta values are rounded to 2 decimal places. The skilled person would understand that the 2-theta values in the tables (which form the basis of the 2-theta values in the claims) could equally be rounded to 1 decimal place.

1.3. Differential Scanning calorimetry (DSC)

DSC data was collected on a PerkinElmer DSC 4000 equipped with a 45 position sample holder. The instrument was verified for energy and temperature calibration using certified indium. A predefined amount of the sample, 0.5-3.0 mg, was placed in a pin holed aluminium pan and heated at 20° C.·min$^{-1}$ from 30 to 300° C., or varied as experimentation dictated. A purge of dry nitrogen at 60 ml·min$^{-1}$ was maintained over the sample. The instrument control, data acquisition and analysis were performed with Pyris Software v9.0.1.0203.

1.4. Thermo-Gravimetric Analysis (TGA)

TGA data were collected on a PerkinElmer Pyris 1 TGA equipped with a 20 position auto-sampler. The instrument was calibrated using a certified weight and certified Alumel and Perkalloy for temperature. A predefined amount of the sample, 1-5 mg, was loaded onto a pre-tared aluminium crucible and was heated at 20° C.·min$^{-1}$ from ambient temperature to 400° C. A nitrogen purge at 20 ml·min$^{-1}$ was maintained over the sample. The instrument control, data acquisition and analysis were performed with Pyris Software v9.0.1.0203.

1.5. Gravimetric Vapour Sorption (DVS)

Sorption isotherms were obtained using a Hiden Isochema moisture sorption analyser (model IGAsorp), controlled by IGAsorp Systems Software V6.50.48. The sample was maintained at a constant temperature (25° C.) by the instrument controls. The humidity was controlled by mixing streams of dry and wet nitrogen, with a total flow of 250 ml·min$^{-1}$. The instrument was verified for relative humidity content by measuring three calibrated Rotronic salt solutions (10-50-88%). The weight change of the sample was monitored as a function of humidity by a microbalance (accuracy+/−0.005 mg). A defined amount of sample was placed in a tared mesh stainless steel basket under ambient conditions. A full experimental cycle typically consisted of three scans (sorption, desorption and sorption) at a constant temperature (25° C.) and 10% RH intervals over a 0-90% range (60 minutes for each humidity level). This type of experiment should demonstrate the ability of samples studied to absorb moisture (or not) over a set of well-determined humidity ranges.

1.6 High Resolution Gas Chromatography (HRGC)

HRGC spectra were obtained by Agilent 6890 series gas chromatography fitted with a headspace sampler. The samples were dissolved in methanol.

2. Preparative Methods for Each Salt

Compound (I) in free base form can be prepared in accordance with the synthesis shown below in Schemes 1, 2 and 3 (see also the methods described in WO 2009/040556; in particular, compound [384]):

Scheme 1 Synthesis of Intermediate A

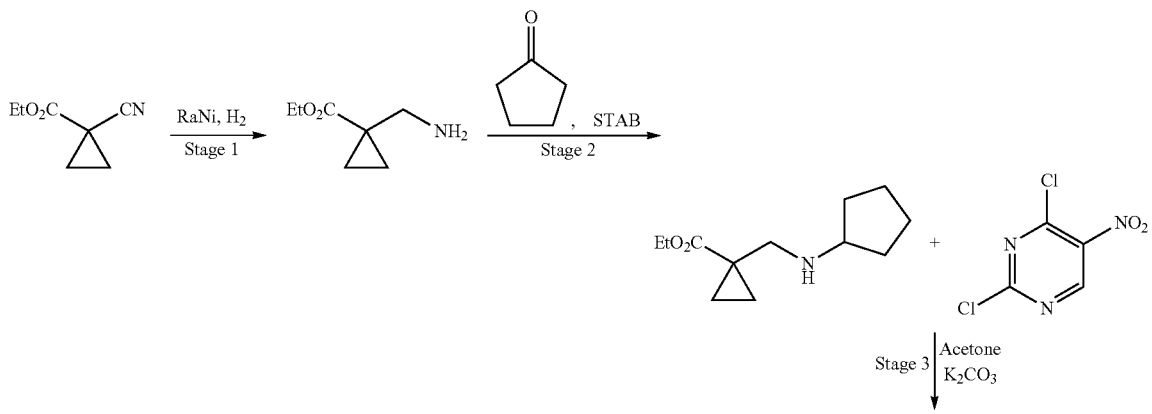

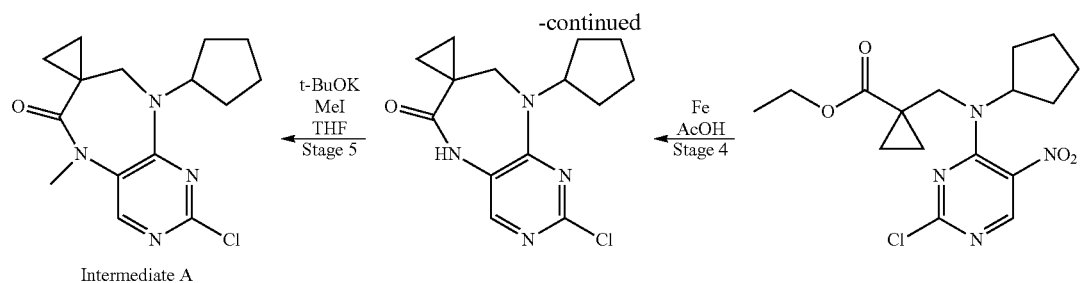
Scheme 2 Synthesis of Intermediate
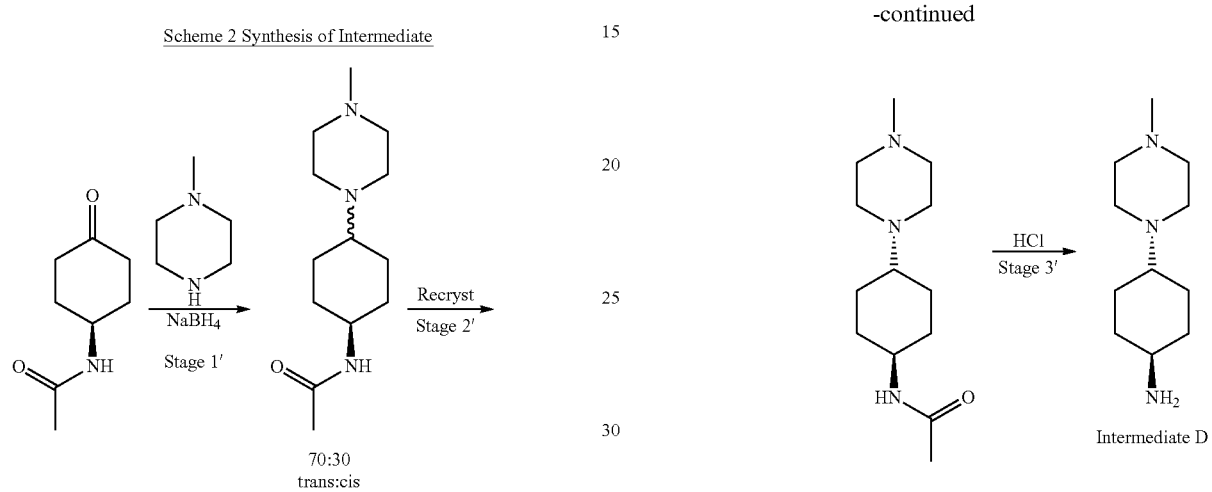
Scheme 3 Final stages
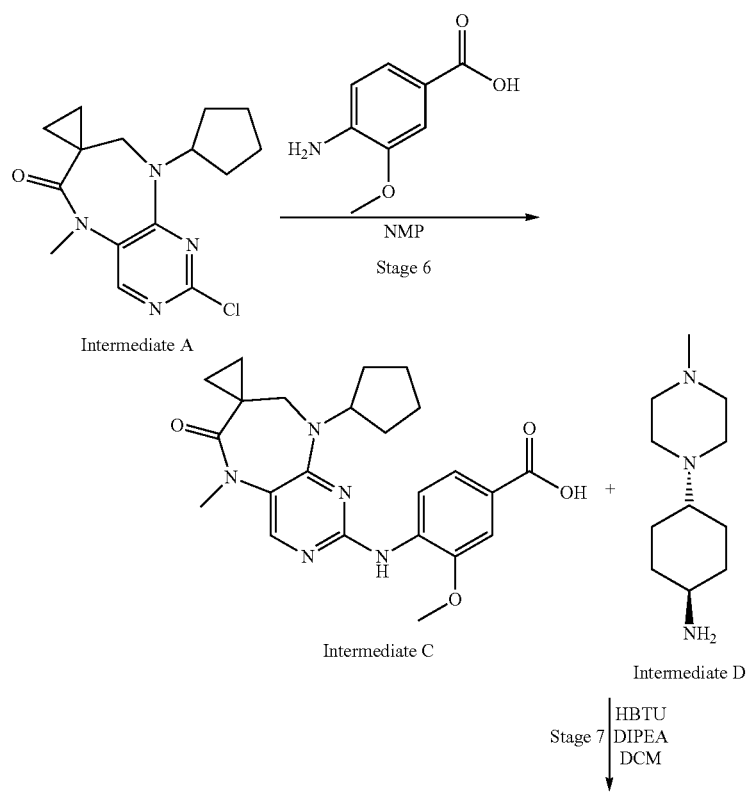

-continued

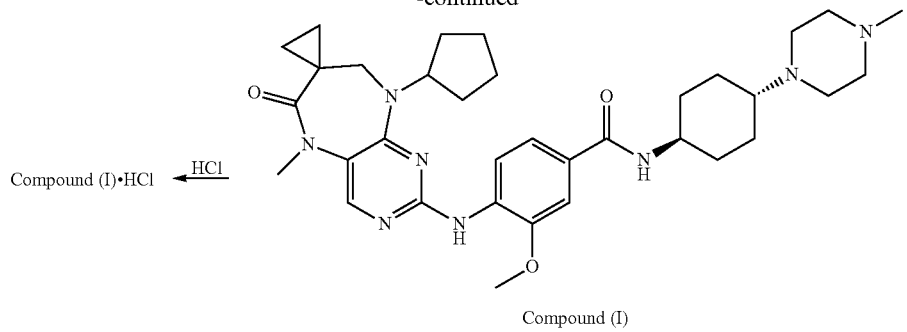

Compound (I)·HCl ←—HCl—

Compound (I)

2.1 Synthesis of Compound (I)
(i) Intermediate A
Stage 1

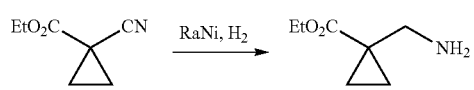

Raney Nickel catalyst (200 g, 50% water) was washed with EtOH (3×100 ml, solvent was decanted). The catalyst was then suspended in ethanol (200 ml). To a suspension of Raney Nickel (200 g, 50% suspension in EtOH) in EtOH (3 L) was added ethyl-1-cyanocyclopropanecarboxylate (600 g, 4.3119 mol). The hydrogenator was purged with $N_2$ (3×) and $H_2$ (3×). The reaction was pressured to 20 bar with hydrogen and stirred at room temperature overnight. The mixture was filtered through a pad of Celite (500 g) and washed with ethanol (2×0.6 L). The filtrate was concentrated. The residue was dissolved in DCM (1.8 L), dried over $MgSO_4$, filtered and concentrated. This gave the product as a clear oil (580 g, 94% yield).

Stage 2

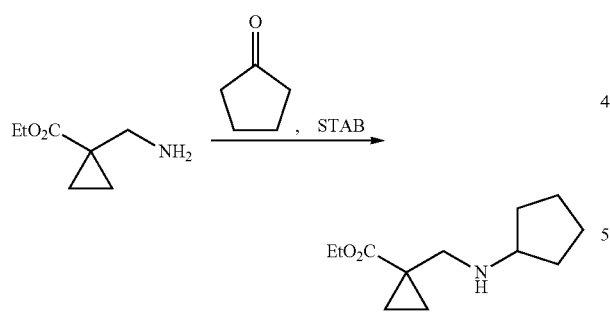

To a solution of the amine from Stage 1 (800 g, 5.5874 mol) and cyclopentanone (520 ml, 5.867 mol) in DCM (8 L) was added $NaBH(OAc)_3$ (1777 g, 8.381 mol) at room temperature portionwise over ~1.5 h. The reaction mixture was then stirred at room temperature overnight. To decompose the excess of the reducing agent a saturated solution of $K_2CO_3$ in water (8 L) was added and the reaction mixture was stirred for 1 h at RT (gas evolution, pH=8). The layers were separated and the aqueous layer was extracted with DCM (4 L). The combined organic layers were washed with $K_2CO_3$aq (4 L), dried over $MgSO_4$, filtered and concentrated. This gave 1210.3 g of the product as a clear oil (1157 g active (contained 4.3% DCM), 98% yield).

Stage 3

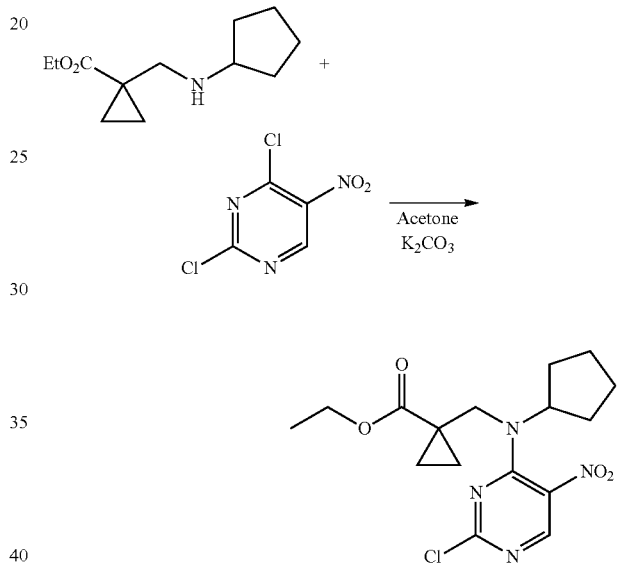

A solution of 2,4-dichloro-5-nitropyrimidine (1309.4 g, 6.750 mol) in acetone (11.4 L) was cooled to 0-5° C. and $K_2CO_3$ (933 g, 6.750 mol) was added. A solution of the amine from Stage 2 (1426.3 g, 6.750 mol) in acetone (2.9 L) was then added dropwise over 1.5 h maintaining the temperature below 5° C. After 1 h, $^1$H NMR analysis showed ~6% of 2,4-dichloro-5-nitropyrimidine and no Stage 2 amine. Stage 2 amine(86 g, 0.407 mol) in acetone (50 ml) was added and the mixture was stirred at RT for 1 h. The solids were filtered off and washed with acetone (1 L). The filtrate was concentrated at 25° C. (at higher temperatures the product polymerizes), the residue was dissolved in DCM (8 L), washed with water (2 L), dried over $MgSO_4$, filtered and concentrated at 25° C. This gave the product as an orange oily solid (2755 g, LC 85% pure). The product was suspended in $Et_2O$ (475 ml) and stirred at room temperature for 15 min. Heptane (475 ml) was added and the suspension was stirred for 1 h at room temperature. After that time the mixture was filtered, the filter cake was washed with $Et_2O$/heptane (1:1, 2×950 ml) and dried at 25° C. in a vacuum oven overnight. This gave 1762.2 g of the product as a yellow solid (71% yield, LC 96.99% pure).

Stage 4

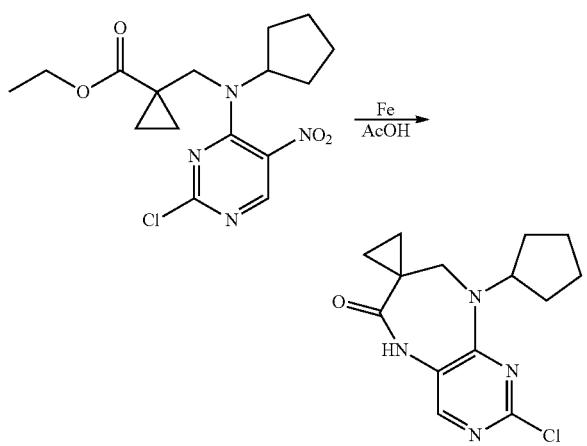

AcOH (7.6 L) was heated to 60° C. and the heating mantle was removed. Fe powder (431 g, 7.727 mol) was added portionwise at 60° C. over 15 min (no exotherm, small gas evolution). The mixture was then cooled to 25° C. (ice bath) and the product from Stage 3 (950 g, 2.576 mol) was added portionwise over 3 h (small exotherm observed, cooled with ice/water, reaction temp maintained between 25-30° C.). The reaction mixture was stirred overnight at 25° C. After that time LC completion check indicated 82.0% product.

The mixture was diluted with water (15.2 L, no exotherm) and the product was filtered off using filter cloth. The filter cake was washed with water (500 ml) then treated with saturated $NaHCO_3$aq (2 L, gas evolution). The solids were filtered off (filter paper) and washed with water (3×500 ml). The damp cake (1717 g) was combined with three batches of the product from Stage 4 prepared by the same method [batch 1 (950 g)-1668 g water wet, batch 2 (950 g)-1701 g water wet, batch 3 (581.1 g) 1113 g water wet] and stirred in water (5 L) for 1 h at room temperature. The solids were filtered off and dried at 50° C. for 5 days in a vacuum oven. This gave 2972.4 g of the product as a brown solid (~100% yield, LC purity 94.5%, KF 0.65%, contains Fe salts). The product was used in the next stage without purification.

Stage 5

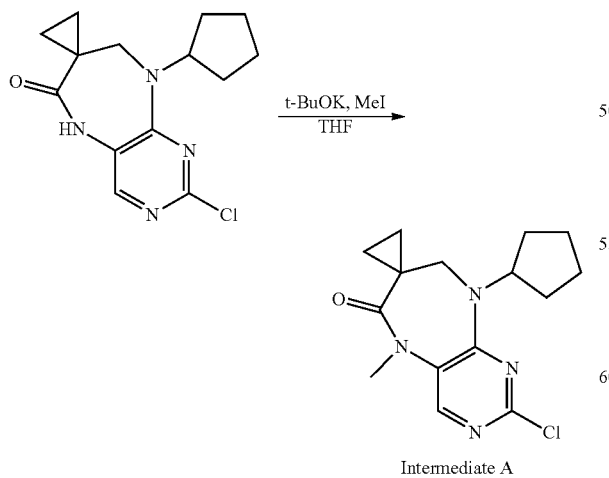

Intermediate A

The product from Stage 4 (2019.1 g gross, 1850.0 g active—assumed 100% yield at stage 4) was added portionwise over 10 minutes within the specified range of 0-10° C. to a suspension of t-BuOK (854.3 g) in THF (19.0 L). The reaction mixture was stirred for 30 minutes within the specified range of 0-10° C. (final temperature 5.47° C.) then methyl iodide (440 ml) was added dropwise over 23 minutes maintaining the temperature within the specified range of 0-5° C. The mixture was stirred within the specified range of 0-5° C. for 15 minutes and then warmed to 20° C. over 2.5 hours and then stirred within the specified range of 20-25° C. overnight (12 hours). Completion analysis by HPLC showed that the reaction was complete (0.5% product from Stage 4 remaining, target not more than 1.0% remaining). The salts were filtered off and washed with THF (1920 mL). The filtrate was concentrated in vacuo and the residue (2321.2 g) was partitioned between DCM (5770 mL) and water (1150 mL) (note: the residue did not dissolve fully prior to partitioning with a cloudy aqueous layer present, this did not prevent the phases from separating). The organic layer was dried over $MgSO_4$ (426.2 g) filtered, washed with DCM (1000 mL) and concentrated in vacuo. This gave the product as a pale yellow solid (1924.3 g) which was oven dried at 40° C. for 24 hours to give the product from Stage 5. Yield=(1502.2 g, 77.5%). Material 98.48% pure by HPLC (0.0% product from Stage 4)

(ii) Intermediate D

Stages 1' and 2'

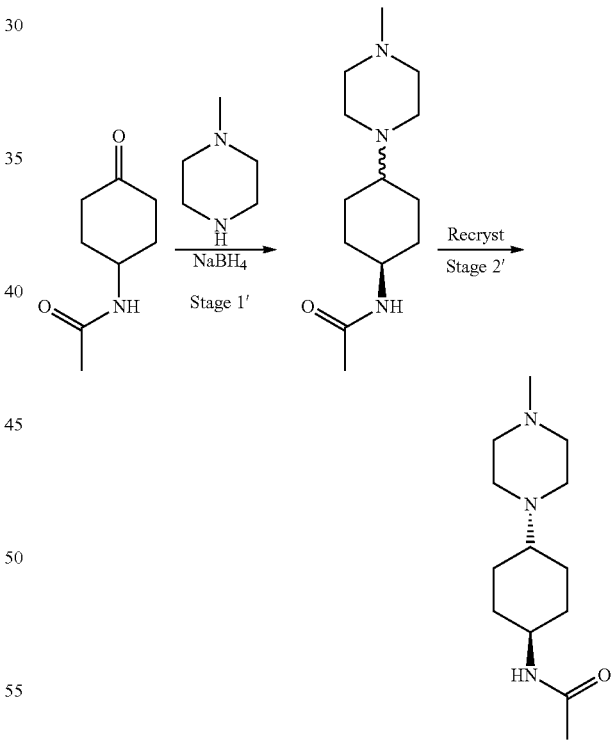

4-Acetamidocyclohexanone (850 g, 5.477 mol), N-methylpiperazine (729 ml, 6.573 mol) and $MeSO_3H$ (28.5 ml, 0.438) in toluene (6.8 L) were heated for 5 h at reflux employing a Dean & Stark separator (94 ml of water was collected). The skilled person would understand that alternative amine protecting groups could be used in compound XIII, e.g. BOC, $Bn_2$ and the like. After that time the mixture was cooled to 50° C. (at lower temperatures mixture solidifies) and diluted with EtOH (6.8 L). The intermediate enamine was treated with NaBH$_4$ (207.2 g, 5.477 mol) portionwise at 15-20° C. and stirred at room temperature overnight. The excess of NaBH$_4$ was decomposed with 6M HCl (4 L) at 10-15° C. The skilled person would understand that alternative reducing agents could be used, e.g. LiBH$_4$ instead of NaBH$_4$. The layers were separated and the aqueous layer was treated with K$_2$CO$_3$ (1.2 kg, to achieve pH=8). The solids were filtered off and washed with DCM (2.5 L, this was used later for the extraction). The filtrate was concentrated. The residue was extracted with DCM (2×2.5 L), basified with 1.25M KOH (200 ml, to pH=10) and extracted with DCM (2.5 L). The combined organic layers were dried over MgSO$_4$, filtered and concentrated. The crude product (1020 g) was combined with 3792 g of the product from batches 1-3 prepared by the same method and purified on basic alumina (16.5 kg) eluting with 50%heptane/DCM (16 L), 75% heptane/DCM (32 L), DCM (40 L) then 10 L 1% MeOH/DCM. This gave the product as a white solid (2410 g, 47% yield; cis:trans ratio 36:64).

The product was combined with 753.7 g of cis/trans product, dissolved in MeCN (9.32 L) at reflux and allowed to cool to RT overnight. The suspension was cooled to 5-10° C. and stirred for 2 h. The precipitate was filtered off, washed with MeCN (1×3.1 L, 1×2 L and 1×1 L) and pulled dry on the filter. The product was dried at 45° C. overnight. This gave 544.9 g of the product as a white solid (1613.2 g, ~25% yield, >95% pure by $^1$H NMR, cis isomer not detected by $^1$H NMR).

Stage 3'

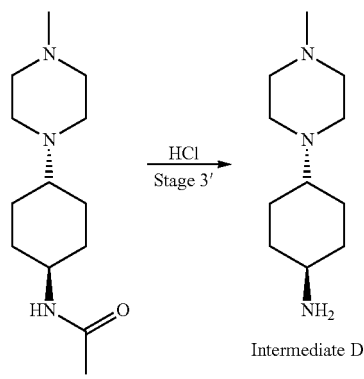

Intermediate D

Concentrated hydrochloric acid (4500 mL) was added over 5 minutes to water for irrigation (2240 mL) maintaining a temperature within the specified range of 20-40° C. (final temp 23.83° C.). Intermediate D acetate (1100.9 g) was added over 4 minutes and the reaction was then heated to 105° C. over 60 minutes. The reaction was heated at 95-106° C. overnight (17.5 hours) by which time an in-process check by 1H NMR showed that the reaction was complete. The reaction mixture was cooled to within the specified range of 15-25° C. over 72 minutes. Solid potassium hydroxide (5890.1 g) was added in portions over approximately 1 hour maintaining the temperature within the specified range of 20-45° C. to give a final pH of 12. The reaction mixture was cooled to within the specified range of 15-25° C. over 5 minutes and stirred at within the specified range of 15-25° C. overnight (17.5 hours) (final temperature 17.97° C.). The suspension was filtered and the filter cake washed with THF (6120 ml×3 then 4080 mL). The combined filtrate was returned to the vessel and the phases separated. The organic phase was concentrated in vacuo in portions to give 1287.4 g of material. The residual water was removed by azeotroping with toluene (2025 mL, then 2020 mL). The product was then dissolved in DCM (2000 mL), the solids were filtered off (a small amount of inorganic material was removed), washed with DCM (200 ml) and the filtrate was concentrated in vacuo. This gave the product as low melting solid (939.1 g, quantitative yield, active yield (by $^1$H NMR) 888.4 g, 97.9%). 4.59% toluene and 0.81% DCM by $^1$H NMR, 90.1% intermediate D trans by HRGC.

Alternative Synthesis of Intermediate D

Alternatively, the reductive amination step can be carried out as follows:

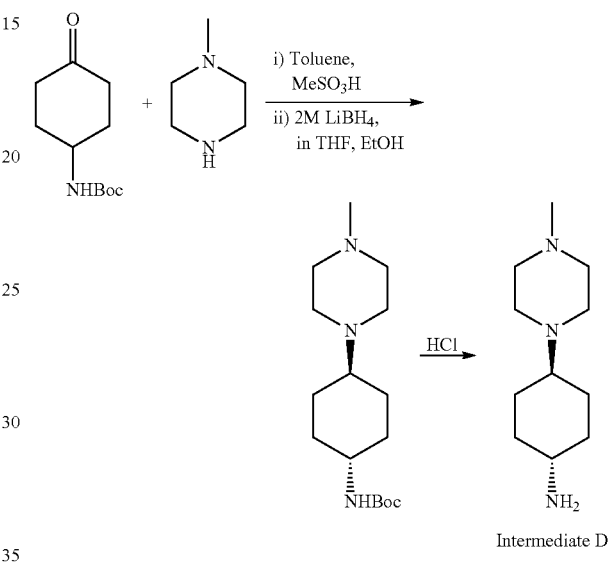

Intermediate D

Boc-4-aminocyclohexanone (20 g, 93.8 mmol), followed by N-methylpiperazine (13 mL, 117.2 mmol), methanesulfonic acid (0.5 mL, 7.7 mmol) and toluene (140 mL) were added to a flask at RT under N$_2$. The slurry was heated over 30 mins to reflux in a Dean-Stark set up [no exotherm noted upon warming] and a pale brown solution formed. The solution was stirred at 110° C. to 115° C. for 6 h to remove H$_2$O. and at this point, $^1$H NMR showed 83% enamine. The solution was cooled to 50° C. over 20 min (using an ice/water bath) and EtOH (100 mL) was added. The solution was then further cooled to 20° C. over 20 min and LiBH$_4$ (2M in THF, 100 mL, 200.0 mmol) was added dropwise over 30 min [exotherm 20-27° C. and significant off-gassing observed]. The reaction was left to stir at RT for 18 h. At this point, $^1$H NMR showed <5% enamine. The reaction was quenched via dropwise addition of 6M HCl (~150 mL, 900.0 mmol) [exotherm 20-25° C. and minor off-gassing] over 15 mins until pH 2 was observed. The phases were separated, and the organic layer was removed. The aqueous was then basified via addition of K$_2$CO$_3$(s) (30 g, 217.1 mmol) over 15 mins [exotherm 20-28° C. and significant off-gassing] until pH 8 was reached. The slurry was filtered, and the filtrate was reduced in vacuo to give a pale brown oil. The filter cake was washed with DCM (2×80 mL). The brown oil-was partitioned between the DCM from the filter-cake washing and 2M NaOH (20 mL). The aqueous was removed and extracted with DCM (90 mL). The combined DCM extracts were dried (MgSO$_4$), filtered and reduced in vacuo to give a pale orange oil. The oil was azeotroped with MeCN (100 mL) to give 23 g of a beige solid (82% crude yield). $^1$H NMR that showed ~75/25 ratio of trans to cis and an overall purity of ~50%. An 11 g portion of the solid was slurried in MeCN (55 mL) and heated to 70° C. [a solution formed at 67° C], then cooled to RT over 1 h. The slurry was stirred at RT for 18 h. The slurry was filtered, washed (MeCN, 5 mL) and dried in vacuo to give 4.3 g of the trans Boc-protected product (32% yield) as a white powder at 95% purity by $^1$H NMR with <1% cis.

The trans Boc-protected product was then deprotected by treatment with concentrated HCl under the same conditions set forth above to form Intermediate D.

Final Compound (I) Synthesis Stages

Stage 6 (Intermediate C)

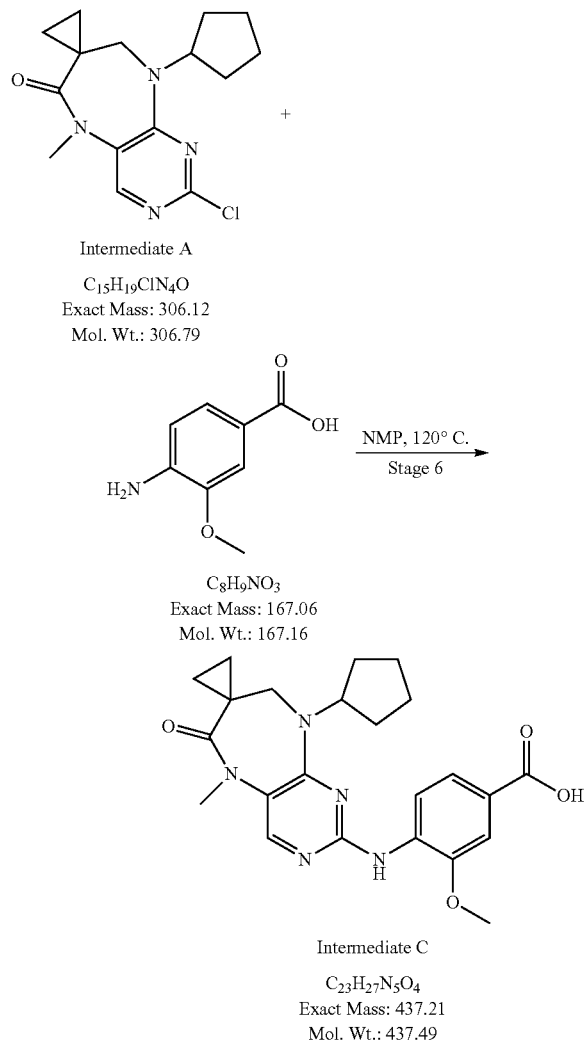

A solution of the product from Stage 5 (Intermediate A) (1490.6 g active, 1492.7 g gross) and the amino acid (898.9 g) in NMP (2960 mL) was heated to within the specified range of 115-125° C. over 51 minutes and then heated within the range 115-125° C. for 36 h. The batch was cooled with stirring for 4 hours after which time it was left to cool without stirring (when cooled the batch contains a significant quantity of solid which does not stir easily). After standing for almost 29 hours the batch was warmed to 52° C. to allow the batch to be sampled as a mobile homogenous suspension. Analysis by HPLC showed that the reaction was complete (83.35% product from Stage 6 present, target GT 75%). The batch was cooled to 20° C. and the mixture was diluted with water for irrigation (6000 mL) with a moderate exotherm being observed which caused the batch to warm to 26.8° C., external cooling was applied and the batch was then stirred at within the specified range of 10-25° C. for 40 minutes, the product was filtered, washed with water for irrigation (2×1500 mL), pulled dry and oven dried within the specified range of 45-55° C. for 18-20 hours by which time the product in each of the three oven drying trays showed a water content of LT 10% (by KF analysis). The crude product (2212.7 g) was slurried in toluene (6630 mL) for 74 minutes at 10-25° C. (final temp 18.3° C.) in order to remove unreacted product from Stage 5. The solid was filtered, washed with toluene (1520 mL) and oven dried within the specified range of 45-55° C. for 17 hours. In-process analysis on the solid in each of the three oven drying trays showed 0.21-0.35% product from Stage 5 by HPLC (target LT 0.5%); 1.56-1.85% NMP by $^1$H NMR (target NMT 2.5%) with toluene not detected by $^1$H NMR (result F01). The solid was then packaged. Yield 1905.8 g (89.7% yield). 93.16% pure by HPLC (0.30% stage 5).

Stage 7

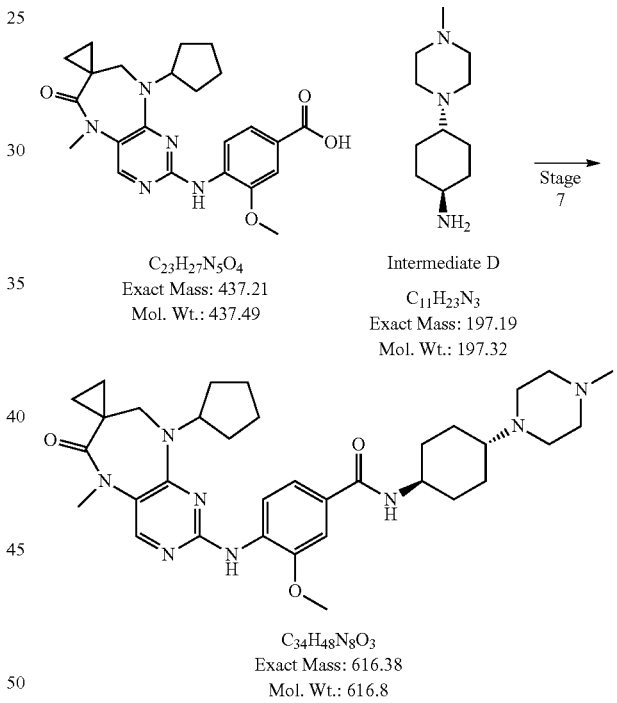

To a suspension of the product from Stage 6 (1869.8 g active, 1896.5 g gross) in DCM (18640 mL) was added HBTU (1801.9 g) rinsing in with DCM (20 mL) within the specified range of 15-25° C. DIPEA (1500 mL) was then added dropwise at within the specified range of 15-25° C. The reaction mixture was stirred with the specified range of 15-25° C. for 31 minutes by which time analysis by TLC indicated complete consumption of the product from Stage 6. Intermediate D (905.1 g) was added portionwise over 30 minutes maintaining the temperature within the specified range of 15-25° C. The reaction mixture was stirred within the specified range of 15-25° C. for 69 minutes. The batch was then sampled and analysis by HPLC showed 0.02% product from Stage 6 remaining (target LT 0.5%). The mixture was washed with NaOH solution (9440 mL, then 9400 mL, then 9420 mL, 0.4M NaOH) and water (9400 mL) in order to remove HOBt. After the final wash in-process analysis indicated 0.05% HOBt by HPLC (target LT 1%). It was noted that a significant quantity of solid had precipitated in the organic layer. The organic layer could not immediately be dried over MgSO₄ since the solid would be lost during filtration. The suspension in the organic phase was filtered and the filter cake washed with DCM (500 mL). The filtrate was then dried over MgSO₄ (1284.3 g) filtered and washed with DCM (1500 mL). The organics were then concentrated in vacuo at 40° C. The filtered solid was then added to give 3489.9 g of solid. The crude product (in 6 flasks) was evaporated from EtOAc (total 6500 mL). The product was returned to the 50 L vessel and slurried in EtOAc (8500 mL) at within the specified range of 10-25° C. for 36 minutes, filtered, washed with EtOAc (2160 mL, then 2150 mL) and dried at within the specified range of 45-55° C. for 64.5 hours. This gave 2475.3 g of the product (0% EtOAc, 10.6% DCM by 1HNMR). The product was dissolved in MeOH (5980 mL) at within the specified range of 60-70° C. (final temperature 62.7° C.). The solution was immediately polish filtered into the 50 L vessel (final temperature 54.17° C.). The solution was warmed-up to within the specified range of 60-70° C. (final temperature 60.3° C.). Water for irrigation (5760 mL) was added dropwise over 39 minutes maintaining temperature within the specified range of 60-70° C. The mixture was stirred at within the specified range of 60-70° C. for 10 minutes and was then cooled to 25° C. over 123 minutes. After stirring at within the specified range of 15-25° C. for 21 minutes (final temperature 19.16° C.) the suspension was filtered, washed with a (1:1) solution of MeOH in water for irrigation (2880 mL, then 2700 mL), pulled dry on the filter and oven dried at within the specified range of 45-55° C. for 19.5 hours to give 2076.3 g (78.8% yield) of product. 96.43% pure by HPLC (0.33% product from Stage 7 cis, 0.01% product from Stage 6, 0.01% HOBt, specification NLT 95.0%); 2.75% water by KF.

2.2 Monohydrochloride Monohydrate

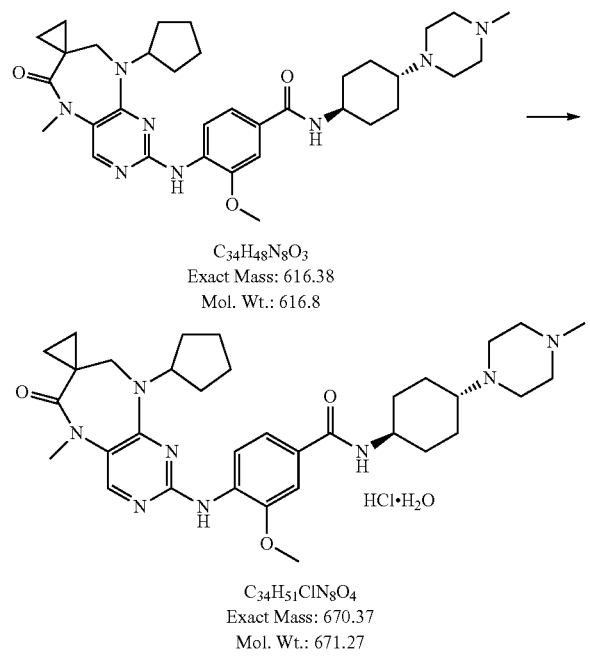

$C_{34}H_{48}N_8O_3$
Exact Mass: 616.38
Mol. Wt.: 616.8

HCl·H₂O $C_{34}H_{51}ClN_8O_4$
Exact Mass: 670.37
Mol. Wt.: 671.27

The final salt formation was commenced on 2033.6 g active (2067.3 g gross). The batch crystallized from the HCl/ethanol/ethyl acetate mixture as expected and after filtration XRPD analysis of the filter cake showed a crystalline form in accordance with Table 1. The product was dried for 5 days to remove solvent and was then equilibrated for 1 day to achieve the required water content. The product was obtained in 84.8% yield (target 86%) and the product was within the required purity.

A suspension of free base compound (I) (2033.6 g active, 2067.3 g gross) in polish filtered ethanol (14240 mL) was heated to 75° C. over 55 minutes. After stirring at within the specified range of 75-85° C. for 30 minutes (final temperature 77.26° C.), the mixture was then cooled to within the specified range 65-75° C. over 5 minutes (final temperature 74.98° C.) and polish filtered 1.25 M HCl in EtOH (2640 mL) was added over 16 minutes maintaining the temperature within the specified range of 65-75° C. and then stirred within the specified range for 10 minutes (final temperature 69.83° C.). Polish filtered EtOAc (20500 mL) was charged over 50 minutes maintaining the temperature within the specified range of 50-70° C. After stirring at within the specified range of 50-70° C. for 10 minutes the mixture was cooled to within the specified range of 15-25° C. over two hours and then stirred at within the specified range of 15-25° C. for 12.5 hours (final temperature 19.62° C.). The suspension was cooled to within the specified range 0-10° C. and stirred for 3 hours (final temperature 5.00° C.). The suspension was filtered, washed with polish filtered ethyl acetate (2000 mL) and analysis indicated a crystalline form in accordance with Table 1. The solid was oven dried at within the specified temperature range of 45-55° C. for 5 days to remove solvent (mass 1834.5 g). The oven was turned off and filtered air (filter size 1.2 μm) was drawn through the oven for 25 hours to equilibrate (absorb moisture) to give 1875.5 g of product as an off-white solid. 97.22% pure by HPLC; 3.29% water by KF; 1878 ppm ethyl acetate and 689 ppm ethanol by HRGC.

2.3 General Procedure Used for L-Malate 2:1 Succinate 2:1, Maleate 2:1, Monohydrochloride Monohydrate and Monobromide Monohydrate A clarified solution, 4.297 ml, of compound (I), 0.5 g, in ethanol was charged to reaction tubes and suspended with agitation and heated to 75° C. Counter ion solutions (e.g. HCl, HBr, L-malic acid, maleic acid, succinic acid) in ethanol or ethanol/THF mixture which equated to the required equivalents of compound (1) were charged to the API solution and the mixtures cooled in a controlled manner to ambient temperature with agitation from 75° C. to 60° C. and held for ca 2 hours, then 40° C. and held for ca 2 hours. Counterion equivalents (volume (ml) and concentration (mg/ml) are set out in Table 7. The procedure can be adapted to add EtOAc as an antisolvent prior to the cooling step; this can increase the yield. The mixtures were then cooled to ambient temperature and agitated at ambient temperature for ca 18 hours. Solids were isolated by filtration and dried in vacuo for ca 20 hours at 50° C. The observations of the mixtures at various temperatures are detailed in Table 7. The recoveries and appearance of the solids are detailed in Table 8.

All the salt forms have sharp melting points and are highly crystalline as judged by XRPD. The monohydrochloride monohydrate was a stable crystalline form with relatively low hygroscopicity.

The presently claimed forms are characterized as slightly hygroscopic as defined by the classification in Table 9 (Hygroscopicity Classification (adopted from Ph.Eur. and Sihorkar et al, Pharmaceutical Dev. & Technol. (2013), 18(2), 348-358) and sorption data (Table 10) taken from GVS analysis over the range of 40-80% RH at 25° C. In contrast, other salts (for example, 1:1 citrate and 1:0.5 L-tartrate) were characterized as hygroscopic using the same classification.

2.4 p-Toluenesulfonate

Compound (I), 0.5 g, was dissolved in THF (7.5 ml) and ethanol (1 ml) with agitation and heated to 60° C. p-Toluenesulfonic acid, 1.0 equiv., as a solution in ethanol, 0.430 ml, 358.52 mg/ml, was charged and the mixture cooled to ambient temperature. The clear solution was then concentrated under ambient conditions with agitation for ca 90 hours with no significant loss of solvent or evidence of crystallisation. The volume of the reaction mixture was reduced with a nitrogen stream by approximately a quarter which afforded a thick white suspension following ca 3 hours agitation. Ethanol, 4×0.5 ml, was then charged to the mixture in order to improve the mobility of the mixture and equilibrated at ambient temperature for ca 21 hours. The solid was isolated by filtration and dried in vacuo for ca 19 hours at 50° C. The recovery and appearance of the solid are detailed in Table 8.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

TABLE 1

XRPD Peaks for Monohydrochloride Monohydrate

| Pos. [°2Th.] | Height [cts] | FWHM [°2Th.] | d-spacing [Å] | Rel. Int. [%] | Tip width [°2Th.] |
|---|---|---|---|---|---|
| 5.5727 | 146.66 | 0.5117 | 15.85893 | 4.14 | 0.6140 |
| 6.1899 | 105.12 | 0.1023 | 14.27896 | 2.97 | 0.1228 |
| 7.9661 | 228.77 | 0.1279 | 11.09885 | 6.46 | 0.1535 |
| 8.3198 | 1239.14 | 0.0768 | 10.62777 | 34.99 | 0.0921 |
| 10.4750 | 3541.14 | 0.0768 | 8.44542 | 100.00 | 0.0921 |
| 10.7156 | 761.73 | 0.0768 | 8.25635 | 21.51 | 0.0921 |
| 11.8258 | 1147.84 | 0.1279 | 7.48360 | 32.41 | 0.1535 |
| 12.5271 | 1410.37 | 0.1023 | 7.06621 | 39.83 | 0.1228 |
| 12.7414 | 390.66 | 0.0768 | 6.94783 | 11.03 | 0.0921 |
| 13.3354 | 897.39 | 0.1279 | 6.63967 | 25.34 | 0.1535 |
| 13.8623 | 258.19 | 0.1023 | 6.38846 | 7.29 | 0.1228 |
| 14.6856 | 381.64 | 0.1279 | 6.03210 | 10.78 | 0.1535 |
| 15.6246 | 128.80 | 0.1023 | 5.67166 | 3.64 | 0.1228 |
| 16.0187 | 1519.61 | 0.0768 | 5.53300 | 42.91 | 0.0921 |
| 16.7491 | 2305.46 | 0.1535 | 5.29331 | 65.11 | 0.1842 |
| 17.0164 | 533.71 | 0.1023 | 5.21077 | 15.07 | 0.1228 |
| 17.4206 | 630.42 | 0.1023 | 5.09077 | 17.80 | 0.1228 |
| 18.1884 | 2029.03 | 0.1535 | 4.87756 | 57.30 | 0.1842 |
| 18.8055 | 1151.69 | 0.1279 | 4.71886 | 32.52 | 0.1535 |
| 19.0757 | 554.71 | 0.1023 | 4.65262 | 15.66 | 0.1228 |
| 19.4911 | 3023.05 | 0.1791 | 4.55441 | 85.37 | 0.2149 |
| 19.8313 | 352.65 | 0.1535 | 4.47703 | 9.96 | 0.1842 |
| 20.1531 | 256.16 | 0.1535 | 4.40627 | 7.23 | 0.1842 |
| 20.5539 | 1350.02 | 0.1791 | 4.32123 | 38.12 | 0.2149 |
| 21.1167 | 648.28 | 0.1535 | 4.20733 | 18.31 | 0.1842 |
| 22.8161 | 240.78 | 0.1535 | 3.89765 | 6.80 | 0.1842 |
| 23.7830 | 784.30 | 0.2558 | 3.74134 | 22.15 | 0.3070 |
| 24.6761 | 207.60 | 0.2558 | 3.60792 | 5.86 | 0.3070 |
| 25.1025 | 411.63 | 0.1535 | 3.54759 | 11.62 | 0.1842 |
| 25.6996 | 1319.57 | 0.1535 | 3.46651 | 37.26 | 0.1842 |
| 25.8576 | 953.38 | 0.1023 | 3.44569 | 26.92 | 0.1228 |
| 26.8558 | 573.23 | 0.1279 | 3.31983 | 16.19 | 0.1535 |
| 27.9208 | 226.00 | 0.1535 | 3.19558 | 6.38 | 0.1842 |
| 28.5267 | 102.36 | 0.1535 | 3.12907 | 2.89 | 0.1842 |
| 28.9236 | 90.06 | 0.1535 | 3.08703 | 2.54 | 0.1842 |
| 29.7128 | 240.19 | 0.1791 | 3.00681 | 6.78 | 0.2149 |
| 30.8020 | 71.64 | 0.3070 | 2.90292 | 2.02 | 0.3684 |
| 31.5558 | 618.68 | 0.1535 | 2.83527 | 17.47 | 0.1842 |
| 32.3826 | 372.08 | 0.1535 | 2.76475 | 10.51 | 0.1842 |
| 32.9781 | 257.84 | 0.1535 | 2.71617 | 7.28 | 0.1842 |
| 34.1254 | 94.48 | 0.3070 | 2.62743 | 2.67 | 0.3684 |

TABLE 2

XRPD Peaks for L-Malate 1:2

| Pos. [°2Th.] | Height [cts] | FWHM [°2Th.] | d-spacing [Å] | Rel. Int. [%] |
|---|---|---|---|---|
| 4.4832 | 120.45 | 0.1279 | 19.71031 | 5.44 |
| 5.5686 | 207.05 | 0.1535 | 15.87077 | 9.35 |
| 5.8863 | 164.43 | 0.1535 | 15.01475 | 7.42 |
| 7.6361 | 104.60 | 0.1023 | 11.57765 | 4.72 |
| 9.0248 | 635.20 | 0.1279 | 9.79897 | 28.67 |
| 9.9451 | 568.82 | 0.1023 | 8.89425 | 25.68 |
| 10.1964 | 452.58 | 0.1023 | 8.67560 | 20.43 |
| 10.8980 | 419.84 | 0.1535 | 8.11854 | 18.95 |
| 12.2046 | 335.18 | 0.1023 | 7.25219 | 15.13 |
| 12.8147 | 195.01 | 0.0768 | 6.90827 | 8.80 |
| 13.4689 | 142.86 | 0.1279 | 6.57416 | 6.45 |
| 14.1501 | 166.98 | 0.1023 | 6.25918 | 7.54 |
| 14.6906 | 1530.81 | 0.1279 | 6.03008 | 69.10 |
| 14.9526 | 1548.53 | 0.1279 | 5.92499 | 69.90 |
| 15.6655 | 610.69 | 0.1535 | 5.65694 | 27.57 |
| 16.0610 | 655.92 | 0.1279 | 5.51851 | 29.61 |
| 17.9110 | 1218.71 | 0.1535 | 4.95247 | 55.01 |
| 18.5585 | 1161.92 | 0.2047 | 4.78111 | 52.45 |
| 19.2509 | 2215.25 | 0.1535 | 4.61069 | 100.00 |
| 20.1476 | 1607.35 | 0.2047 | 4.40745 | 72.56 |
| 20.6489 | 285.39 | 0.1535 | 4.30158 | 12.88 |
| 21.3540 | 398.41 | 0.1535 | 4.16111 | 17.98 |
| 21.9362 | 896.74 | 0.1791 | 4.05197 | 40.48 |
| 22.8534 | 511.79 | 0.1023 | 3.89138 | 23.10 |
| 24.0703 | 775.22 | 0.1791 | 3.69733 | 34.99 |
| 24.2755 | 802.01 | 0.1279 | 3.66654 | 36.20 |
| 24.9750 | 207.77 | 0.0768 | 3.56541 | 9.38 |
| 25.6251 | 401.02 | 0.1791 | 3.47642 | 18.10 |
| 26.8245 | 74.65 | 0.2047 | 3.32363 | 3.37 |
| 27.7022 | 199.15 | 0.1279 | 3.22029 | 8.99 |
| 29.2546 | 159.15 | 0.1535 | 3.05285 | 7.18 |
| 30.2363 | 195.09 | 0.2558 | 2.95593 | 8.81 |
| 31.2804 | 75.70 | 0.2047 | 2.85961 | 3.42 |
| 32.1638 | 60.85 | 0.4093 | 2.78306 | 2.75 |
| 33.0314 | 144.00 | 0.3070 | 2.71191 | 6.50 |
| 34.4670 | 39.01 | 0.2558 | 2.60217 | 1.76 |

TABLE 3

XRPD Peaks for Succinate 1:2

| Pos. [°2Th.] | Height [cts] | FWHM [°2Th.] | d-spacing [Å] | Rel. Int. [%] |
|---|---|---|---|---|
| 3.1636 | 161.24 | 0.3070 | 27.92864 | 5.36 |
| 5.4686 | 212.16 | 0.3582 | 16.16073 | 7.05 |
| 9.0113 | 212.32 | 0.1023 | 9.81363 | 7.06 |
| 10.1005 | 1259.77 | 0.1023 | 8.75776 | 41.88 |
| 11.4470 | 357.28 | 0.1023 | 7.73037 | 11.88 |
| 12.1239 | 361.77 | 0.0768 | 7.30031 | 12.03 |
| 12.9361 | 286.94 | 0.1023 | 6.84369 | 9.54 |
| 13.1664 | 512.90 | 0.1023 | 6.72453 | 17.05 |

TABLE 3-continued

XRPD Peaks for Succinate 1:2

| Pos. [°2Th.] | Height [cts] | FWHM [°2Th.] | d-spacing [Å] | Rel. Int. [%] |
| --- | --- | --- | --- | --- |
| 14.1863 | 195.18 | 0.1535 | 6.24326 | 6.49 |
| 14.4301 | 455.41 | 0.0768 | 6.13832 | 15.14 |
| 14.6734 | 1555.54 | 0.1023 | 6.03711 | 51.72 |
| 15.0803 | 1294.54 | 0.1023 | 5.87509 | 43.04 |
| 15.5078 | 1180.67 | 0.1023 | 5.71411 | 39.26 |
| 15.6862 | 1519.34 | 0.1279 | 5.64951 | 50.51 |
| 16.7616 | 215.41 | 0.1279 | 5.28940 | 7.16 |
| 17.5510 | 1169.22 | 0.1535 | 5.05323 | 38.87 |
| 17.6911 | 848.06 | 0.0768 | 5.01351 | 28.20 |
| 18.5421 | 1088.03 | 0.1279 | 4.78530 | 36.17 |
| 18.9460 | 1276.78 | 0.1023 | 4.68419 | 42.45 |
| 19.5216 | 3007.70 | 0.1279 | 4.54736 | 100.00 |
| 19.8358 | 455.65 | 0.0768 | 4.47604 | 15.15 |
| 20.2987 | 566.92 | 0.0768 | 4.37500 | 18.85 |
| 20.4508 | 766.86 | 0.1023 | 4.34280 | 25.50 |
| 21.0411 | 410.57 | 0.1023 | 4.22228 | 13.65 |
| 21.3603 | 294.38 | 0.0768 | 4.15989 | 9.79 |
| 21.8324 | 1604.25 | 0.1279 | 4.07100 | 53.34 |
| 22.1164 | 737.51 | 0.1023 | 4.01937 | 24.52 |
| 22.7571 | 212.74 | 0.1535 | 3.90763 | 7.07 |
| 23.1050 | 299.84 | 0.1023 | 3.84957 | 9.97 |
| 23.4414 | 227.92 | 0.1023 | 3.79508 | 7.58 |
| 23.9645 | 664.43 | 0.1023 | 3.71341 | 22.09 |
| 24.6018 | 408.27 | 0.1535 | 3.61864 | 13.57 |
| 24.9779 | 509.37 | 0.1023 | 3.56500 | 16.94 |
| 25.2122 | 304.97 | 0.1023 | 3.53240 | 10.14 |
| 25.4390 | 389.00 | 0.1279 | 3.50143 | 12.93 |
| 25.6082 | 440.66 | 0.1023 | 3.47867 | 14.65 |
| 25.8262 | 305.48 | 0.1279 | 3.44980 | 10.16 |
| 26.1753 | 93.80 | 0.1279 | 3.40457 | 3.12 |
| 26.5747 | 106.24 | 0.1023 | 3.35430 | 3.53 |
| 26.8909 | 128.61 | 0.1535 | 3.31558 | 4.28 |
| 27.3599 | 283.61 | 0.1279 | 3.25980 | 9.43 |
| 27.7216 | 193.53 | 0.1535 | 3.21808 | 6.43 |
| 28.6274 | 205.41 | 0.1279 | 3.11829 | 6.83 |
| 29.2346 | 304.33 | 0.1535 | 3.05489 | 10.12 |
| 29.9930 | 74.07 | 0.3070 | 2.97935 | 2.46 |
| 30.4368 | 226.28 | 0.1279 | 2.93692 | 7.52 |
| 30.6576 | 210.50 | 0.1279 | 2.91626 | 7.00 |
| 31.3602 | 30.54 | 0.1535 | 2.85251 | 1.02 |
| 31.9942 | 212.84 | 0.1791 | 2.79742 | 7.08 |
| 32.3294 | 123.59 | 0.1023 | 2.76917 | 4.11 |
| 32.7738 | 96.71 | 0.0768 | 2.73264 | 3.22 |
| 33.1136 | 120.27 | 0.2047 | 2.70537 | 4.00 |
| 33.5266 | 89.49 | 0.2558 | 2.67298 | 2.98 |
| 34.0544 | 70.96 | 0.1023 | 2.63275 | 2.36 |
| 34.4950 | 115.08 | 0.1023 | 2.60013 | 3.83 |

TABLE 4

XRPD Peaks for Maleate 1:2

| Pos. [°2Th.] | Height [cts] | FWHM [°2Th.] | d-spacing [Å] | Rel. Int. [%] |
| --- | --- | --- | --- | --- |
| 4.1638 | 37.74 | 0.4093 | 21.22175 | 1.79 |
| 5.4770 | 203.10 | 0.2047 | 16.13601 | 9.65 |
| 7.7807 | 158.59 | 0.0768 | 11.36278 | 7.54 |
| 9.0970 | 127.53 | 0.1023 | 9.72140 | 6.06 |
| 9.9245 | 731.13 | 0.1279 | 8.91259 | 34.75 |
| 10.4477 | 438.42 | 0.1023 | 8.46745 | 20.84 |
| 10.7392 | 171.28 | 0.0768 | 8.23824 | 8.14 |
| 11.4741 | 325.38 | 0.1279 | 7.71219 | 15.46 |
| 12.0136 | 446.17 | 0.1023 | 7.36709 | 21.20 |
| 12.5657 | 336.37 | 0.1535 | 7.04457 | 15.99 |
| 13.1101 | 151.20 | 0.0768 | 6.75326 | 7.19 |
| 14.2351 | 170.61 | 0.1279 | 6.22197 | 8.11 |
| 14.8587 | 2049.38 | 0.1279 | 5.96221 | 97.40 |
| 15.1662 | 375.70 | 0.1023 | 5.84202 | 17.86 |
| 15.7611 | 687.76 | 0.1279 | 5.62285 | 32.69 |
| 16.2816 | 525.01 | 0.1279 | 5.44423 | 24.95 |
| 16.6760 | 264.69 | 0.1535 | 5.31636 | 12.58 |

TABLE 4-continued

XRPD Peaks for Maleate 1:2

| Pos. [°2Th.] | Height [cts] | FWHM [°2Th.] | d-spacing [Å] | Rel. Int. [%] |
| --- | --- | --- | --- | --- |
| 17.2183 | 143.76 | 0.1535 | 5.15011 | 6.83 |
| 17.9423 | 721.44 | 0.1023 | 4.94388 | 34.29 |
| 18.1336 | 1095.95 | 0.0768 | 4.89218 | 52.09 |
| 18.2478 | 1017.52 | 0.1279 | 4.86181 | 48.36 |
| 18.7128 | 516.08 | 0.1023 | 4.74203 | 24.53 |
| 19.0371 | 918.05 | 0.1535 | 4.66197 | 43.63 |
| 19.4748 | 999.90 | 0.0768 | 4.55818 | 47.52 |
| 19.7112 | 2104.11 | 0.1535 | 4.50404 | 100.00 |
| 20.1090 | 445.20 | 0.1279 | 4.41583 | 21.16 |
| 20.8089 | 372.57 | 0.1791 | 4.26885 | 17.71 |
| 21.7515 | 529.50 | 0.1023 | 4.08596 | 25.16 |
| 21.9565 | 487.73 | 0.1535 | 4.04827 | 23.18 |
| 22.6313 | 578.30 | 0.1791 | 3.92907 | 27.48 |
| 23.5670 | 265.41 | 0.0768 | 3.77513 | 12.61 |
| 24.2129 | 705.84 | 0.1791 | 3.67587 | 33.55 |
| 24.8778 | 394.08 | 0.1535 | 3.57912 | 18.73 |
| 25.2788 | 447.41 | 0.1023 | 3.52325 | 21.26 |
| 25.8333 | 364.24 | 0.1279 | 3.44886 | 17.31 |
| 26.3288 | 135.72 | 0.2558 | 3.38507 | 6.45 |
| 26.9251 | 174.50 | 0.1023 | 3.31145 | 8.29 |
| 27.3272 | 160.89 | 0.1535 | 3.26363 | 7.65 |
| 27.6197 | 226.79 | 0.1535 | 3.22972 | 10.78 |
| 28.2532 | 116.25 | 0.1535 | 3.15873 | 5.52 |
| 29.0692 | 239.42 | 0.1023 | 3.07189 | 11.38 |
| 30.6312 | 123.95 | 0.2558 | 2.91871 | 5.89 |
| 31.2799 | 58.84 | 0.1535 | 2.85965 | 2.80 |
| 31.6568 | 105.98 | 0.1535 | 2.82646 | 5.04 |
| 31.9721 | 96.22 | 0.1535 | 2.79930 | 4.57 |
| 32.7596 | 90.69 | 0.1535 | 2.73379 | 4.31 |
| 33.2925 | 75.34 | 0.2047 | 2.69124 | 3.58 |
| 33.8116 | 45.37 | 0.2047 | 2.65110 | 2.16 |
| 34.3134 | 96.15 | 0.2047 | 2.61347 | 4.57 |

TABLE 5

XRPD Peaks for Monohydrobromide Monohydrate

| Pos. [°2Th.] | Height [cts] | FWHM [°2Th.] | d-spacing [Å] | Rel. Int. [%] |
| --- | --- | --- | --- | --- |
| 4.2296 | 3.83 | 0.1279 | 20.89146 | 0.08 |
| 5.3809 | 183.89 | 0.3070 | 16.42400 | 4.01 |
| 5.6586 | 177.22 | 0.2047 | 15.61851 | 3.86 |
| 8.1081 | 206.84 | 0.0768 | 10.90478 | 4.51 |
| 8.3105 | 358.35 | 0.1023 | 10.63965 | 7.81 |
| 8.6091 | 205.71 | 0.0768 | 10.27118 | 4.48 |
| 10.0215 | 573.10 | 0.0768 | 8.82658 | 12.49 |
| 10.4476 | 4444.14 | 0.1023 | 8.46756 | 96.88 |
| 10.7452 | 1982.31 | 0.0768 | 8.23369 | 43.21 |
| 11.3179 | 93.96 | 0.2047 | 7.81833 | 2.05 |
| 11.9790 | 1663.10 | 0.1023 | 7.38826 | 36.26 |
| 12.4546 | 886.80 | 0.1023 | 7.10717 | 19.33 |
| 12.5960 | 952.60 | 0.0768 | 7.02771 | 20.77 |
| 13.1036 | 1413.42 | 0.1023 | 6.75660 | 30.81 |
| 13.9373 | 178.74 | 0.1023 | 6.35426 | 3.90 |
| 14.7102 | 602.43 | 0.1279 | 6.02208 | 13.13 |
| 15.7553 | 472.73 | 0.0768 | 5.62488 | 10.31 |
| 15.9131 | 767.41 | 0.1023 | 5.56946 | 16.73 |
| 16.2630 | 286.68 | 0.1023 | 5.45043 | 6.25 |
| 16.7236 | 2136.28 | 0.2047 | 5.30133 | 46.57 |
| 17.0031 | 451.84 | 0.0768 | 5.21480 | 9.85 |
| 17.2417 | 987.91 | 0.1279 | 5.14319 | 21.54 |
| 17.6418 | 349.05 | 0.0768 | 5.02742 | 7.61 |
| 17.9684 | 3667.08 | 0.1279 | 4.93678 | 79.94 |
| 18.9133 | 2494.74 | 0.1279 | 4.69221 | 54.39 |
| 19.1934 | 1875.63 | 0.1279 | 4.62436 | 40.89 |
| 19.5140 | 4587.12 | 0.1023 | 4.54911 | 100.00 |
| 19.7617 | 1002.22 | 0.0768 | 4.49264 | 21.85 |
| 20.0456 | 1066.29 | 0.1023 | 4.42966 | 23.25 |
| 20.1890 | 1093.65 | 0.1023 | 4.39851 | 23.84 |
| 20.7673 | 962.13 | 0.1279 | 4.27732 | 20.97 |
| 21.5262 | 258.13 | 0.1535 | 4.12821 | 5.63 |

TABLE 5-continued

XRPD Peaks for Monohydrobromide Monohydrate

| Pos. [°2Th.] | Height [cts] | FWHM [°2Th.] | d-spacing [Å] | Rel. Int. [%] |
|---|---|---|---|---|
| 22.0670 | 126.35 | 0.1023 | 4.02825 | 2.75 |
| 22.6028 | 516.68 | 0.2047 | 3.93396 | 11.26 |
| 23.1412 | 757.35 | 0.1279 | 3.84363 | 16.51 |
| 23.4720 | 1168.55 | 0.1791 | 3.79021 | 25.47 |
| 24.1627 | 971.45 | 0.1535 | 3.68340 | 21.18 |
| 24.6179 | 673.58 | 0.1535 | 3.61631 | 14.68 |
| 25.2071 | 2098.00 | 0.2047 | 3.53311 | 45.74 |
| 25.4079 | 1840.97 | 0.1023 | 3.50564 | 40.13 |
| 25.8528 | 657.01 | 0.1279 | 3.44632 | 14.32 |
| 26.5668 | 668.27 | 0.1023 | 3.35529 | 14.57 |
| 26.7573 | 845.66 | 0.1535 | 3.33183 | 18.44 |
| 27.3923 | 603.84 | 0.1791 | 3.25602 | 13.16 |
| 28.3220 | 350.69 | 0.1791 | 3.15122 | 7.65 |
| 28.8893 | 198.52 | 0.1535 | 3.09061 | 4.33 |
| 29.5787 | 437.36 | 0.2047 | 3.02013 | 9.53 |
| 30.3258 | 186.42 | 0.1279 | 2.94741 | 4.06 |
| 31.2815 | 531.37 | 0.1023 | 2.85951 | 11.58 |
| 31.7944 | 746.33 | 0.1279 | 2.81454 | 16.27 |
| 32.2527 | 208.25 | 0.1535 | 2.77558 | 4.54 |
| 32.8476 | 263.24 | 0.1791 | 2.72666 | 5.74 |
| 33.3569 | 84.11 | 0.1279 | 2.68619 | 1.83 |
| 33.8336 | 105.37 | 0.1872 | 2.64723 | 2.30 |
| 34.2035 | 95.39 | 0.1248 | 2.62595 | 2.08 |

TABLE 6

XRPD Peaks For P-Toluene Sulfonate 1:1

| Pos. [°2Th.] | Height [cts] | FWHM [°2Th.] | d-spacing [Å] | Rel. Int. [%] |
|---|---|---|---|---|
| 5.5625 | 204.31 | 0.3070 | 15.88815 | 3.81 |
| 7.9149 | 218.88 | 0.0768 | 11.17042 | 4.08 |
| 8.1534 | 320.08 | 0.1023 | 10.84424 | 5.97 |
| 8.7634 | 580.12 | 0.0768 | 10.09069 | 10.82 |
| 10.1025 | 558.37 | 0.0768 | 8.75600 | 10.41 |
| 10.2883 | 830.70 | 0.0512 | 8.59824 | 15.49 |
| 10.4196 | 1133.78 | 0.1023 | 8.49024 | 21.14 |
| 12.1662 | 2262.17 | 0.1023 | 7.27501 | 42.19 |
| 12.5554 | 2429.44 | 0.1023 | 7.05037 | 45.31 |
| 13.6081 | 217.48 | 0.0768 | 6.50721 | 4.06 |
| 13.8163 | 315.45 | 0.0768 | 6.40964 | 5.88 |
| 13.9991 | 418.32 | 0.1023 | 6.32633 | 7.80 |
| 14.6470 | 311.20 | 0.1023 | 6.04794 | 5.80 |
| 14.8886 | 732.16 | 0.1023 | 5.95031 | 13.65 |
| 14.9996 | 622.61 | 0.0768 | 5.90655 | 11.61 |
| 15.4471 | 84.35 | 0.1279 | 5.73640 | 1.57 |
| 15.9186 | 319.18 | 0.1279 | 5.56756 | 5.95 |
| 16.4019 | 653.26 | 0.1023 | 5.40457 | 12.18 |
| 16.6588 | 280.73 | 0.1023 | 5.32181 | 5.24 |
| 16.8925 | 629.30 | 0.0512 | 5.24871 | 11.74 |
| 17.0331 | 744.49 | 0.0768 | 5.20567 | 13.88 |
| 17.3790 | 881.83 | 0.0768 | 5.10286 | 16.45 |
| 17.6286 | 1190.40 | 0.1023 | 5.03115 | 22.20 |
| 17.8504 | 517.97 | 0.0768 | 4.96913 | 9.66 |
| 18.2924 | 3612.18 | 0.1279 | 4.85006 | 67.36 |
| 19.0992 | 2074.49 | 0.1023 | 4.64696 | 38.69 |
| 19.4178 | 368.75 | 0.0768 | 4.57143 | 6.88 |
| 19.8923 | 2200.16 | 0.1023 | 4.46343 | 41.03 |
| 20.1350 | 5362.12 | 0.1023 | 4.41018 | 100.00 |
| 20.5368 | 1375.86 | 0.1023 | 4.32479 | 25.66 |
| 20.7302 | 513.86 | 0.0512 | 4.28489 | 9.58 |
| 21.2584 | 103.48 | 0.1279 | 4.17960 | 1.93 |
| 21.6535 | 323.76 | 0.1279 | 4.10422 | 6.04 |
| 21.9238 | 158.36 | 0.0768 | 4.05423 | 2.95 |
| 22.4688 | 1477.26 | 0.1535 | 3.95711 | 27.55 |
| 23.9560 | 166.45 | 0.1791 | 3.71471 | 3.10 |
| 24.7681 | 844.30 | 0.1791 | 3.59473 | 15.75 |
| 25.0587 | 419.75 | 0.1279 | 3.55370 | 7.83 |
| 25.5965 | 280.10 | 0.1279 | 3.48023 | 5.22 |
| 26.0529 | 69.42 | 0.1535 | 3.42029 | 1.29 |
| 26.5712 | 686.45 | 0.1535 | 3.35474 | 12.80 |
| 27.0160 | 452.59 | 0.1279 | 3.30051 | 8.44 |
| 27.2550 | 263.79 | 0.0768 | 3.27210 | 4.92 |
| 27.8847 | 414.21 | 0.1791 | 3.19963 | 7.72 |
| 28.2692 | 517.01 | 0.1279 | 3.15699 | 9.64 |
| 29.2126 | 286.13 | 0.1535 | 3.05715 | 5.34 |
| 29.7878 | 204.65 | 0.2558 | 2.99940 | 3.82 |
| 30.1354 | 116.67 | 0.1023 | 2.96559 | 2.18 |
| 31.4416 | 179.18 | 0.1279 | 2.84531 | 3.34 |
| 32.2757 | 171.98 | 0.1023 | 2.77366 | 3.21 |
| 34.0346 | 109.48 | 0.1279 | 2.63424 | 2.04 |
| 34.6744 | 156.32 | 0.1791 | 2.58708 | 2.92 |

TABLE 7

The observations of the mixtures at various temperatures

| Counter ion | | Observations | | | | |
|---|---|---|---|---|---|---|
| | Equivalents, Volume, ml, Concentration, mg/ml | 75° C. | 60° C. | 40° C., ca 1 hour | 40° C., ca 2 hour | Ambient temperature, post ca 20 hours |
| L-Malic | 2.2<br>0.890<br>268.7 | Clear solution | White mobile suspension | White immobile suspension Ethanol, 3 ml, charged | White mobile suspension | White mobile suspension |
| Succinic | 2.2<br>3.767<br>55.9 | Clear solution | Clear solution | White immobile suspension Ethanol, 5 ml, charged | White mobile suspension | White mobile suspension |
| Maleic | 2.2<br>0.895<br>231.4 | White immobile suspension Ethanol, 5 ml, charged | White mobile suspension | Ethanol, 5 ml, charged | White mobile suspension | White mobile suspension |
| Hydrobromic | 1.0<br>0.408<br>160.9 | Clear solution | Clear solution | White mobile suspension | White mobile suspension | White mobile suspension |

TABLE 8

Recoveries and Appearance of Salts

| Counter ion | Equivalents | Recovery, g | Appearance |
|---|---|---|---|
| L-Malic | 2.2 | 0.6444 | Non-uniform white solid |
| Succinic | 2.2 | 0.5350 | Non-uniform white solid |
| Maleic | 2.2 | 0.5946 | Non-uniform white solid |
| Hydrobromic | 1.0 | 0.4673 | Non-uniform white solid |
| p-Toluenesulfonic | 1.0 | 0.5109 | Non-uniform white solid |

TABLE 9

Hygroscopicity Classification (adopted from Ph. Eur. and Sihorkar et al, Pharmaceutical Dev. & Technol. (2013)

| Classification | Weight increase from 40-80% RH (25° C.) |
|---|---|
| Non hygroscopic | <0.2% |
| Slightly hygroscopic | ≥0.2% and <2% |
| Hygroscopic | ≥2% and <15% |
| Very hygroscopic | ≥15% |

TABLE 10

GVS analysis over the range of 40-80% RH at 25° C.

| Salt | Weight change (%) from 40 to 80% RH @25° C. (sorption cycle by GVS) | Classification |
|---|---|---|
| Monohydrochloride monohydrate | +0.9 | Slightly hygroscopic |
| 1:2 L-malate | +1.7 | Slightly hygroscopic |
| 1:2 succinate | +0.9 | Slightly hygroscopic |
| 1:2 maleate | +0.6 | Slightly hygroscopic |
| Monohydrobromide monohydrate | +0.2 | Slightly hygroscopic |
| 1:1 para toluene sulfonate | +0.7 | Slightly hygroscopic |
| 1:1 citrate | +6 | Hygroscopic |
| 1:0.5 L-tartrate | +5 | Hygroscopic |

The invention claimed is:

1. A crystalline form of compound (I),

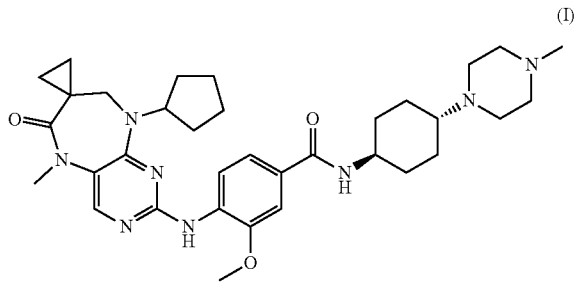 [SMILES: COc1cc(C(=O)N[C@H]2CC[C@H](N3CCN(C)CC3)CC2)ccc1Nc1ncc2c(n1)N(C1CCCC1)CC1(CC1)C(=O)N2C]

(I)

wherein said compound is in the form of a pharmaceutically acceptable salt, or a solvate of said pharmaceutically acceptable salt, or a co-crystal, wherein the crystalline form is a succinate salt.

2. The crystalline form of claim 1, wherein the ratio of succinate to compound (I) is 2:1.

3. A pharmaceutical composition comprising the crystalline form of claim 1 and a pharmaceutically acceptable carrier, diluent or excipient.

4. A method for the treatment of a proliferative disorder, an immune-mediated or inflammatory disorder, an autoimmune or autoimmune-mediated disorder, a kidney disorder or a viral disorder, said method comprising administering a therapeutically effective amount of the crystalline form according to claim 1 to a subject in need of thereof.

5. A process for preparing a crystalline form according to claim 2, said process comprising the steps of:
   (i) preparing a mixture comprising compound (I) and ethanol, and heating said mixture to at least 70° C.;
   (ii) preparing a solution of succinic acid in ethanol or ethanol/THF, and charging to the mixture formed in step (i);
   cooling the mixture formed in step (ii) to ambient temperature in a stepwise manner; and
   (iv) isolating the crystalline form from the mixture.

6. A process for preparing a pharmaceutical composition comprising the crystalline form of claim 1 and a pharmaceutically acceptable carrier, diluent or excipient, said process comprising admixing the crystalline form with the pharmaceutically acceptable diluent, excipient or carrier.

7. A process for preparing a crystalline salt form of compound (I) as defined in claim 1, said process comprising treating a solution or suspension of compound (I) in free base form with succinic acid, and crystallising the product so formed.

8. The crystalline form of claim 1, wherein the crystalline form is characterized by an x-ray powder diffraction pattern having two or more diffraction peaks at 2[theta] values selected from 3.16±0.2, 5.47±0.2, 9.01±0.2, 10.10±0.2, 11.45±0.2, 12.12±0.2, 12.94±0.2, 13.17±0.2, 14.19±0.2, 14.43±0.2, 14.67±0.2, 15.08±0.2, 15.51±0.2, 15.69±0.2, 16.76±0.2, 17.55±0.2, 17.69±0.2, 18.54±0.2, 18.95±0.2, 19.52±0.2, 19.84±0.2, 20.30±0.2, 20.45±0.2, 21.04±0.2, 21.36±0.2, 21.83±0.2, 22.12±0.2, 22.76±0.2, 23.11±0.2, 23.44±0.2, 23.96±0.2, 24.60±0.2, 24.98±0.2, 25.21±0.2, 25.44±0.2, 25.61±0.2, 25.83±0.2, 26.18±0.2, 26.57±0.2, 26.89±0.2, 27.36±0.2, 27.72±0.2, 28.63±0.2, 29.23±0.2, 29.99±0.2, 30.44±0.2, 30.66±0.2, 31.36±0.2, 31.99±0.2, 32.33±0.2, 32.77±0.2, 33.11±0.2, 33.53±0.2, 34.05±0.2 and 34.50±0.2.

9. The crystalline form of claim 1, wherein the crystalline form is characterized by an x-ray powder diffraction pattern in which the peak positions are substantially in accordance with the peak positions of the pattern shown in FIG. 27.

10. The crystalline form of claim 1, wherein the crystalline form is characterized by a differential scanning calorimetry trace recorded at a heating rate of 20° C. per minute which shows a maximum endothermic peak at a temperature between 185° C. and 190° C.

11. The crystalline form of claim 1, wherein the crystalline form is characterized by a differential scanning calorimetry trace in accordance with that shown in FIG. 10.

* * * * *